(12) United States Patent
You et al.

(10) Patent No.: US 10,887,141 B2
(45) Date of Patent: *Jan. 5, 2021

(54) METHOD AND USER EQUIPMENT FOR RECEIVING DOWNLINK CHANNEL, AND METHOD AND BASE STATION FOR TRANSMITTING DOWNLINK CHANNEL

(71) Applicant: LG ELECTRONICS INC., Seoul (KR)

(72) Inventors: Hyangsun You, Seoul (KR); Kijun Kim, Seoul (KR); Yunjung Yi, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 16/397,737

(22) Filed: Apr. 29, 2019

(65) Prior Publication Data

US 2019/0253291 A1 Aug. 15, 2019

Related U.S. Application Data

(63) Continuation of application No. 15/374,737, filed on Dec. 9, 2016, now Pat. No. 10,313,168.

(Continued)

(51) Int. Cl.
*H04L 27/26* (2006.01)
*H04L 5/00* (2006.01)

(52) U.S. Cl.
CPC ........ *H04L 27/2602* (2013.01); *H04L 5/0023* (2013.01); *H04L 5/0048* (2013.01);
(Continued)

(58) Field of Classification Search
CPC . H04L 27/2602; H04L 5/0023; H04L 5/0082; H04L 5/0048; H04L 5/001; H04L 5/0035
See application file for complete search history.

(56) References Cited

U.S. PATENT DOCUMENTS

| 8,730,986 B2 * | 5/2014 | Wang ................. H04W 72/005 370/432 |
| 8,842,594 B2 * | 9/2014 | Jiang ..................... H04L 5/0035 370/312 |

(Continued)

OTHER PUBLICATIONS

U.S. Appl. No. 15/374,737, Notice of Allowance dated Jan. 17, 2019, 13 pages.

(Continued)

*Primary Examiner* — Ivan O Latorre
(74) *Attorney, Agent, or Firm* — Lee Hong Degerman Kang Waimey

(57) ABSTRACT

A method and apparatus for transmitting/receiving a downlink channel in a wireless communication system are provided. A downlink control channel and a downlink data channel corresponding to the downlink control channel are transmitted/received within a transmission time interval (TTI). A reference signal (RS) of an antenna port used for transmission of both the downlink control channel and the downlink data channel is transmitted/received on an OFDM symbol with the downlink control channel, and an RS of an antenna port used only for transmission of the downlink data channel is transmitted in the remaining OFDM symbol(s) of the TTI.

16 Claims, 38 Drawing Sheets

Related U.S. Application Data

(60) Provisional application No. 62/266,000, filed on Dec. 11, 2015, provisional application No. 62/335,653, filed on May 12, 2016, provisional application No. 62/335,703, filed on May 13, 2016, provisional application No. 62/401,935, filed on Sep. 30, 2016, provisional application No. 62/405,216, filed on Oct. 6, 2016.

(52) U.S. Cl.
CPC ............ *H04L 5/0082* (2013.01); *H04L 5/001* (2013.01); *H04L 5/0035* (2013.01)

(56) References Cited

U.S. PATENT DOCUMENTS

| | | | |
|---|---|---|---|
| 9,065,527 B2 | 6/2015 | Hoshino et al. | |
| 9,264,249 B2* | 2/2016 | Zhang | H04L 5/0007 |
| 9,420,585 B2* | 8/2016 | Jang | H04H 20/71 |
| 9,445,242 B2* | 9/2016 | Barrett | H04W 4/06 |
| 9,462,577 B2* | 10/2016 | Park | H04W 72/0413 |
| 9,509,417 B2* | 11/2016 | Lee | H04J 11/005 |
| 9,621,365 B2* | 4/2017 | Phan | H04B 7/15 |
| 10,149,099 B2* | 12/2018 | Kim | H04W 4/08 |
| 2008/0267317 A1 | 10/2008 | Malladi | |
| 2011/0013574 A1* | 1/2011 | Hsu | H04W 72/005 370/329 |
| 2011/0090983 A1 | 4/2011 | Zhang et al. | |
| 2011/0292858 A1 | 12/2011 | Jones et al. | |
| 2012/0014286 A1* | 1/2012 | Wang | H04W 72/0446 370/254 |
| 2013/0034070 A1 | 2/2013 | Seo et al. | |
| 2013/0044664 A1 | 2/2013 | Nory et al. | |
| 2013/0064216 A1* | 3/2013 | Gao | H04L 5/0016 370/330 |
| 2013/0114498 A1 | 5/2013 | Park et al. | |
| 2013/0235783 A1 | 9/2013 | Wang et al. | |
| 2014/0112290 A1 | 4/2014 | Chun et al. | |
| 2014/0293843 A1 | 10/2014 | Papasakellariou et al. | |
| 2014/0348050 A1 | 11/2014 | Kim et al. | |
| 2015/0009925 A1 | 1/2015 | Park et al. | |
| 2015/0139068 A1* | 5/2015 | Jang | H04W 88/022 370/312 |
| 2016/0065341 A1 | 3/2016 | Yoo et al. | |
| 2016/0119901 A1 | 4/2016 | Zhang | |
| 2016/0227424 A1 | 8/2016 | Chen et al. | |
| 2016/0309466 A1 | 10/2016 | Chen et al. | |
| 2016/0373227 A1 | 12/2016 | Sun et al. | |
| 2016/0381490 A1 | 12/2016 | Rico Alvarino et al. | |
| 2017/0171842 A1 | 6/2017 | You et al. | |
| 2017/0272141 A1 | 9/2017 | Horiuchi et al. | |
| 2017/0290008 A1* | 10/2017 | Tooher | H04L 1/0007 |
| 2018/0020462 A1 | 1/2018 | Xiong et al. | |

OTHER PUBLICATIONS

U.S. Appl. No. 15/374,737, Office Action dated Sep. 19, 2018, 17 pages.

* cited by examiner

[P] RE occupied by CRS of port p ( p∈0, p∈0,1 or p∈0,1,2,3 )

▨ RE occupied by UE-RS of port(s) p ( p∈7, p∈8, p∈7,8 or p∈7,8,11,13 )

▧ RE occupied by UE-RS of port(s) p ( p∈9, p∈10, p∈9,10 or p∈9,10,12,14 )

FIG. 13
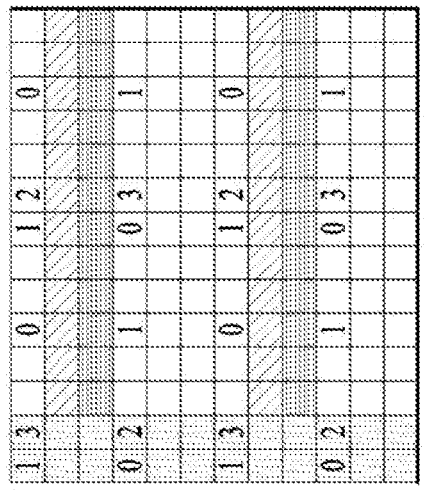
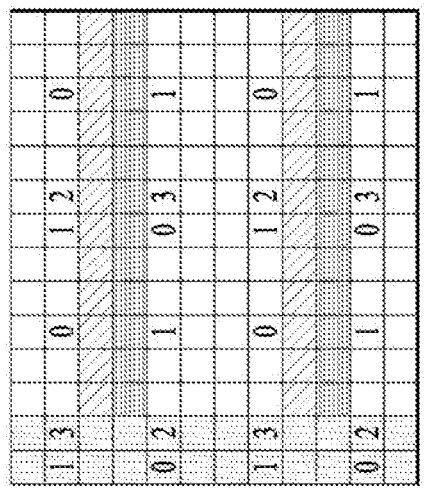
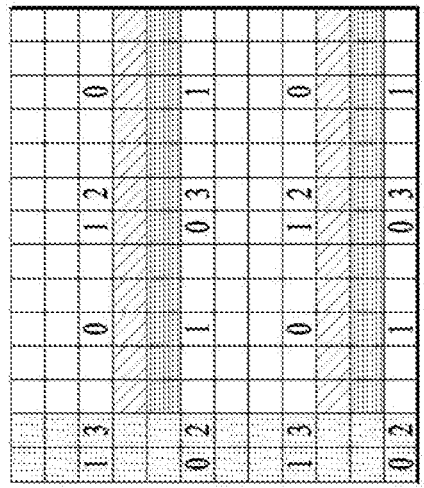
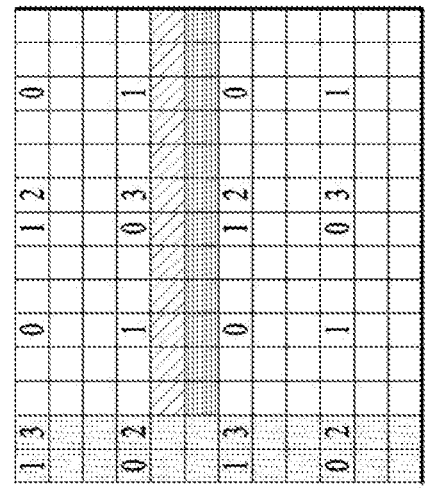
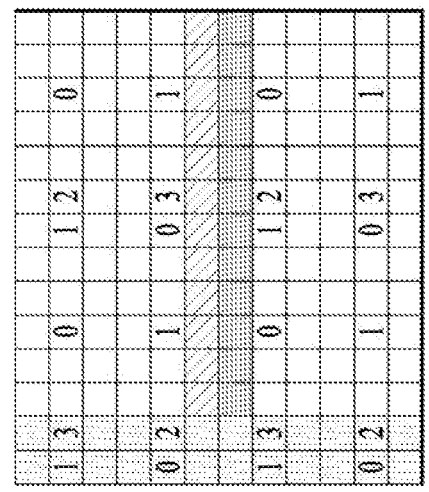
(a) CRS with v-shift 0
(b) CRS with v-shift 1
(c) CRS with v-shift 2
(d) CRS with v-shift 0
(e) CRS with v-shift 1
(f) CRS with v-shift 2

[0] CRS 0 　[1] CRS 1 　[2] CRS 2 　[3] CRS 3 　▨ A-RS 7 　▨ A-RS 8

(a) CRS with v-shift 0

(b) CRS with v-shift 1

(c) CRS with v-shift 2

(d) CRS with v-shift 0

(e) CRS with v-shift 1

(f) CRS with v-shift 2

(g) CRS with v-shift 0

(h) CRS with v-shift 1

(i) CRS with v-shift 2

FIG. 17

[0] CRS 0 [1] CRS 1 [2] CRS 2 [3] CRS 3 ▨ A-RS 7 ▨ A-RS 8

(a) CRS with v-shift 0
(b) CRS with v-shift 1
(c) CRS with v-shift 2
(d) CRS with v-shift 0
(e) CRS with v-shift 1
(f) CRS with v-shift 2
(g) CRS with v-shift 0
(h) CRS with v-shift 1
(i) CRS with v-shift 2
(j) CRS with v-shift 0
(k) CRS with v-shift 1
(l) CRS with v-shift 2

FIG. 19
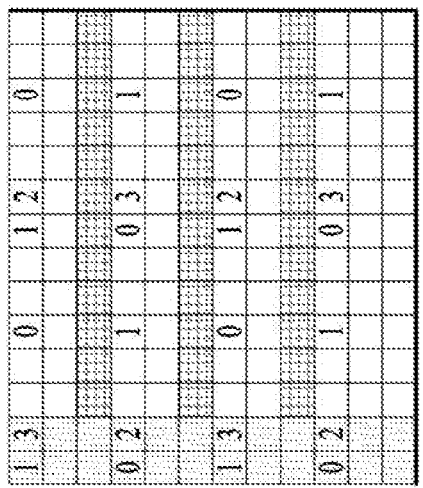
(a) CRS with v-shift 0
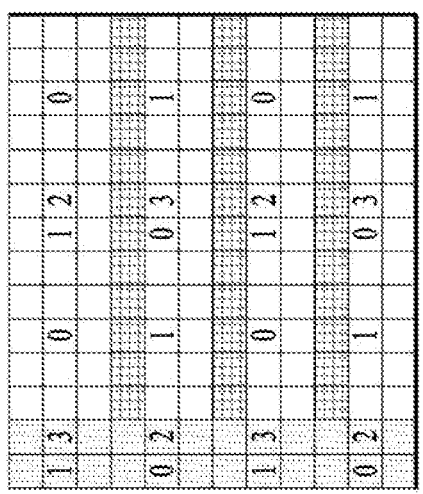
(b) CRS with v-shift 1
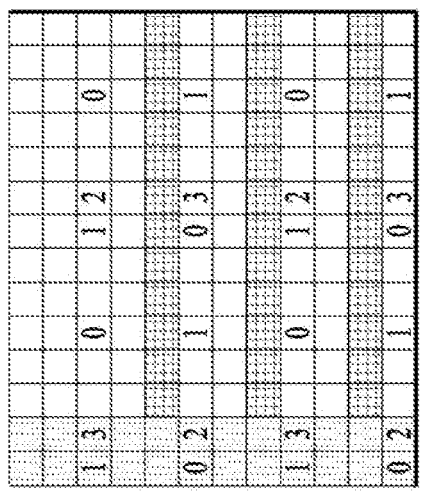
(c) CRS with v-shift 2
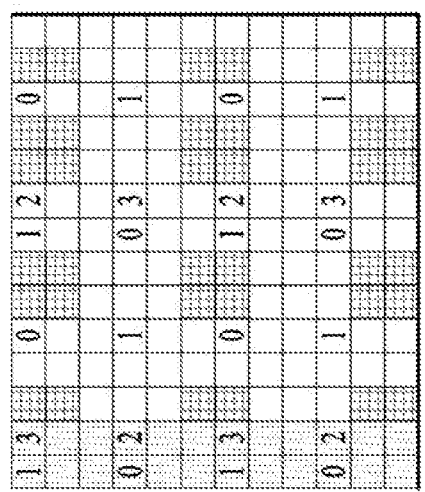
(d) CRS with v-shift 0
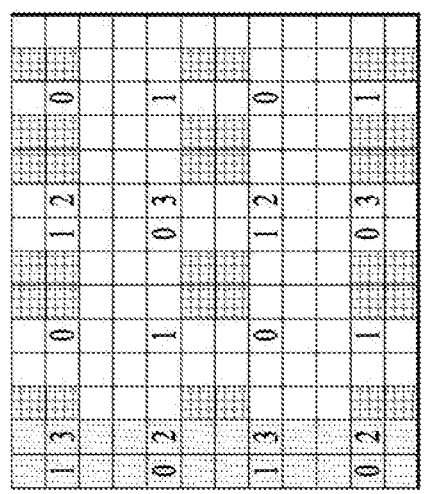
(e) CRS with v-shift 1
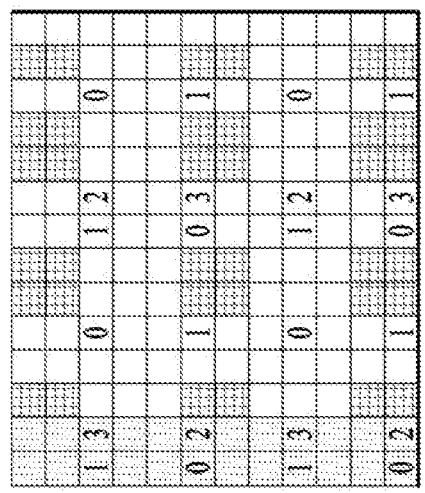
(f) CRS with v-shift 2

FIG. 20

[0] CRS 0  [1] CRS 1  [2] CRS 2  [3] CRS 3  ▨ A-RS 7&8

(a) CRS with v-shift 0

(b) CRS with v-shift 1

(c) CRS with v-shift 2

(d) CRS with v-shift 0

(e) CRS with v-shift 1

(f) CRS with v-shift 2

(g) CRS with v-shift 0

(h) CRS with v-shift 1

(i) CRS with v-shift 2

FIG. 22
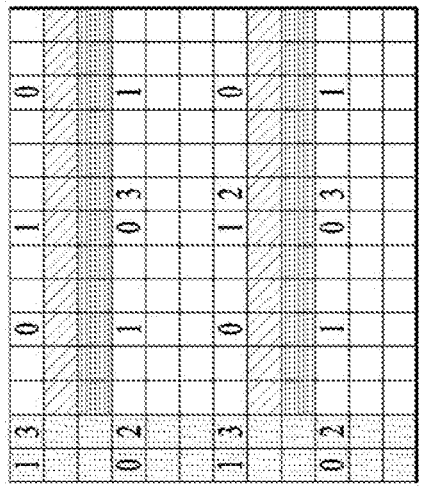
(a) CRS with v-shift 0
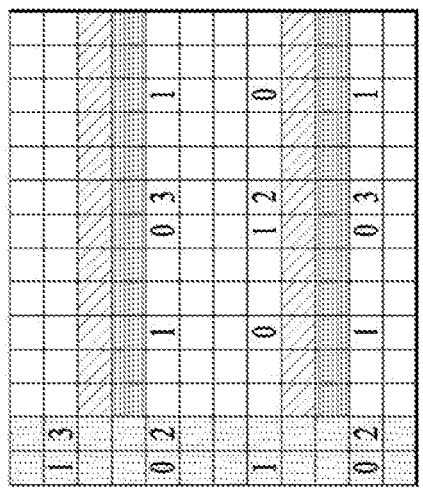
(b) CRS with v-shift 1
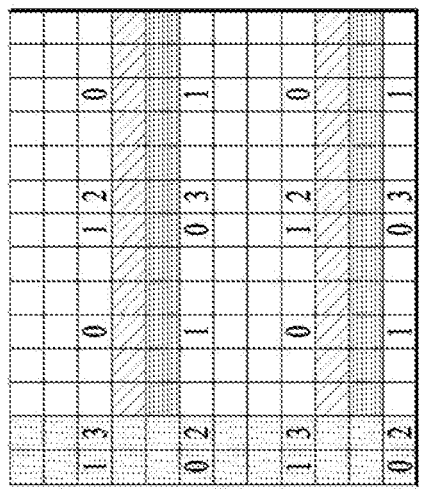
(c) CRS with v-shift 2
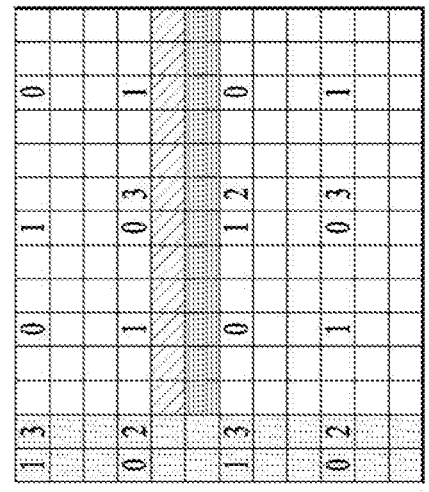
(d) CRS with v-shift 0
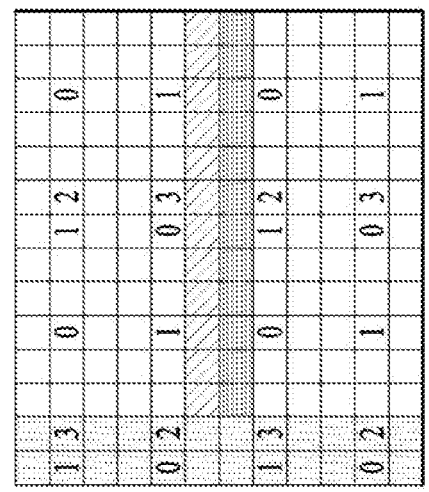
(e) CRS with v-shift 1
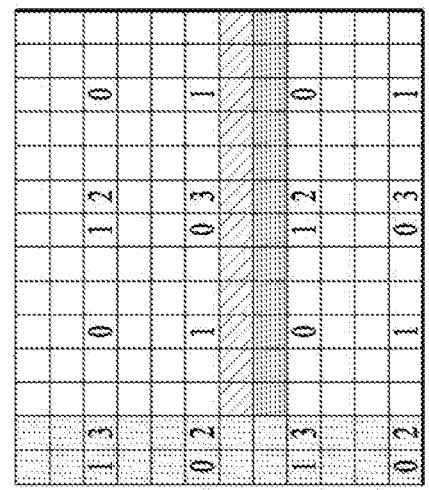
(f) CRS with v-shift 2

FIG. 23
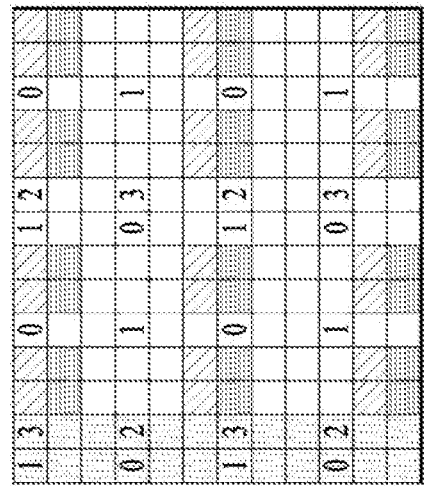
(c) CRS with v-shift 2
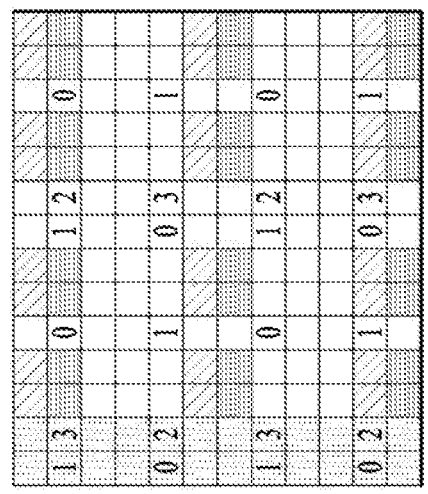
(b) CRS with v-shift 1
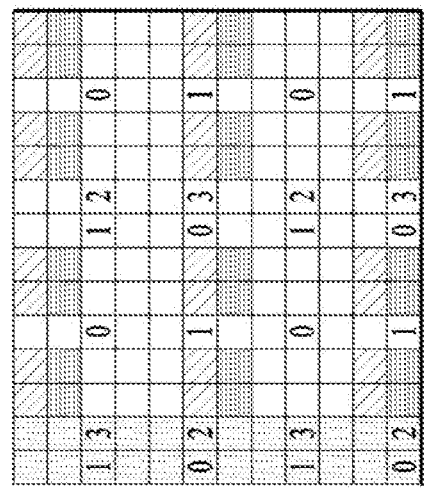
(a) CRS with v-shift 0

FIG. 24

[0] CRS 0  [1] CRS 1  [2] CRS 2  [3] CRS 3  ▓ A-RS 7/8  ▓ A-RS 9/10

(a) CRS with v-shift 0

(b) CRS with v-shift 1

(c) CRS with v-shift 2

(d) CRS with v-shift 0

(e) CRS with v-shift 1

(f) CRS with v-shift 2

(g) CRS with v-shift 0

(h) CRS with v-shift 1

(i) CRS with v-shift 2

FIG. 25

FIG. 26
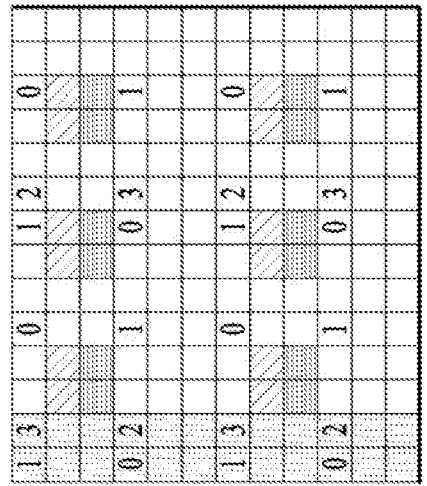
(c) CRS with v-shift 2
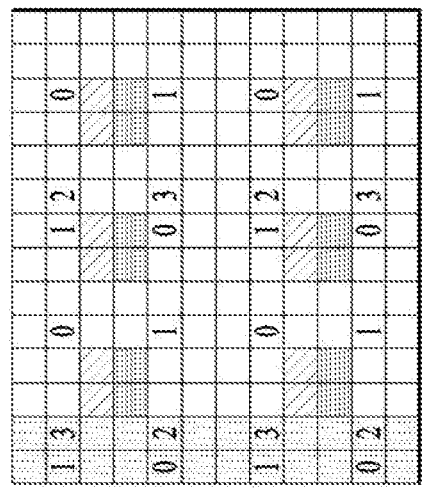
(b) CRS with v-shift 1
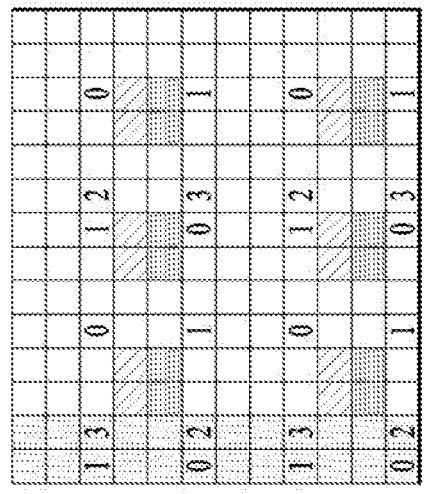
(a) CRS with v-shift 0

FIG. 27
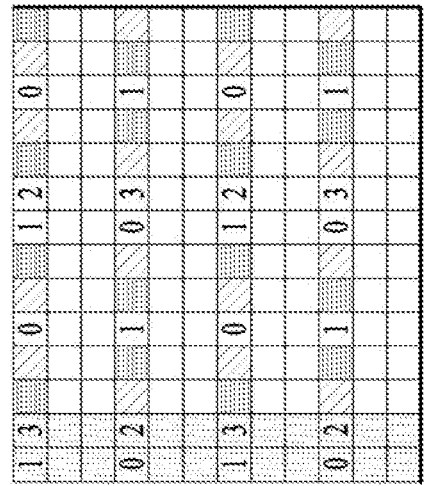
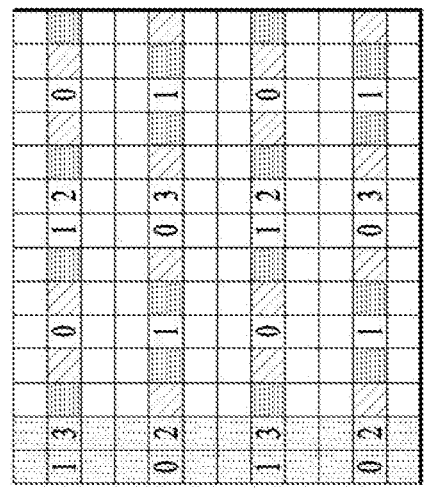
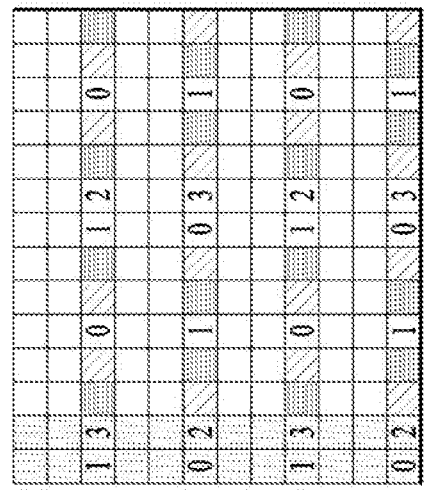

FIG. 28

FIG. 29
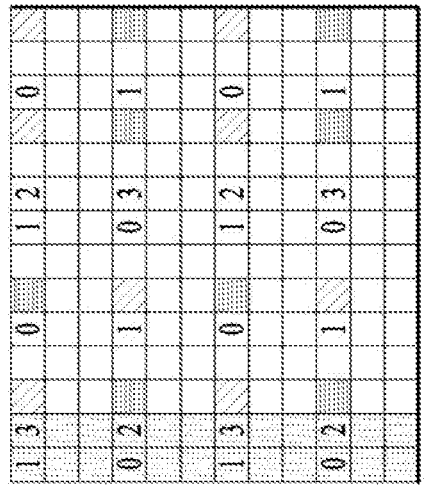
(c) CRS with v-shift 2
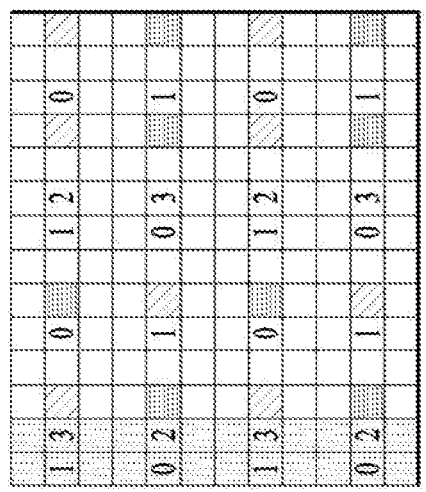
(b) CRS with v-shift 1
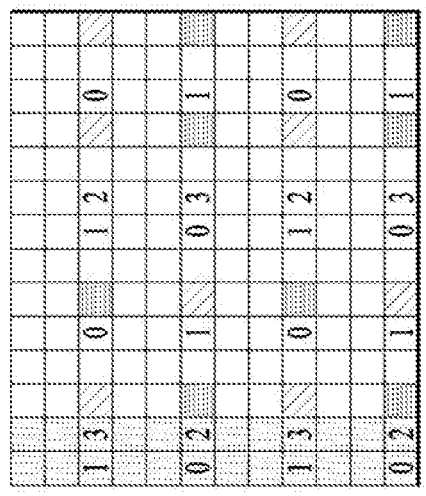
(a) CRS with v-shift 0

FIG. 30
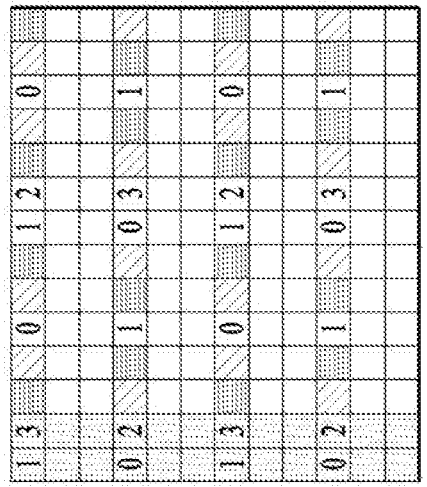
(a) CRS with v-shift 0
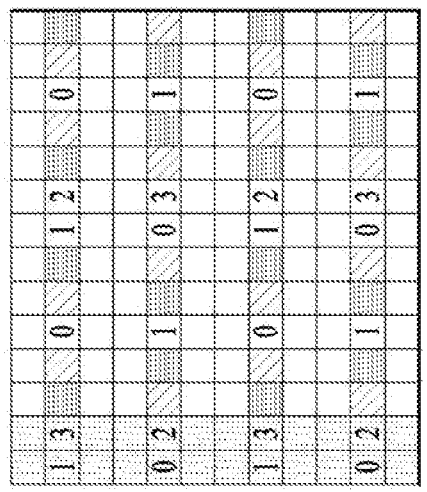
(b) CRS with v-shift 1
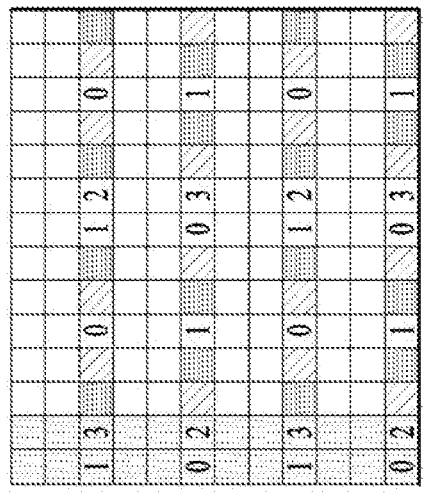
(c) CRS with v-shift 2
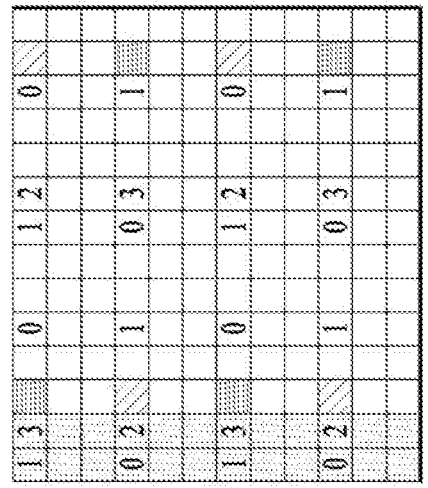
(d) CRS with v-shift 0
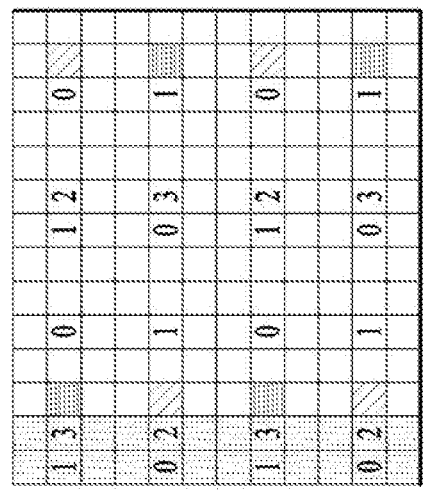
(e) CRS with v-shift 1
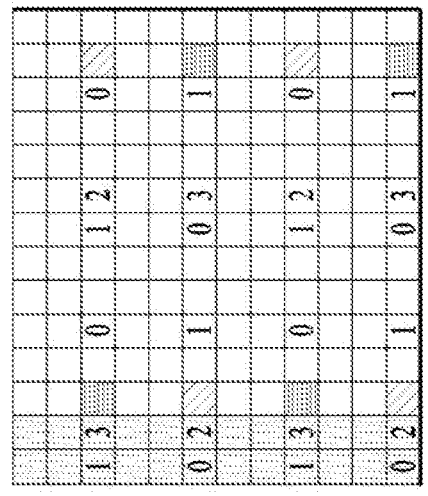
(f) CRS with v-shift 2

FIG. 31
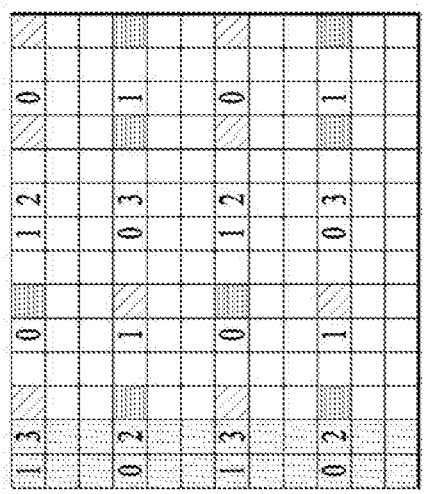
(c) CRS with v-shift 2
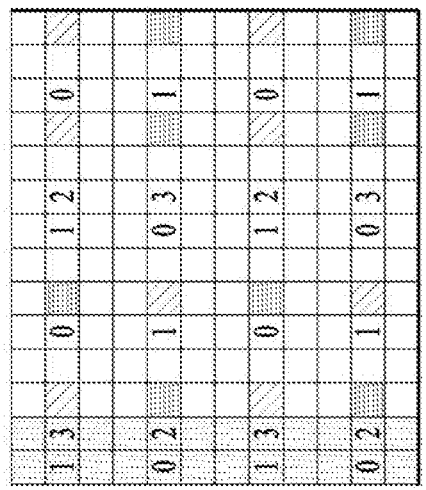
(b) CRS with v-shift 1
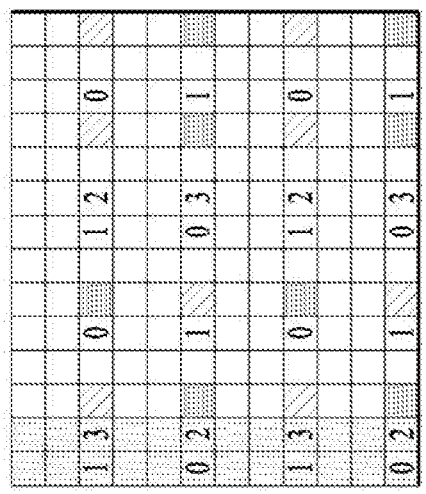
(a) CRS with v-shift 0

FIG. 32
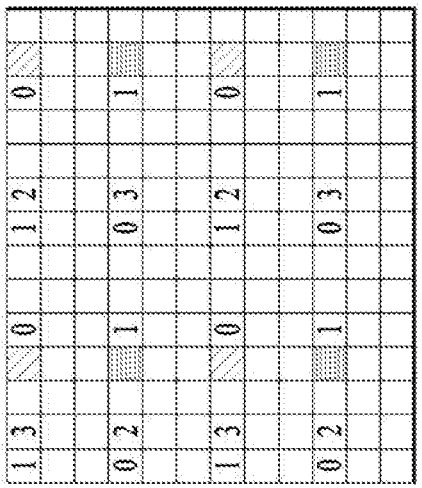
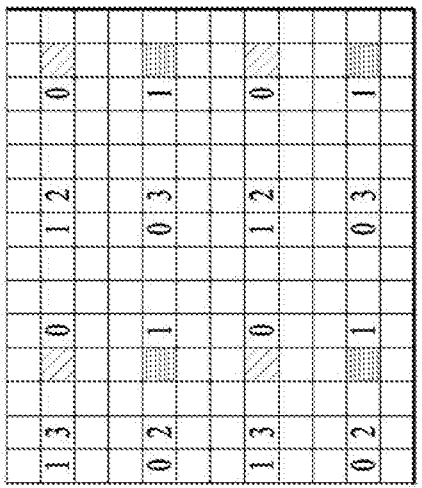
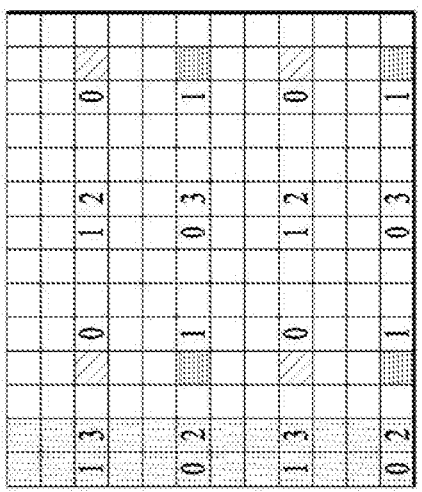
(a) CRS with v-shift 0
(b) CRS with v-shift 1
(c) CRS with v-shift 2

FIG. 33
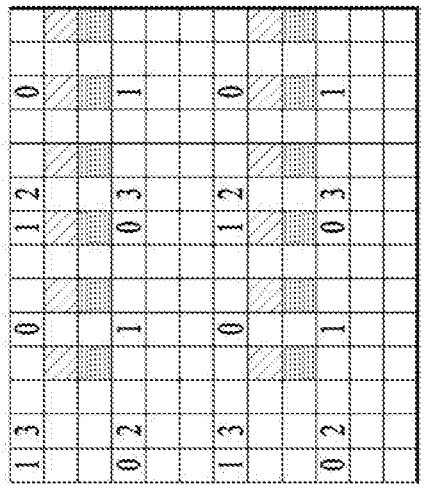
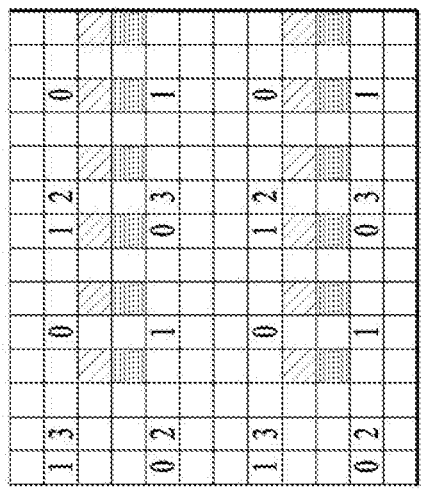
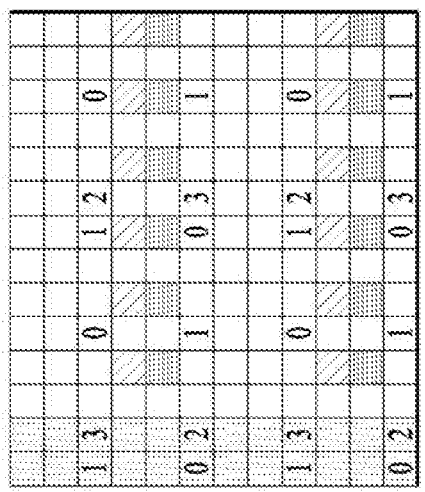

FIG. 36
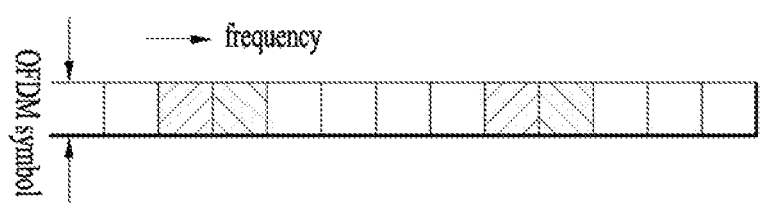
(a)
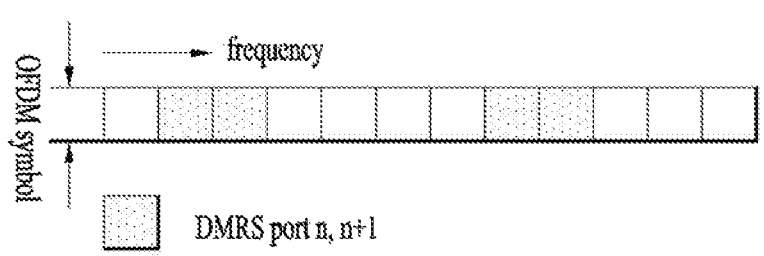
(b)

METHOD AND USER EQUIPMENT FOR RECEIVING DOWNLINK CHANNEL, AND METHOD AND BASE STATION FOR TRANSMITTING DOWNLINK CHANNEL

CROSS-REFERENCE TO RELATED APPLICATIONS

This application is a continuation of U.S. patent application Ser. No. 15/374,737, filed on Dec. 9, 2016, now U.S. Pat. No. 10,313,168, which claims the benefit of U.S. Provisional Patent Application Nos. 62/266,000, filed on Dec. 11, 2015, 62/335,653, filed on May 12, 2016, 62/335,703, filed on May 13, 2016, 62/401,935, filed on Sep. 30, 2016 and 62/405,216, filed on Oct. 6, 2016, the contents of which are all hereby incorporated by reference herein in their entirety

TECHNICAL FIELD

The present invention relates to a wireless communication system, and more particularly, to a method and apparatus for transmitting/receiving a downlink signal.

BACKGROUND ART

With appearance and spread of machine-to-machine (M2M) communication and a variety of devices such as smartphones and tablet PCs and technology demanding a large amount of data transmission, data throughput needed in a cellular network has rapidly increased. To satisfy such rapidly increasing data throughput, carrier aggregation technology, cognitive radio technology, etc. for efficiently employing more frequency bands and multiple input multiple output (MIMO) technology, multi-base station (BS) cooperation technology, etc. for raising data capacity transmitted on limited frequency resources have been developed.

A general wireless communication system performs data transmission/reception through one downlink (DL) band and through one uplink (UL) band corresponding to the DL band (in case of a frequency division duplex (FDD) mode), or divides a prescribed radio frame into a UL time unit and a DL time unit in the time domain and then performs data transmission/reception through the UL/DL time unit (in case of a time division duplex (TDD) mode). A base station (BS) and a user equipment (UE) transmit and receive data and/or control information scheduled on a prescribed time unit basis, e.g. on a subframe basis. The data is transmitted and received through a data region configured in a UL/DL subframe and the control information is transmitted and received through a control region configured in the UL/DL subframe. To this end, various physical channels carrying radio signals are formed in the UL/DL subframe. In contrast, carrier aggregation technology serves to use a wider UL/DL bandwidth by aggregating a plurality of UL/DL frequency blocks in order to use a broader frequency band so that more signals relative to signals when a single carrier is used can be simultaneously processed.

In addition, a communication environment has evolved into increasing density of nodes accessible by a user at the periphery of the nodes. A node refers to a fixed point capable of transmitting/receiving a radio signal to/from the UE through one or more antennas. A communication system including high-density nodes may provide a better communication service to the UE through cooperation between the nodes.

Technical Problem

Due to introduction of new radio communication technology, the number of user equipments (UEs) to which a BS should provide a service in a prescribed resource region increases and the amount of data and control information that the BS should transmit to the UEs increases. Since the amount of resources available to the BS for communication with the UE(s) is limited, a new method in which the BS efficiently receives/transmits uplink/downlink data and/or uplink/downlink control information using the limited radio resources is needed.

With development of technologies, overcoming delay or latency has become an important challenge. Applications whose performance critically depends on delay/latency are increasing. Accordingly, a method to reduce delay/latency compared to the legacy system is demanded.

Also, with development of smart devices, a new scheme for efficiently transmitting/receiving a small amount of data or efficiently transmitting/receiving data occurring at a low frequency is required.

The technical objects that can be achieved through the present invention are not limited to what has been particularly described hereinabove and other technical objects not described herein will be more clearly understood by persons skilled in the art from the following detailed description.

SUMMARY

A downlink control channel and a downlink data channel corresponding to the downlink control channel may be transmitted/received within a transmission time interval (ITT). A reference signal (RS) of one antenna port to be used for transmission of both the downlink control channel and the downlink data channel is transmitted/received within an OFDM symbol having the downlink control channel among the OFDM symbols of the TTI, and the RS of an antenna port used only for transmission of the downlink data channel is transmitted within the remaining OFDM symbol(s) of the TTI.

To achieve these objects and other advantages and in accordance with the purpose of the invention, as embodied and broadly described herein, a method of receiving a downlink channel at a user equipment is provided. The method may include receiving a first downlink control channel from a first antenna port within at least one OFDM symbol of a first transmission time interval (TTI), receiving a first downlink data channel corresponding to the first downlink control channel from the first antenna port and a second antenna port within remaining OFDM symbols of the first TTI, receiving a first demodulation signal (DMRS) for the first antenna port and a second DMRS for the second antenna port within the first TTI, and demodulating the first downlink control channel based on the first DMRS and demodulating the first downlink data channel based on the first and second DMRSs. The first TTI may be configured in a default TTI. The first TTI may be shorter than the default TTI. The first DMRS may be received within the at least one OFDM symbol having the first downlink control channel. The second DMRS may be received within the remaining OFDM symbols.

In another aspect of the present invention, a method of transmitting a downlink signal to a user equipment at a base station is provided. The method may include transmitting a first downlink control channel through a first antenna port within at least one OFDM symbol of a first transmission time interval (TTI), transmitting a first downlink data channel corresponding to the first downlink control channel through the first antenna port and a second antenna port within remaining OFDM symbols of the first TTI, and transmitting a first demodulation signal (DMRS) for the first antenna port and a second DMRS for the second antenna port within the first TTI. The first TTI may be configured in a default TTI, and is shorter than the default TTI. The first DMRS may be transmitted within the at least one OFDM symbol having the first downlink control channel. The second DMRS may be transmitted within the remaining OFDM symbols.

In another aspect of the present invention, a user equipment for receiving a downlink channel is provided. The user equipment includes a radio frequency (RF) unit, and a processor configured to control the RF unit. The processor may be configured to control the RF unit to receive a first downlink control channel from a first antenna port within at least one OFDM symbol of a first transmission time interval (TTI). The processor may be configured to control the RF unit to receive a first downlink data channel corresponding to the first downlink control channel from the first antenna port and a second antenna port within remaining OFDM symbols of the first TTI. The processor may be configured to control the RF unit to receive a first demodulation signal (DMRS) for the first antenna port and a second DMRS for the second antenna port within the first TTI. The processor may be configured to demodulate the first downlink control channel based on the first DMRS and demodulating the first downlink data channel based on the first and second DMRSs. The first TTI may be configured in a default TTI. The first TTI may be shorter than the default TTI. The first DMRS may be received within the at least one OFDM symbol having the first downlink control channel. The second DMRS may be received within the remaining OFDM symbols.

In another aspect of the present invention, a base station for transmitting a downlink signal to a user equipment is provided. The base station includes a radio frequency (RF) unit, and a processor configured to control the RF unit. The processor may be configured to control the RF unit to transmit a first downlink control channel through a first antenna port within at least one OFDM symbol of a first transmission time interval (TTI). The processor may be configured to control the RF unit to transmit a first downlink data channel corresponding to the first downlink control channel through the first antenna port and a second antenna port within remaining OFDM symbols of the first TTI. The processor may be configured to control the RF unit to transmit a first demodulation signal (DMRS) for the first antenna port and a second DMRS for the second antenna port within the first TTI. The first TTI may be configured in a default TTI. The first TTI may be shorter than the default TTI. The first DMRS may be transmitted within the at least one OFDM symbol having the first downlink control channel. The second DMRS may be transmitted within the remaining OFDM symbols.

In each aspect of the present invention, the first TTI may have a time length of 0.5 ms or less, and the default TTI may have a time length of 1 ms.

In each aspect of the present invention, the first TTI may include only orthogonal frequency division multiplexing (OFDM) symbols without a cell-specific reference signal (CRS).

In each aspect of the present invention, a second downlink control channel and a second downlink data channel corresponding to the second downlink control channel may be further transmitted or received in a second TTI including an OFDM symbol with a cell-specific reference signal (CRS), the second TTI being configured in the default TTI. The second downlink control channel and the second downlink data channel may be transmitted or demodulated based on the CRS.

In each aspect of the present invention, the first DMRS and the second DMRS may be present only on a physical resource block having the first downlink control channel or the first downlink data channel among physical resource blocks having the first TTI configured thereon.

According to the present invention, uplink/downlink signals can be efficiently transmitted/received. Therefore, overall throughput of a radio communication system can be improved.

According to one embodiment of the present invention, a low cost/complexity UE can perform communication with a BS at low cost while maintaining compatibility with a legacy system.

According to one embodiment of the present invention, the UE can be implemented at low cost/complexity.

According to one embodiment of the present invention, the UE and the BS can perform communication with each other at a narrowband.

According to an embodiment of the present invention, delay/latency occurring during communication between a user equipment and a base station may be reduced.

According to an embodiment of the present invention, a small amount of data may be efficiently transmitted/received.

BRIEF DESCRIPTION OF THE DRAWING

The accompanying drawings, which are included to provide a further understanding of the invention, illustrate embodiments of the invention and together with the description serve to explain the principle of the invention.

FIGS. 13 to 38 illustrate RS structures according to an embodiment of the present invention.

DETAILED DESCRIPTION

Figure 1:
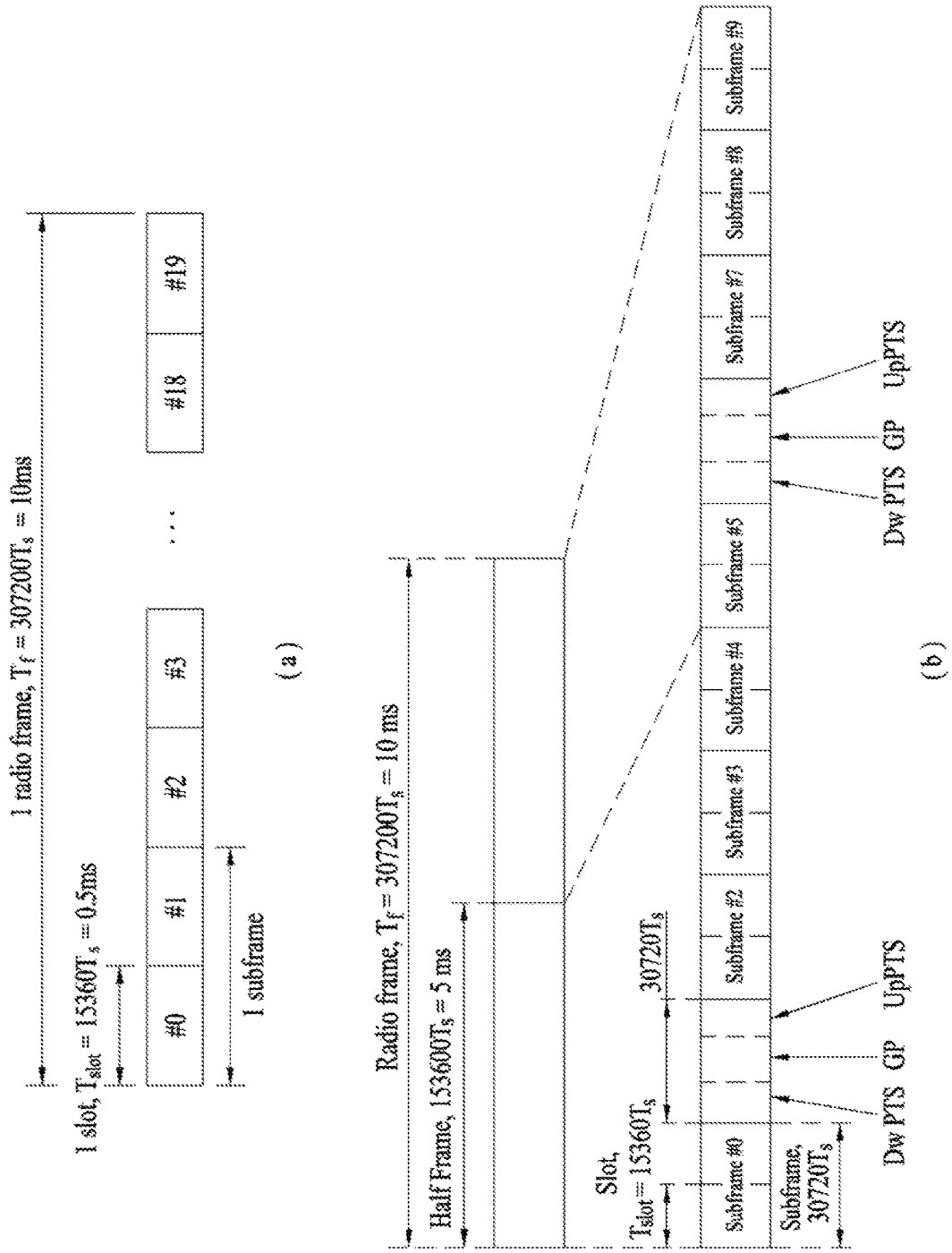
FIG. 1 illustrates the structure of a radio frame used in a wireless communication system.

Reference will now be made in detail to the exemplary embodiments of the present invention, examples of which are illustrated in the accompanying drawings. The detailed description, which will be given below with reference to the accompanying drawings, is intended to explain exemplary embodiments of the present invention, rather than to show the only embodiments that can be implemented according to the invention. The following detailed description includes specific details in order to provide a thorough understanding of the present invention. However, it will be apparent to those skilled in the art that the present invention may be practiced without such specific details.

In some instances, known structures and devices are omitted or are shown in block diagram form, focusing on important features of the structures and devices, so as not to obscure the concept of the present invention. The same reference numbers will be used throughout this specification to refer to the same or like parts.

The following techniques, apparatuses, and systems may be applied to a variety of wireless multiple access systems. Examples of the multiple access systems include a code division multiple access (CDMA) system, a frequency division multiple access (FDMA) system, a time division multiple access (TDMA) system, an orthogonal frequency division multiple access (OFDMA) system, a single carrier frequency division multiple access (SC-FDMA) system, and a multicarrier frequency division multiple access (MC-FDMA) system. CDMA may be embodied through radio technology such as universal terrestrial radio access (UTRA) or CDMA2000. TDMA may be embodied through radio technology such as global system for mobile communications (GSM), general packet radio service (GPRS), or enhanced data rates for GSM evolution (EDGE). OFDMA may be embodied through radio technology such as institute of electrical and electronics engineers (IEEE) 802.11 (Wi-Fi), IEEE 802.16 (WiMAX), IEEE 802.20, or evolved UTRA (E-UTRA). UTRA is a part of a universal mobile telecommunications system (UMTS). 3rd generation partnership project (3GPP) long term evolution (LTE) is a part of evolved UMTS (E-UMTS) using E-UTRA. 3GPP LTE employs OFDMA in DL and SC-FDMA in UL. LTE-advanced (LTE-A) is an evolved version of 3GPP LTE. For convenience of description, it is assumed that the present invention is applied to 3GPP LTE/LTE-A. However, the technical features of the present invention are not limited thereto. For example, although the following detailed description is given based on a mobile communication system corresponding to a 3GPP LTE/LTE-A system, aspects of the present invention that are not specific to 3GPP LTE/LTE-A are applicable to other mobile communication systems.

For example, the present invention is applicable to contention based communication such as Wi-Fi as well as non-contention based communication as in the 3GPP LTE/LTE-A system in which an eNB allocates a DL/UL time/frequency resource to a UE and the UE receives a DL signal and transmits a UL signal according to resource allocation of the eNB. In a non-contention based communication scheme, an access point (AP) or a control node for controlling the AP allocates a resource for communication between the UE and the AP, whereas, in a contention based communication scheme, a communication resource is occupied through contention between UEs which desire to access the AP. The contention based communication scheme will now be described in brief. One type of the contention based communication scheme is carrier sense multiple access (CSMA). CSMA refers to a probabilistic media access control (MAC) protocol for confirming, before a node or a communication device transmits traffic on a shared transmission medium (also called a shared channel) such as a frequency band, that there is no other traffic on the same shared transmission medium. In CSMA, a transmitting device determines whether another transmission is being performed before attempting to transmit traffic to a receiving device. In other words, the transmitting device attempts to detect presence of a carrier from another transmitting device before attempting to perform transmission. Upon sensing the carrier, the transmitting device waits for another transmission device which is performing transmission to finish transmission, before performing transmission thereof. Consequently, CSMA can be a communication scheme based on the principle of "sense before transmit" or "listen before talk". A scheme for avoiding collision between transmitting devices in the contention based communication system using CSMA includes carrier sense multiple access with collision detection (CSMA/CD) and/or carrier sense multiple access with collision avoidance (CSMA/CA). CSMA/CD is a collision detection scheme in a wired local area network (LAN) environment. In CSMA/CD, a personal computer (PC) or a server which desires to perform communication in an Ethernet environment first confirms whether communication occurs on a network and, if another device carries data on the network, the PC or the server waits and then transmits data. That is, when two or more users (e.g. PCs, UEs, etc.) simultaneously transmit data, collision occurs between simultaneous transmission and CSMA/CD is a scheme for flexibly transmitting data by monitoring collision. A transmitting device using CSMA/CD adjusts data transmission thereof by sensing data transmission performed by another device using a specific rule. CSMA/CA is a MAC protocol specified in IEEE 802.11 standards. A wireless LAN (WLAN) system conforming to IEEE 802.11 standards does not use CSMA/CD which has been used in IEEE 802.3 standards and uses CA, i.e. a collision avoidance scheme. Transmission devices always sense carrier of a network and, if the network is empty, the transmission devices wait for determined time according to locations thereof registered in a list and then transmit data. Various methods are used to determine priority of the transmission devices in the list and to reconfigure priority. In a system according to some versions of IEEE 802.11 standards, collision may occur and, in this case, a collision sensing procedure is performed. A transmission device using CSMA/CA avoids collision between data transmission thereof and data transmission of another transmission device using a specific rule.

In the present invention, a user equipment (UE) may be a fixed or mobile device. Examples of the UE include various devices that transmit and receive user data and/or various kinds of control information to and from a base station (BS). The UE may be referred to as a terminal equipment (TE), a mobile station (MS), a mobile terminal (MT), a user terminal (UT), a subscriber station (SS), a wireless device, a personal digital assistant (PDA), a wireless modem, a handheld device, etc. In addition, in the present invention, a BS generally refers to a fixed station that performs communication with a UE and/or another BS, and exchanges various kinds of data and control information with the UE and another BS. The BS may be referred to as an advanced base station (ABS), a node-B (NB), an evolved node-B (eNB), a base transceiver system (BTS), an access point (AP), a processing server (PS), etc. In describing the present invention, a BS will be referred to as an eNB.

In the present invention, a node refers to a fixed point capable of transmitting/receiving a radio signal through communication with a UE. Various types of eNBs may be used as nodes irrespective of the terms thereof. For example, a BS, a node B (NB), an e-node B (eNB), a pico-cell eNB (PeNB), a home eNB (HeNB), a relay, a repeater, etc. may be a node. In addition, the node may not be an eNB. For example, the node may be a radio remote head (RRH) or a radio remote unit (RRU). The RRH or RRU generally has a lower power level than a power level of an eNB. Since the RRH or RRU (hereinafter, RRH/RRU) is generally connected to the eNB through a dedicated line such as an optical cable, cooperative communication between RRH/RRU and the eNB can be smoothly performed in comparison with cooperative communication between eNBs connected by a radio line. At least one antenna is installed per node. The antenna may mean a physical antenna or mean an antenna port or a virtual antenna.

In the present invention, a cell refers to a prescribed geographical area to which one or more nodes provide a communication service. Accordingly, in the present invention, communicating with a specific cell may mean communicating with an eNB or a node which provides a communication service to the specific cell. In addition, a DL/UL signal of a specific cell refers to a DL/UL signal from/to an eNB or a node which provides a communication service to the specific cell. A node providing UL/DL communication services to a UE is called a serving node and a cell to which UL/DL communication services are provided by the serving node is especially called a serving cell. Furthermore, channel status/quality of a specific cell refers to channel status/quality of a channel or communication link formed between an eNB or node which provides a communication service to the specific cell and a UE. The UE may measure DL channel state received from a specific node using cell-specific reference signal(s) (CRS(s)) transmitted on a CRS resource and/or channel state information reference signal(s) (CSI-RS(s)) transmitted on a CSI-RS resource, allocated by antenna port(s) of the specific node to the specific node. Detailed CSI-RS configuration may be understood with reference to 3GPP TS 36.211 and 3GPP TS 36.331 documents.

Meanwhile, a 3GPP LTE/LTE-A system uses the concept of a cell in order to manage radio resources and a cell associated with the radio resources is distinguished from a cell of a geographic region.

A "cell" of a geographic region may be understood as coverage within which a node can provide service using a carrier and a "cell" of a radio resource is associated with bandwidth (BW) which is a frequency range configured by the carrier. Since DL coverage, which is a range within which the node is capable of transmitting a valid signal, and UL coverage, which is a range within which the node is capable of receiving the valid signal from the UE, depends upon a carrier carrying the signal, the coverage of the node may be associated with coverage of the "cell" of a radio resource used by the node. Accordingly, the term "cell" may be used to indicate service coverage of the node sometimes, a radio resource at other times, or a range that a signal using a radio resource can reach with valid strength at other times. The "cell" of the radio resource will be described later in more detail.

3GPP LTE/LTE-A standards define DL physical channels corresponding to resource elements carrying information derived from a higher layer and DL physical signals corresponding to resource elements which are used by a physical layer but which do not carry information derived from a higher layer. For example, a physical downlink shared channel (PDSCH), a physical broadcast channel (PBCH), a physical multicast channel (PMCH), a physical control format indicator channel (PCFICH), a physical downlink control channel (PDCCH), and a physical hybrid ARQ indicator channel (PHICH) are defined as the DL physical channels, and a reference signal and a synchronization signal are defined as the DL physical signals. A reference signal (RS), also called a pilot, refers to a special waveform of a predefined signal known to both a BS and a UE. For example, a cell-specific RS (CRS), a UE-specific RS (UE-RS), a positioning RS (PRS), and channel state information RS (CSI-RS) may be defined as DL RSs. Meanwhile, the 3GPP LTE/LTE-A standards define UL physical channels corresponding to resource elements carrying information derived from a higher layer and UL physical signals corresponding to resource elements which are used by a physical layer but which do not carry information derived from a higher layer. For example, a physical uplink shared channel (PUSCH), a physical uplink control channel (PUCCH), and a physical random access channel (PRACH) are defined as the UL physical channels, and a demodulation reference signal (DM RS) for a UL control/data signal and a sounding reference signal (SRS) used for UL channel measurement are defined as the UL physical signals.

In the present invention, a physical downlink control channel (PDCCH), a physical control format indicator channel (PCFICH), a physical hybrid automatic retransmit request indicator channel (PHICH), and a physical downlink shared channel (PDSCH) refer to a set of time-frequency resources or resource elements (REs) carrying downlink control information (DCI), a set of time-frequency resources or REs carrying a control format indicator (CFI), a set of time-frequency resources or REs carrying downlink acknowledgement (ACK)/negative ACK (HACK), and a set of time-frequency resources or REs carrying downlink data, respectively. In addition, a physical uplink control channel (PUCCH), a physical uplink shared channel (PUSCH) and a physical random access channel (PRACH) refer to a set of time-frequency resources or REs carrying uplink control information (UCI), a set of time-frequency resources or REs carrying uplink data and a set of time-frequency resources or REs carrying random access signals, respectively. In the present invention, in particular, a time-frequency resource or RE that is assigned to or belongs to PDCCH/PCFICH/PHICH/PDSCH/PUCCH/PUSCH/PRACH is referred to as PDCCH/PCFICH/PHICH/PDSCH/PUCCH/PUSCH/PRACH RE or PDCCH/PCFICH/PHICH/PDSCH/PUCCH/PUSCH/PRACH time-frequency resource, respectively. Therefore, in the present invention, PUCCH/PUSCH/PRACH transmission of a UE is conceptually identical to UCI/uplink data/random access signal transmission on PUSCH/PUCCH/PRACH, respectively. In addition, PDCCH/PCFICH/PHICH/PDSCH transmission of an eNB is conceptually identical to downlink data/DCI transmission on PDCCH/PCFICH/PHICH/PDSCH, respectively.

Hereinafter, OFDM symbol/subcarrier/RE to or for which CRS/DMRS/CSI-RS/SRS/UE-RS/TRS is assigned or configured will be referred to as CRS/DMRS/CSI-RS/SRS/UE-RS/TRS symbol/carrier/subcarrier/RE. For example, an OFDM symbol to or for which a tracking RS (TRS) is assigned or configured is referred to as a TRS symbol, a subcarrier to or for which the TRS is assigned or configured is referred to as a TRS subcarrier, and an RE to or for which the TRS is assigned or configured is referred to as a TRS RE. In addition, a subframe configured for transmission of the TRS is referred to as a TRS subframe. Moreover, a subframe in which a broadcast signal is transmitted is referred to as a broadcast subframe or a PBCH subframe and a subframe in which a synchronization signal (e.g. PSS and/or SSS) is transmitted is referred to a synchronization signal subframe or a PSS/SSS subframe. OFDM symbol/subcarrier/RE to or for which PSS/SSS is assigned or configured is referred to as PSS/SSS symbol/subcarrier/RE, respectively.

In the present invention, a CRS port, a UE-RS port, a CSI-RS port, and a TRS port refer to an antenna port configured to transmit a CRS, an antenna port configured to transmit a UE-RS, an antenna port configured to transmit a CSI-RS, and an antenna port configured to transmit a TRS, respectively. Antenna ports configured to transmit CRSs may be distinguished from each other by the locations of REs occupied by the CRSs according to CRS ports, antenna ports configured to transmit UE-RSs may be distinguished from each other by the locations of REs occupied by the UE-RSs according to UE-RS ports, and antenna ports configured to transmit CSI-RSs may be distinguished from each other by the locations of REs occupied by the CSI-RSs according to CSI-RS ports. Therefore, the term CRS/UE-RS/CSI-RS/TRS ports may also be used to indicate a pattern of REs occupied by CRSs/UE-RSs/CSI-RSs/TRSs in a predetermined resource region. In the present invention, both a DMRS and a UE-RS refer to RSs for demodulation and, therefore, the terms DMRS and UE-RS are used to refer to RSs for demodulation.

For terms and technologies which are not specifically described among the terms of and technologies employed in this specification, 3GPP LTE/LTE-A standard documents, for example, 3GPP TS 36.211, 3GPP TS 36.212, 3GPP TS 36.213, 3GPP TS 36.321 and 3GPP TS 36.331 may be referenced.

FIG. 1 illustrates the structure of a radio frame used in a wireless communication system.

Specifically, FIG. 1(a) illustrates an exemplary structure of a radio frame which can be used in frequency division multiplexing (FDD) in 3GPP LTE/LTE-A and FIG. 1(b) illustrates an exemplary structure of a radio frame which can be used in time division multiplexing (TDD) in 3GPP LTE/LTE-A.

Referring to FIG. 1, a 3GPP LTE/LTE-A radio frame is 10 ms ($307,200T_s$) in duration. The radio frame is divided into 10 subframes of equal size. Subframe numbers may be assigned to the 10 subframes within one radio frame, respectively. Here, $T_s$ denotes sampling time where $T_s=1/(2048*15$ kHz). Each subframe is 1 ms long and is further divided into two slots. 20 slots are sequentially numbered from 0 to 19 in one radio frame. Duration of each slot is 0.5 ms. A time interval in which one subframe is transmitted is defined as a transmission time interval (TTI). Time resources may be distinguished by a radio frame number (or radio frame index), a subframe number (or subframe index), a slot number (or slot index), and the like.

A TTI refers to an interval at which data may be scheduled. For example, referring to FIGS. 1 and 3, the transmission opportunity of a UL grant or DL grant is given every 1 ms in the current LTE/LTE-A system. The UL/DL grant opportunity is not given several times within a time shorter than 1 ms. Accordingly, the TTI is 1 ms in the current LTE-LTE-A system.

A radio frame may have different configurations according to duplex modes. In FDD mode for example, since DL transmission and UL transmission are discriminated according to frequency, a radio frame for a specific frequency band operating on a carrier frequency includes either DL subframes or UL subframes. In TDD mode, since DL transmission and UL transmission are discriminated according to time, a radio frame for a specific frequency band operating on a carrier frequency includes both DL subframes and UL subframes.

TABLE 1 shows an exemplary UL-DL configuration within a radio frame in TDD mode.

TABLE 1

| Uplink-downlink config-uration | Downlink-to-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

In TABLE 1, D denotes a DL subframe, U denotes a UL subframe, and S denotes a special subframe. The special subframe includes three fields, i.e. downlink pilot time slot (DwPTS), guard period (GP), and uplink pilot time slot (UpPTS). DwPTS is a time slot reserved for DL transmission and UpPTS is a time slot reserved for UL transmission. TABLE 2 shows an example of the special subframe configuration.

TABLE 2

| | Normal cyclic prefix in downlink | | | Extended cyclic prefix in downlink | | |
|---|---|---|---|---|---|---|
| | | UpPTS | | | UpPTS | |
| Special subframe configuration | DwPTS | Normal cyclic prefix in uplink | Extended cyclic prefix in uplink | DwPTS | Normal cyclic prefix in uplink | Extended cyclic prefix in uplink |
| 0 | $6592 \cdot T_s$ | $2192 \cdot T_s$ | $2560 \cdot T_s$ | $7680 \cdot T_s$ | $2192 \cdot T_s$ | $2560 \cdot T_s$ |
| 1 | $19760 \cdot T_s$ | | | $20480 \cdot T_s$ | | |
| 2 | $21952 \cdot T_s$ | | | $23040 \cdot T_s$ | | |
| 3 | $24144 \cdot T_s$ | | | $25600 \cdot T_s$ | | |
| 4 | $26336 \cdot T_s$ | | | $7680 \cdot T_s$ | $4384 \cdot T_s$ | $5120 \cdot T_s$ |
| 5 | $6592 \cdot T_s$ | $4384 \cdot T_s$ | $5120 \cdot T_s$ | $20480 \cdot T_s$ | | |
| 6 | $19760 \cdot T_s$ | | | $23040 \cdot T_s$ | | |
| 7 | $21952 \cdot T_s$ | | | $12800 \cdot T_s$ | | |
| 8 | $24144 \cdot T_s$ | | | — | — | — |
| 9 | $13168 \cdot T_s$ | | | — | | |

Figure 2:
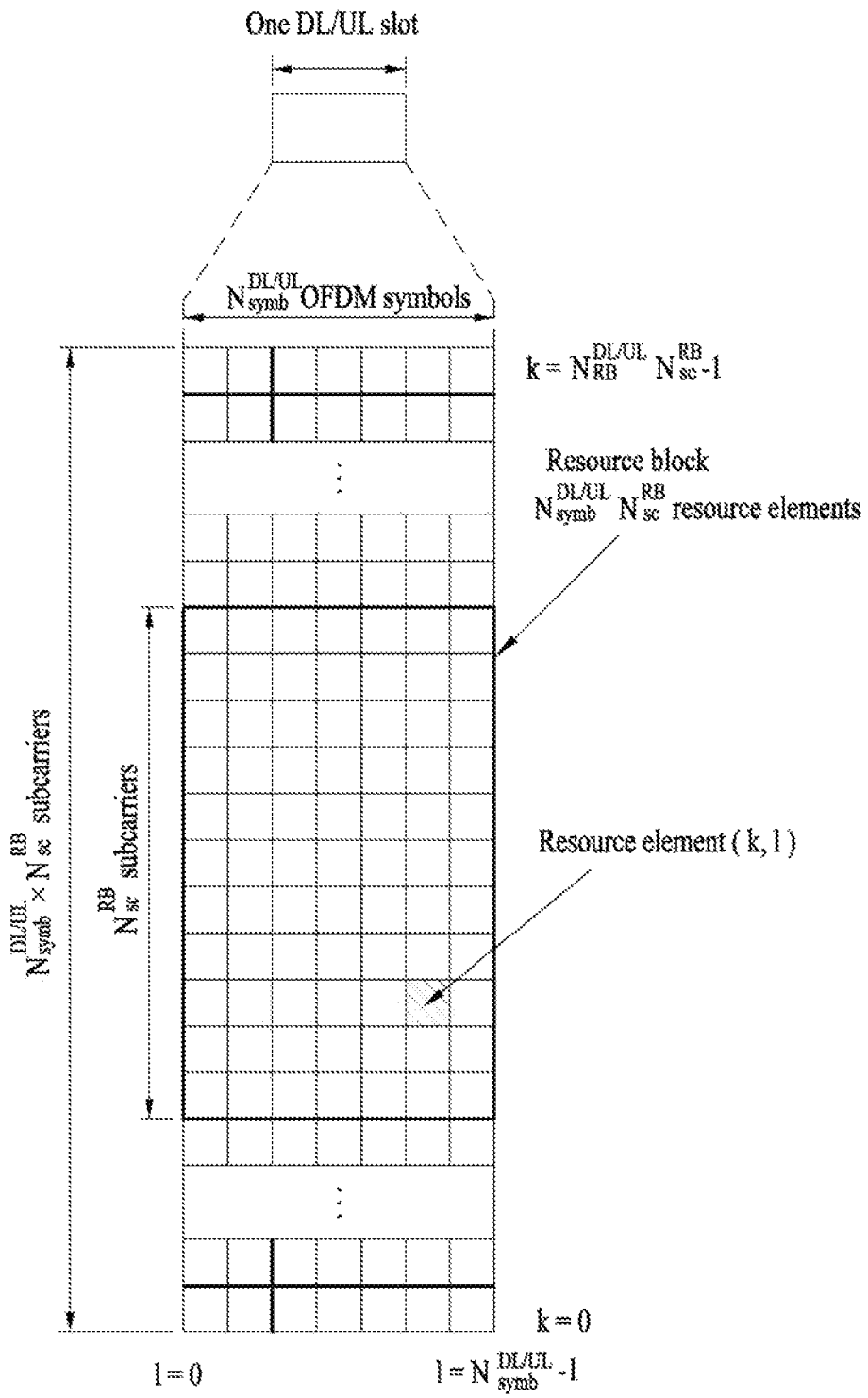
FIG. 2 illustrates the structure of a downlink (DL)/uplink (UL) slot in a wireless communication system.

FIG. 2 illustrates the structure of a DL/UL slot structure in a wireless communication system.

Referring to FIG. 2, a slot includes a plurality of orthogonal frequency division multiplexing (OFDM) symbols in the time domain and includes a plurality of resource blocks (RBs) in the frequency domain. The OFDM symbol may refer to one symbol duration. Referring to FIG. 2, a signal transmitted in each slot may be expressed by a resource grid including $N^{DL/UL}_{RB} * N^{RB}_{sc}$ subcarriers and $N^{DL/UL}_{symb}$ OFDM symbols. $N^{DL}_{RB}$ denotes the number of RBs in a DL slot and $N^{UL}_{RB}$ denotes the number of RBs in a UL slot. $N^{DL}_{RB}$ and $N^{UL}_{RB}$ depend on a DL transmission bandwidth and a UL transmission bandwidth, respectively. $N^{DL}_{symb}$ denotes the number of OFDM symbols in a DL slot, $N^{UL}_{symb}$ denotes the number of OFDM symbols in a UL slot, and $N^{RB}_{sc}$ denotes the number of subcarriers configuring one RB.

An OFDM symbol may be referred to as an OFDM symbol, a single carrier frequency division multiplexing (SC-FDM) symbol, etc. according to multiple access schemes. The number of OFDM symbols included in one slot may be varied according to channel bandwidths and CP lengths. For example, in a normal cyclic prefix (CP) case, one slot includes 7 OFDM symbols. In an extended CP case, one slot includes 6 OFDM symbols. Although one slot of a subframe including 7 OFDM symbols is shown in FIG. 2 for convenience of description, embodiments of the present invention are similarly applicable to subframes having a different number of OFDM symbols. Referring to FIG. 2, each OFDM symbol includes $N^{DL/UL}_{RB} * N^{RB}_{sc}$ subcarriers in the frequency domain. The type of the subcarrier may be divided into a data subcarrier for data transmission, a reference signal (RS) subcarrier for RS transmission, and a null subcarrier for a guard band and a DC component. The null subcarrier for the DC component is unused and is mapped to a carrier frequency $f_0$ in a process of generating an OFDM signal or in a frequency up-conversion process. The carrier frequency is also called a center frequency $f_c$.

One RB is defined as $N^{DL/UL}_{symb}$ (e.g. 7) consecutive OFDM symbols in the time domain and as $N^{RB}_{sc}$ (e.g. 12) consecutive subcarriers in the frequency domain. For reference, a resource composed of one OFDM symbol and one subcarrier is referred to as a resource element (RE) or tone. Accordingly, one RB includes $N^{DL/UL}_{symb} * N^{RB}_{sc}$ REs. Each RE within a resource grid may be uniquely defined by an index pair (k, l) within one slot. k is an index ranging from 0 to $N^{DL/UL}_{RB} * N^{RB}_{sc}-1$ in the frequency domain, and l is an index ranging from 0 to $N^{DL/UL}_{symb}-1$ in the time domain.

Meanwhile, one RB is mapped to one physical resource block (PRB) and one virtual resource block (VRB). A PRB is defined as $N^{DL}_{symb}$ (e.g. 7) consecutive OFDM or SC-FDM symbols in the time domain and $N^{RB}_{sc}$ (e.g. 12) consecutive subcarriers in the frequency domain. Accordingly, one PRB is configured with $N^{DL/UL}_{symb} * N^{RB}_{sc}$ REs. In one subframe, two RBs each located in two slots of the subframe while occupying the same $N^{RB}_{sc}$ consecutive subcarriers are referred to as a physical resource block (PRB) pair. Two RBs configuring a PRB pair have the same PRB number (or the same PRB index).

Figure 3:
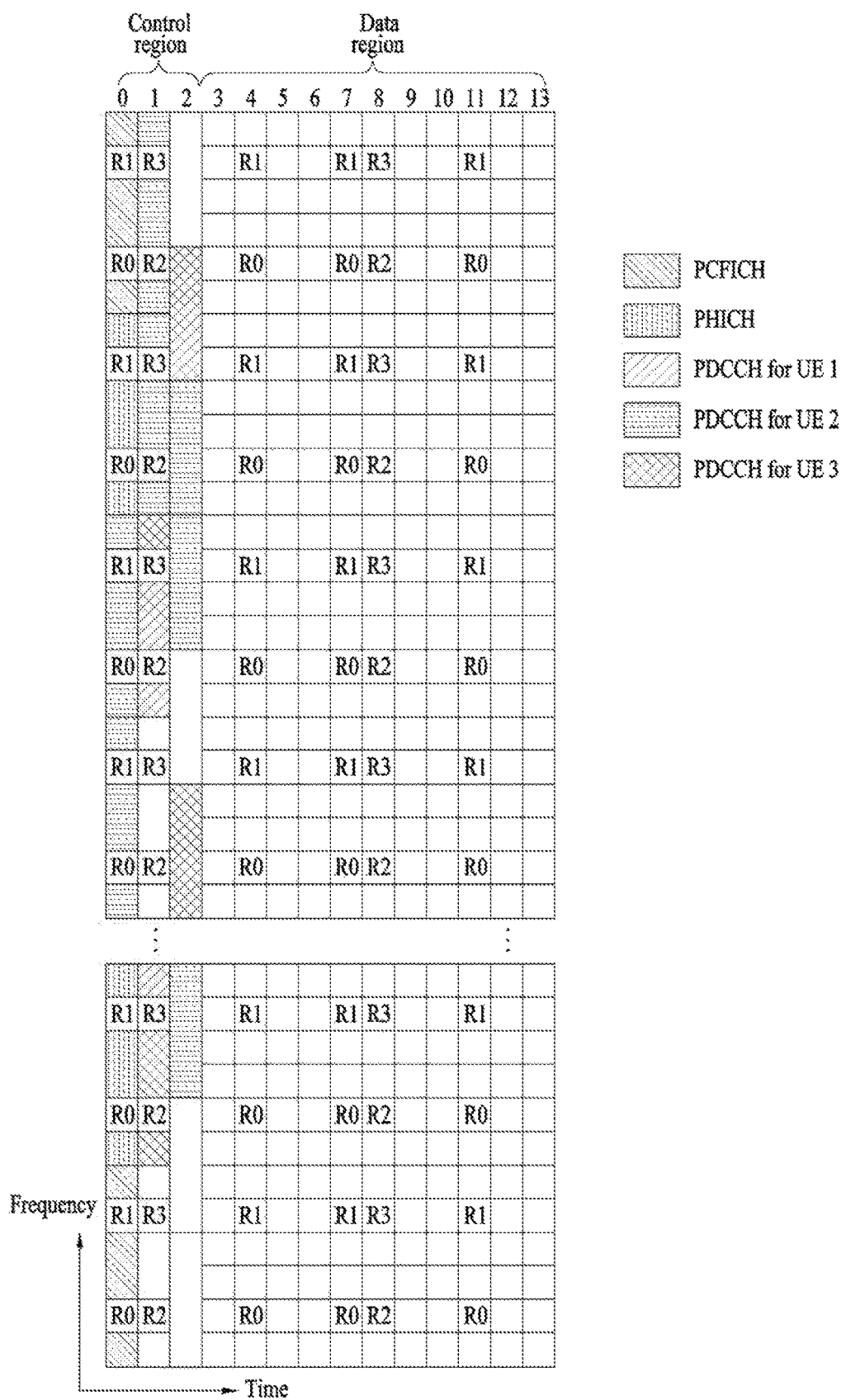
FIG. 3 illustrates the structure of a DL subframe used in a wireless communication system.

FIG. 3 illustrates the structure of a DL subframe used in a wireless communication system.

Referring to FIG. 3, a DL subframe is divided into a control region and a data region in the time domain. Referring to FIG. 3, a maximum of 3 (or 4) OFDM symbols located in a front part of a first slot of a subframe corresponds to the control region. Hereinafter, a resource region for PDCCH transmission in a DL subframe is referred to as a PDCCH region. OFDM symbols other than the OFDM symbol(s) used in the control region correspond to the data region to which a physical downlink shared channel (PDSCH) is allocated. Hereinafter, a resource region available for PDSCH transmission in the DL subframe is referred to as a PDSCH region.

Examples of a DL control channel used in 3GPP LTE include a physical control format indicator channel (PCFICH), a physical downlink control channel (PDCCH), a physical hybrid ARQ indicator channel (PHICH), etc.

The PCFICH is transmitted in the first OFDM symbol of a subframe and carries information about the number of OFDM symbols available for transmission of a control channel within a subframe. The PCFICH notifies the UE of the number of OFDM symbols used for the corresponding subframe every subframe. The PCFICH is located at the first OFDM symbol. The PCFICH is configured by four resource element groups (REGs), each of which is distributed within a control region on the basis of cell ID. One REG includes four REs. A set of OFDM symbols available for the PDCCH at a subframe is given by the following Table.

TABLE 3

| Subframe | Number of OFDM symbols for PDCCH when $N^{DL}_{RB} > 10$ | Number of OFDM symbols for PDCCH when $N^{DL}_{RB} \leq 10$ |
|---|---|---|
| Subframe 1 and 6 for frame structure type 2 | 1, 2 | 2 |
| MBSFN subframes on a carrier supporting PDSCH, configured with 1 or 2 cell-specfic antenna ports | 1, 2 | 2 |
| MBSFN subframes on a carrier supporting PDSCH, configured with 4 cell-specific antenna ports | 2 | 2 |
| Subframes on a carrier not supporting PDSCH | 0 | 0 |
| Non-MBSFN subframes (except subframe 6 for frame structure type 2) configured with positioning reference signals | 1, 2, 3 | 2, 3 |
| All other cases | 1, 2, 3 | 2, 3, 4 |

A subset of downlink subframes within a radio frame on a carrier for supporting PDSCH transmission may be configured as MBSFN subframe(s) by a higher layer. Each MBSFN subframe is divided into a non-MBSFN region and an MBSFN region. The non-MBSFN region spans first one or two OFDM symbols, and its length is given by TABLE 3. The same CP as cyclic prefix (CP) used for subframe 0 is used for transmission within the non-MBSFN region of the MBSFN subframe. The MBSFN region within the MBSFN subframe is defined as OFDM symbols which are not used in the non-MBSFN region.

The PCFICH carries a control format indicator (CFI), which indicates any one of values of 1 to 3. For a downlink system bandwidth $N^{DL}_{RB} > 10$, the number 1, 2 or 3 of OFDM symbols which are spans of DCI carried by the PDCCH is given by the CFI. For a downlink system bandwidth $N^{DL}_{RB} \leq 10$, the number 2, 3 or 4 of OFDM symbols which are spans of DCI carried by the PDCCH is given by CFI+1. The CFI is coded in accordance with the following Table.

TABLE 4

| CFI | CFI code word $<b_0, b_1, \ldots, b_{31}>$ |
|---|---|
| 1 | <0, 1, 1, 0, 1, 1, 0, 1, 1, 0, 1, 1, 0, 1, 1, 0, 1, 1, 0, 1, 1, 0, 1, 1, 0, 1, 1, 0, 1, 1, 0, 1> |
| 2 | <1, 0, 1, 1, 0, 1, 1, 0, 1, 1, 0, 1, 1, 0, 1, 1, 0, 1, 1, 0, 1, 1, 0, 1, 1, 0, 1, 1, 0, 1, 1, 0> |

TABLE 4-continued

| CFI | CFI code word<br><$b_0, b_1, \ldots, b_{31}$> |
|---|---|
| 3 | <1, 1, 0, 1, 1, 0, 1, 1, 0, 1, 1, 1, 0, 1, 1, 1, 0, 1, 1, 0, 1, 1, 0, 1, 1, 0, 1, 1, 1, 0, 1, 1> |
| 4 (Reserved) | <0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0> |

The PHICH carries a HARQ (Hybrid Automatic Repeat Request) ACK/NACK (acknowledgment/negative-acknowledgment) signal as a response to UL transmission. The PHICH includes three REGs, and is scrambled cell-specifically. ACK/NACK is indicated by 1 bit, and the ACK/NACK of 1 bit is repeated three times. Each of the repeated ACK/NACK bits is spread with a spreading factor (SF) 4 or 2 and then mapped into a control region.

The control information transmitted through the PDCCH will be referred to as downlink control information (DCI). The DCI includes resource allocation information for a UE or UE group and other control information. Transmit format and resource allocation information of a downlink shared channel (DL-SCH) are referred to as DL scheduling information or DL grant. Transmit format and resource allocation information of an uplink shared channel (UL-SCH) are referred to as UL scheduling information or UL grant. The size and usage of the DCI carried by one PDCCH are varied depending on DCI formats. The size of the DCI may be varied depending on a coding rate. In the current 3GPP LTE system, various formats are defined, wherein formats 0 and 4 are defined for a UL, and formats 1, 1A, 1B, 1C, 1D, 2, 2A, 2B, 2C, 3 and 3A are defined for a DL. Combination selected from control information such as a hopping flag, RB allocation, modulation coding scheme (MCS), redundancy version (RV), new data indicator (NDI), transmit power control (TPC), cyclic shift, cyclic shift demodulation reference signal (DM RS), UL index, channel quality information (CQI) request, DL assignment index, HARQ process number, transmitted precoding matrix indicator (TPMI), precoding matrix indicator (PMI) information is transmitted to the UE as the DCI. The following table shows examples of DCI formats.

TABLE 5

| DCI format | Description |
|---|---|
| 0 | Resource grants for the PUSCH transmissions (uplink) |
| 1 | Resource assignments for single codeword PDSCH transmissions |
| 1A | Compact signaling of resource assignments for single codeword PDSCH |
| 1B | Compact signaling of resource assignments for single codeword PDSCH |
| 1C | Very compact resource assignments for PDSCH (e.g. paging/broadcast system information) |
| 1D | Compact resource assignments for PDSCH using multi-user MIMO |
| 2 | Resource assignments for PDSCH for closed-loop MIMO operation |
| 2A | Resource assignments for PDSCH for open-loop MIMO operation |
| 2B | Resource assignments for PDSCH using up to 2 antenna ports with UE-specific reference signals |
| 2C | Resource assignment for PDSCH using up to 8 antenna ports with UE-specific reference signals |
| 3/3A | Power control commands for PUCCH and PUSCH with 2-bit/1-bit power adjustments |
| 4 | Scheduling of PUSCH in one UL Component Carrier with multi-antenna port transmission mode |

Other DCI formats in addition to the DCI formats defined in TABLE 5 may be defined.

A plurality of PDCCHs may be transmitted within a control region. A UE may monitor the plurality of PDCCHs. An eNB determines a DCI format depending on the DCI to be transmitted to the UE, and attaches cyclic redundancy check (CRC) to the DCI. The CRC is masked (or scrambled) with an identifier (for example, a radio network temporary identifier (RNTI)) depending on usage of the PDCCH or owner of the PDCCH. For example, if the PDCCH is for a specific UE, the CRC may be masked with an identifier (for example, cell-RNTI (C-RNTI)) of the corresponding UE. If the PDCCH is for a paging message, the CRC may be masked with a paging identifier (for example, paging-RNTI (P-RNTI)). If the PDCCH is for system information (in more detail, system information block (SIB)), the CRC may be masked with system information RNTI (SI-RNTI). If the PDCCH is for a random access response, the CRC may be masked with a random access RNTI (RA-RNTI). For example, CRC masking (or scrambling) includes XOR operation of CRC and RNTI at the bit level.

Generally, a DCI format, which may be transmitted to the UE, is varied depending on a transmission mode configured for the UE. In other words, certain DCI format(s) corresponding to the specific transmission mode not all DCI formats may only be used for the UE configured to a specific transmission mode. The DCI formats that the UE shall monitor depend on the configured transmission mode per each serving cell. TABLE 6 illustrates transmission modes for configuring multi-antenna technology and DCI formats for allowing a UE to perform blind decoding at the corresponding transmission mode. Particularly, TABLE 6 illustrates a relation between PDCCH and PDSCH configured by C-RNTI (Cell RNTI (Radio Network Temporary Identifier))

TABLE 6

| Transmission mode | DCI format | Search Space | Transmission scheme of PDSCH corresponding to PDCCH |
|---|---|---|---|
| Mode 1 | DCI format 1A | Common and UE specific by C-RNTI | Single-antenna port, port 0 |
|  | DCI format 1 | UE specific by C-RNTI | Single-antenna port, port 0 |
| Mode 2 | DCI format 1A | Common and UE specific by C-RNTI | Transmit diversity |
|  | DCI format 1 | UE specific by C-RNTI | Transmit diversity |

TABLE 6-continued

| Transmission mode | DCI format | Search Space | Transmission scheme of PDSCH corresponding to PDCCH |
|---|---|---|---|
| Mode 3 | DCI format 1A | Common and UE specific by C-RNTI | Transmit diversity |
| | DCI format 2A | UE specific by C-RNTI | Large delay CDD or Transmit diversity |
| Mode 4 | DCI format 1A | Common and UE specific by C-RNTI | Transmit diversity |
| | DCI format 2 | UE specific by C-RNTI | Closed-loop spatial multiplexing or Transmit diversity |
| Mode 5 | DCI format 1A | Common and UE specific by C-RNTI | Transmit diversity |
| | DCI format 1D | UE specific by C-RNTI | Multi-user MIMO |
| Mode 6 | DCI format 1A | Common and UE specific by C-RNTI | Transmit diversity |
| | DCI format 1B | UE specific by C-RNTI | Closed-loop spatial multiplexing using a single transmission layer |
| Mode 7 | DCI format 1A | Common and UE specific by C-RNTI | If the number of PBCH antenna ports is one, Single-antenna port, port 0 is used, otherwise Transmit diversity |
| | DCI format 1 | UE specific by C-RNTI | Single-antenna port, port 5 |
| Mode 8 | DCI format 1A | Common and UE specific by C-RNTI | If the number of PBCH antenna ports is one, Single-antenna port, port 0 is used, otherwise Transmit diversity |
| | DCI format 2B | UE specific by C-RNTI | Dual layer transmission, port 7 and 8 or single-antenna port, port 7 or 8 |
| Mode 9 | DCI format 1A | Common and UE specific by C-RNTI | Non-MBSFN subframe: If the number of PBCH antenna ports is one, Single-antenna port, port 0 is used, otherwise Transmit diversity MBSFN subframe: Single-antenna port, port 7 |
| | DCI format 2C | UE specific by C-RNTI | Up to 8 layer transmission, ports 7-14 or single-antenna port, port 7 or 8 |
| Mode 10 | DCI format 1A | Common and UE specific by C-RNTI | Non-MBSFN subframe: If the number of PBCH antenna ports is one, Single-antenna port, port 0 is used, otherwise Transmit diversity MBSFN subframe: Single-antenna port, port 7 |
| | DCI format 2D | UE specific by C-RNTI | Up to 8 layer transmission, ports 7-14 or single-antenna port, port 7 or 8 |

Although transmission modes 1 to 10 are listed in TABLE 6, other transmission modes in addition to the transmission modes defined in TABLE 6 may be defined.

Referring to TABLE 6, a UE configured to a transmission mode 9, for example, tries to decode PDCCH candidates of a UE-specific search space (USS) to a DCI format 1A, and tries to decode PDCCH candidates of a common search space (CSS) and the USS to a DCI format 2C. The UE may decode a PDSCH in accordance with DCI based on the DCI format successfully decoded. If DCI decoding from one of a plurality of PDCCH candidates to the DCI format 1A is successfully performed, the UE may decode the PDSCH by assuming that up to 8 layers from antenna ports 7 to 14 are transmitted thereto through the PDSCH, or may decode the PDSCH by assuming that a single layer from the antenna port 7 or 8 is transmitted thereto through the PDSCH.

For example, a transmission mode is semi-statically configured for the UE to allow the UE to receive a PDSCH which is transmitted according to one of a plurality of predefined transmission modes. The UE attempts to decode the PDCCH using only DCI formats corresponding to the transmission mode thereof. In other words, in order to maintain the computational load of the UE according to an attempt of blind decoding at a level lower than or equal to a certain level, not all DCI formats are simultaneously searched by the UE.

The PDCCH is allocated to first m number of OFDM symbol(s) within a subframe. In this case, m is an integer equal to or greater than 1, and is indicated by the PCFICH.

The PDCCH is transmitted on an aggregation of one or a plurality of continuous control channel elements (CCEs). The CCE is a logic allocation unit used to provide a coding rate based on the status of a radio channel to the PDCCH. The CCE corresponds to a plurality of resource element groups (REGs). For example, each CCE contains 9 REGs, which are distributed across the first 1/2/3 (/4 if needed for a 1.4 MHz channel) OFDM symbols and the system bandwidth through interleaving to enable diversity and to mitigate interference. One REG corresponds to four REs. Four QPSK symbols are mapped to each REG. A resource element (RE) occupied by the reference signal (RS) is not included in the REG. Accordingly, the number of REGs within given OFDM symbols is varied depending on the presence of the RS. The REGs are also used for other downlink control channels (that is, PDFICH and PHICH).

Assuming that the number of REGs not allocated to the PCFICH or the PHICH is $N_{REG}$, the number of available CCEs in a DL subframe for PDCCH(s) in a system is numbered from 0 to $N_{CCE}-1$, where $N_{CCE}=\text{floor}(N_{REG}/9)$. The control region of each serving cell consists of a set of CCEs, numbered from 0 to $N_{CCE,k}-1$, where $N_{CCE,k}$ is the total number of CCEs in the control region of subframe k. A PDCCH consisting of n consecutive CCEs may only start on a CCE fulfilling i mod n=0, where i is the CCE number.

A PDCCH format and the number of DCI bits are determined in accordance with the number of CCEs. The CCEs are numbered and consecutively used. To simplify the decoding process, a PDCCH having a format including n CCEs may be initiated only on CCEs assigned numbers corresponding to multiples of n. The number of CCEs used for transmission of a specific PDCCH is determined by a network or the eNB in accordance with channel status. For example, one CCE may be required for a PDCCH for a UE (for example, adjacent to eNB) having a good downlink channel. However, in case of a PDCCH for a UE (for example, located near the cell edge) having a poor channel, eight CCEs may be required to obtain sufficient robustness. Additionally, a power level of the PDCCH may be adjusted to correspond to a channel status.

In a 3GPP LTE/LTE-A system, a set of CCEs on which a PDCCH can be located for each UE is defined. A CCE set in which the UE can detect a PDCCH thereof is referred to as a PDCCH search space or simply as a search space (SS). An individual resource on which the PDCCH can be transmitted in the SS is called a PDCCH candidate. A set of PDCCH candidates that the UE is to monitor is defined in terms of SSs, where a search space $S^{(L)}_k$ at aggregation level $L \in \{1,2,4,8\}$ is defined by a set of PDCCH candidates. SSs for respective PDCCH formats may have different sizes and a dedicated SS and a common SS are defined. The dedicated SS is a UE-specific SS (USS) and is configured for each individual UE. The common SS (CSS) is configured for a plurality of UEs. The following table shows an example of aggregation levels for defining SS.

TABLE 7

| Type | Search space $S^{(L)}_k$ | | Number of PDCCH candidates $M^{(L)}$ |
|---|---|---|---|
| | Aggregation level L | Size [in CCEs] | |
| UE-specific | 1 | 6 | 6 |
| | 2 | 12 | 6 |
| | 4 | 8 | 2 |
| | 8 | 16 | 2 |
| Common | 4 | 16 | 4 |
| | 8 | 16 | 2 |

For each serving cell on which PDCCH is monitored, the CCEs corresponding to PDCCH candidates m of the search space $S^{(L)}_k$ are configured by "$L*\{(Y_k+m') \mod \text{floor}(N_{CCE,k}/L)\}+i$", where i=0, . . . , L-1. For the common search space m'=m. For the PDCCH UE specific search space, for the serving cell on which PDCCH is monitored, if the monitoring UE is configured with carrier indicator field then m'=m+$M^{(L)}*n_{CI}$ where $n_{CI}$ is the carrier indicator field (CIF) value, else if the monitoring UE is not configured with carrier indicator field then m'=m, where m=0, 1, . . . , $M^{(L)}$-1. $M^{(L)}$ is the number of PDCCH candidates to monitor at aggregation level L in the given search space. The carrier indication field value can be the same as a serving cell index (ServCellIndex). For the common search space, $Y_k$ is set to 0 for the two aggregation levels L=4 and L=8. For the UE-specific search space $S^{(L)}_k$ at aggregation level D, the variable $Y_k$ is defined by "$Y_k=(A \cdot Y_{k-1}) \mod D$", where $Y_{-1}=n_{RNTI} \neq 0$, A=39827, D=65537 and k=floor($n_s/2$). $n_s$ is the slot number within a radio frame.

The eNB transmits an actual PDCCH (DCI) on a PDCCH candidate in a search space and the UE monitors the search space to detect the PDCCH (DCI). Here, monitoring implies attempting to decode each PDCCH in the corresponding SS according to all monitored DCI formats. The UE may detect a PDCCH thereof by monitoring a plurality of PDCCHs. Basically, the UE does not know the location at which a PDCCH thereof is transmitted. Therefore, the UE attempts to decode all PDCCHs of the corresponding DCI format for each subframe until a PDCCH having an ID thereof is detected and this process is referred to as blind detection (or blind decoding (BD)).

For example, it is assumed that a specific PDCCH is CRC-masked with a radio network temporary identity (RNTI) 'A' and information about data transmitted using a radio resource 'B' (e.g. frequency location) and using transport format information 'C' (e.g. transmission block size, modulation scheme, coding information, etc.) is transmitted in a specific DL subframe. Then, the UE monitors the PDCCH using RNTI information thereof. The UE having the RNTI 'A' receives the PDCCH and receives the PDSCH indicated by 'B' and 'C' through information of the received PDCCH.

Figure 4:
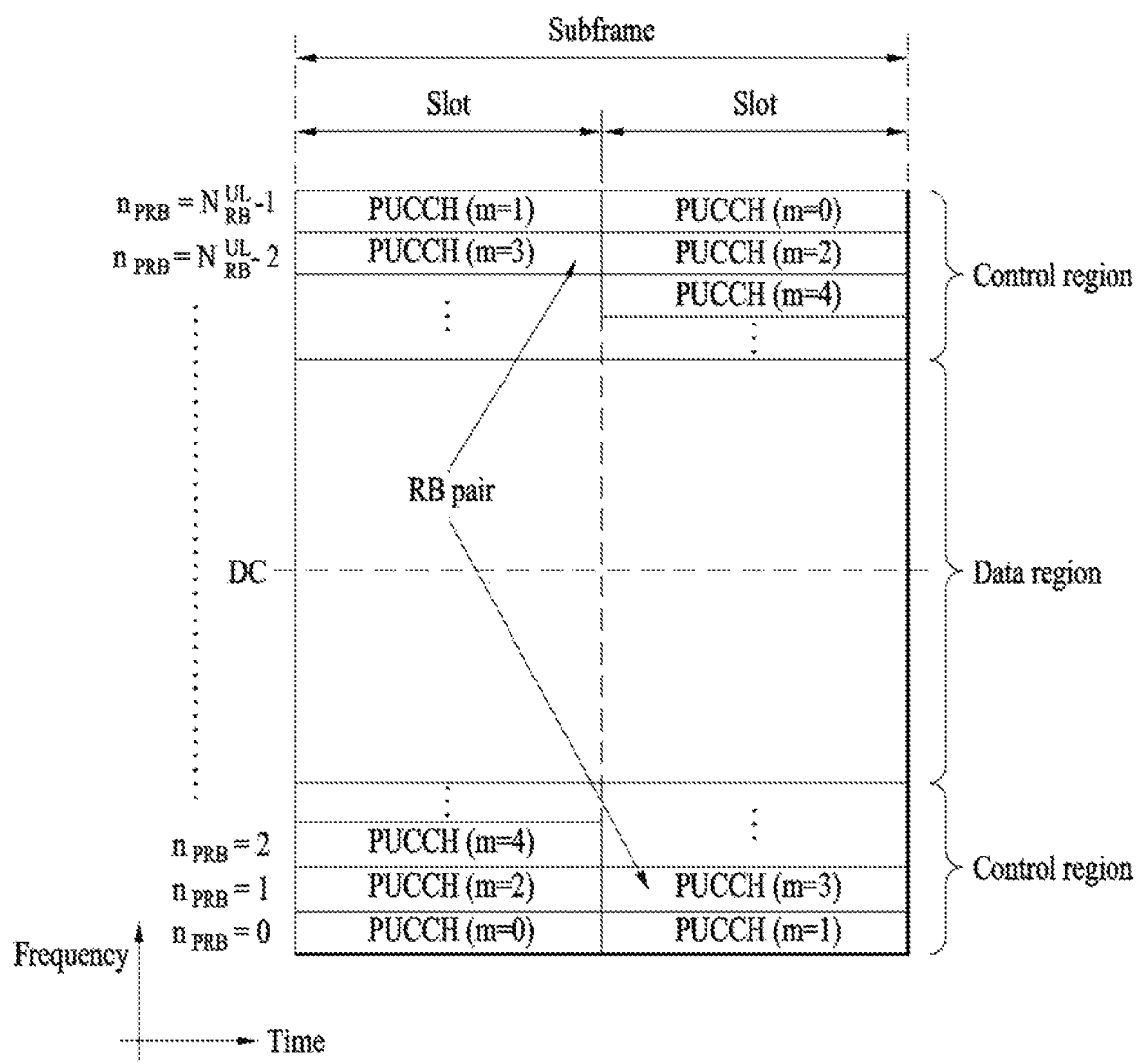
FIG. 4 illustrates the structure of a UL subframe used in a wireless communication system.

FIG. 4 illustrates the structure of a UL subframe used in a wireless communication system.

Referring to FIG. 4, a UL subframe may be divided into a data region and a control region in the frequency domain. One or several PUCCHs may be allocated to the control region to deliver UCI. One or several PUSCHs may be allocated to the data region of the UE subframe to carry user data.

In the UL subframe, subcarriers distant from a direct current (DC) subcarrier are used as the control region. In other words, subcarriers located at both ends of a UL transmission BW are allocated to transmit UCI. A DC subcarrier is a component unused for signal transmission and is mapped to a carrier frequency $f_0$ in a frequency up-conversion process. A PUCCH for one UE is allocated to an RB pair belonging to resources operating on one carrier frequency and RBs belonging to the RB pair occupy different subcarriers in two slots. The PUCCH allocated in this way is expressed by frequency hopping of the RB pair allocated to the PUCCH over a slot boundary. If frequency hopping is not applied, the RB pair occupies the same subcarriers.

The PUCCH may be used to transmit the following control information.

Scheduling request (SR): SR is information used to request a UL-SCH resource and is transmitted using an on-off keying (OOK) scheme.

HARQ-ACK: HARQ-ACK is a response to a PDCCH and/or a response to a DL data packet (e.g. a codeword) on a PDSCH. HARQ-ACK indicates whether the PDCCH or PDSCH has been successfully received. 1-bit HARQ-ACK is transmitted in response to a single DL codeword and 2-bit HARQ-ACK is transmitted in response to two DL codewords. A HARQ-ACK response includes a positive ACK (simply, ACK), negative ACK (NACK), discontinuous transmission (DTX), or NACK/DRX. HARQ-ACK is used interchangeably with HARQ ACK/NACK and ACK/NACK.

Channel state information (CSI): CSI is feedback information for a DL channel. CSI may include channel quality information (CQI), a precoding matrix indicator (PMI), a precoding type indicator, and/or a rank indicator (RI). In the CSI, MIMO-related feedback information includes the RI and the PMI. The RI indicates the number of streams or the number of layers that the UE can receive through the same time-frequency resource. The PMI is a value reflecting a space characteristic of a channel, indicating an index of a preferred precoding matrix for DL signal transmission based on a metric such as an SINR. The CQI is a value of channel strength, indicating a received SINR that can be obtained by the UE generally when the eNB uses the PMI.

A general wireless communication system performs data transmission/reception through one downlink (DL) band and through one uplink (UL) band corresponding to the DL band (in case of a frequency division duplex (FDD) mode), or divides a prescribed radio frame into a UL time unit and a DL time unit in the time domain and then performs data transmission/reception through the UL/DL time unit (in case of a time division duplex (TDD) mode). Recently, to use a wider frequency band in recent wireless communication systems, introduction of carrier aggregation (or BW aggregation) technology that uses a wider UL/DL BW by aggregating a plurality of UL/DL frequency blocks has been discussed. A carrier aggregation (CA) is different from an orthogonal frequency division multiplexing (OFDM) system in that DL or UL communication is performed using a plurality of carrier frequencies, whereas the OFDM system carries a base frequency band divided into a plurality of orthogonal subcarriers on a single carrier frequency to perform DL or UL communication. Hereinbelow, each of carriers aggregated by carrier aggregation will be referred to as a component carrier (CC).

For example, three 20 MHz CCs may be aggregated on each of a UL and a DL to support a bandwidth of 60 MHz. The respective CCs may be contiguous or non-contiguous in the frequency domain. For convenience, although it has been described that the bandwidth of UL CC and the bandwidth of DL CC are the same as each other and symmetric to each other, the bandwidth of each CC may be independently determined. Asymmetrical carrier aggregation in which the number of UL CCs is different from the number of DL CCs may be implemented. DL/UL CC limited to a specific UE may be referred to as a serving UL/DL CC configured for the specific UE.

Meanwhile, the 3GPP LTE-A standard uses the concept of a cell to manage radio resources. The "cell" associated with the radio resources is defined by combination of downlink resources and uplink resources, that is, combination of DL CC and UL CC. The cell may be configured by downlink resources only, or may be configured by downlink resources and uplink resources. If carrier aggregation is supported, linkage between a carrier frequency of the downlink resources (or DL CC) and a carrier frequency of the uplink resources (or UL CC) may be indicated by system information. For example, combination of the DL resources and the UL resources may be indicated by linkage of system information block type 2 (SIB2). In this case, the carrier frequency means a center frequency of each cell or CC. A cell operating on a primary frequency may be referred to as a primary cell (Pcell) or PCC, and a cell operating on a secondary frequency may be referred to as a secondary cell (Scell) or SCC. The carrier corresponding to the Pcell on downlink will be referred to as a downlink primary CC (DL PCC), and the carrier corresponding to the Pcell on uplink will be referred to as an uplink primary CC (UL PCC). A Scell means a cell that may be configured after completion of radio resource control (RRC) connection establishment and used to provide additional radio resources. The Scell may form a set of serving cells for the UE together with the Pcell in accordance with capabilities of the UE. The carrier corresponding to the Scell on the downlink will be referred to as downlink secondary CC (DL SCC), and the carrier corresponding to the Scell on the uplink will be referred to as uplink secondary CC (UL SCC). Although the UE is in RRC-CONNECTED state, if it is not configured by carrier aggregation or does not support carrier aggregation, a single serving cell configured by the Pcell only exists.

The eNB may activate all or some of the serving cells configured in the UE or deactivate some of the serving cells for communication with the UE. The eNB may change the activated/deactivated cell, and may change the number of cells which is/are activated or deactivated. If the eNB allocates available cells to the UE cell-specifically or UE-specifically, at least one of the allocated cells is not deactivated unless cell allocation to the UE is fully reconfigured or unless the UE performs handover. Such a cell which is not deactivated unless CC allocation to the UE is fully reconfigured will be referred to as Pcell, and a cell which may be activated/deactivated freely by the eNB will be referred to as Scell. The Pcell and the Scell may be discriminated from each other on the basis of the control information. For example, specific control information may be set to be transmitted and received through a specific cell only. This specific cell may be referred to as the Pcell, and the other cell(s) may be referred to as Scell(s).

A configured cell refers to a cell in which carrier aggregation is performed for a UE based on measurement report from another eNB or UE among cells of an eNB and is configured per UE. The cell configured for the UE may be a serving cell in terms of the UE. For the cell configured for the UE, i.e. the serving cell, resources for ACK/NACK transmission for PDSCH transmission are reserved in advance. An activated cell refers to a cell configured to be actually used for PDSCH/PUSCH transmission among cells configured for the UE and CSI reporting and SRS transmission for PDSCH/PUSCH transmission are performed in the activated cell. A deactivated cell refers to a cell configured not to be used for PDSCH/PUSCH transmission by the command of an eNB or the operation of a timer and, if a cell is deactivated, CSI reporting and SRS transmission are also stopped in the cell.

For reference, a carrier indicator (CI) denotes a serving cell index (ServCellIndex), CI=0 is applied to Pcell. The serving cell index is a short ID used to identify a serving cell. For example, any one of integers from 0 to 'maximum number of carrier frequencies which can be configured for the UE at a time−1' may be allocated to one serving cell as the serving cell index. That is, the serving cell index may be a logical index used to identify a specific serving cell among cells allocated to the UE rather than a physical index used to identify a specific carrier frequency among all carrier frequencies.

As described above, the term "cell" used in carrier aggregation is differentiated from the term "cell" indicating a certain geographical area where a communication service is provided by one eNB or one antenna group.

The cell mentioned in the present invention means a cell of carrier aggregation which is combination of UL CC and DL CC unless specifically noted.

Meanwhile, since one serving cell is only present in case of communication based on a single carrier, a PDCCH carrying UL/DL grant and corresponding PUSCH/PDSCH are transmitted on one cell. In other words, in case of FDD under a single carrier environment, a PDCCH for a DL grant for a PDSCH, which will be transmitted on a specific DL CC, is transmitted on the specific CC, and a PDCCH for a UL grant for a PUSCH, which will be transmitted on a specific UL CC, is transmitted on a DL CC linked to the specific UL CC. In case of TDD under a single carrier environment, a PDCCH for a DL grant for a PDSCH, which will be transmitted on a specific DL CC, is transmitted on the specific CC, and a PDCCH for a UL grant for a PUSCH, which will be transmitted on a specific UL CC, is transmitted on the specific CC.

In legacy systems subject to communication with one node, the UE-RS, CSI-RS, and CRS are transmitted at the same location, and therefore the UE does not consider a situation in which delay spread, Doppler spread, frequency shift, average received power, and received timing differ among the UE-RS port(s), CSI-RS port(s) and CRS port(s0. However, for a communication system to which coordinated Multi-Point (CoMP) communication technology allowing more than one node to simultaneously participate in communication with the UE is applied, the properties may differ among the PDCCH port(s), PDSCH port(s), UE-RS port(s), CSI-RS port(s) and/or CRS port(s). For this reason, the concept of a "quasi co-located antenna port" is introduced for a mode (hereinafter, CoMP mode) in which multiple nodes can participate in communication.

With respect to antenna ports, the term "Quasi co-located (QCL)" or "quasi co-location (QCL)" can be defined as follows: if two antenna ports are QCL, the UE may assume that the large-scale properties of a signal received through one of the two antenna ports can be inferred from the signal received through the other antenna port. The large-scale properties include delay spread, Doppler spread, frequency shift, average received power and/or received timing.

With respect to channels, the term QCL may also be defined as follows: if two antenna ports are QCL, the UE may assume that the large-scale properties of a channel for conveying a symbol on one of the two antenna ports can be inferred from the large-scale properties of a channel for conveying a symbol on the other antenna port. The large-scale properties include delay spread, Doppler spread, Doppler shift, average gain and/or average delay.

One of the two definitions of QCL given above may be applied to the embodiments of the present invention. Alternatively, the definition of QCL may be modified to assume that antenna ports for which QCL assumption is established are co-located. For example, QCL may be defined in a manner that the UE assumes that the antenna ports for which QCL assumption is established are antenna ports of the same transmission point.

For non-quasi co-located (NQC) antenna ports, the UE cannot assume the same large-scale properties between the antenna ports. In this case, a typical UE needs to perform independent processing for each NQC antenna with respect to timing acquisition and tracking, frequency offset estimation and compensation, and delay estimation and Doppler estimation.

On the other hand, for antenna ports for which QCL assumption can be established, the UE performs the following operations:

Regarding Doppler spread, the UE may apply the results of estimation of the power-delay-profile, the delay spread and Doppler spectrum and the Doppler spread for one port to a filter (e.g., a Wiener filter) which is used for channel estimation for another port;

Regarding frequency shift and received timing, after performing time and frequency synchronization for one port, the UE may apply the same synchronization to demodulation on another port;

Further, regarding average received power, the UE may average measurements of reference signal received power (RSRP) over two or more antenna ports.

For example, if the UE receives a specific DMRS-based DL-related DCI format (e.g., DCI format 2C) over a PDCCH/EPDCCH, the UE performs data demodulation after performing channel estimation of the PDSCH through a configured DMRS sequence. If the UE can make an assumption that a DMRS port configuration received through the DL scheduling grant and a port for a specific RS (e.g., a specific CSI-RS, a specific CRS, a DL serving cell CRS of the UE, etc.) port are QCL, then the UE may apply the estimate(s) of the large-scale properties estimated through the specific RS port to channel estimation through the DMRS port, thereby improving processing performance of the DMRS-based receiver.

Figure 5:
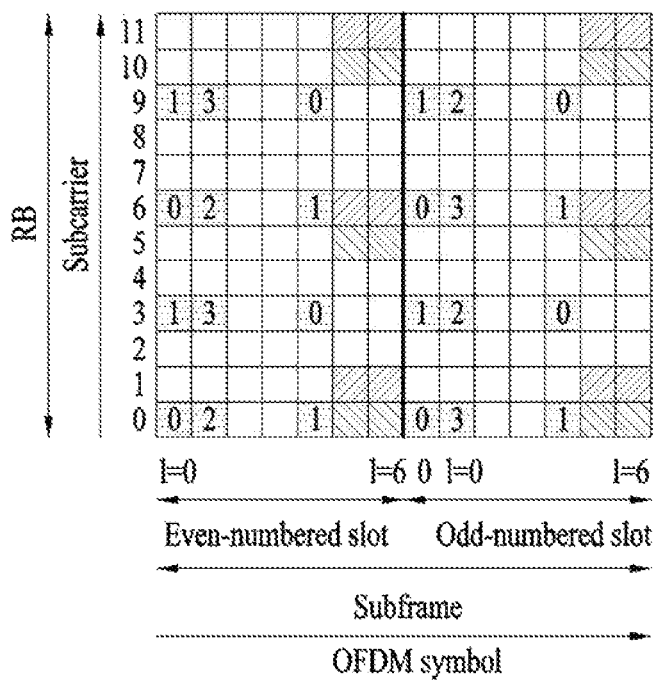
FIG. 5 illustrates configuration of cell specific reference signals (CRSs) and user specific reference signals (UE-RS).

FIG. 5 illustrates configuration of cell specific reference signals (CRSs) and user specific reference signals (UE-RS). In particular, FIG. 5 shows REs occupied by the CRS(s) and UE-RS(s) on an RB pair of a subframe having a normal CP.

In an existing 3GPP system, since CRSs are used for both demodulation and measurement, the CRSs are transmitted in all DL subframes in a cell supporting PDSCH transmission and are transmitted through all antenna ports configured at an eNB.

Referring to FIG. 5, the CRS is transmitted through antenna ports p=0, p=0, 1, 2, 3 in accordance with the number of antenna ports of a transmission mode. The CRS is fixed to a certain pattern within a subframe regardless of a control region and a data region. The control channel is allocated to a resource of the control region, to which the CRS is not allocated, and the data channel is also allocated to a resource of the data region, to which the CRS is not allocated.

A UE may measure CSI using the CRSs and demodulate a signal received on a PDSCH in a subframe including the CRSs. That is, the eNB transmits the CRSs at predetermined locations in each RB of all RBs and the UE performs channel estimation based on the CRSs and detects the PDSCH. For example, the UE may measure a signal received on a CRS RE and detect a PDSCH signal from an RE to which the PDSCH is mapped using the measured signal and using the ratio of reception energy per CRS RE to reception energy per PDSCH mapped RE. However, when the PDSCH is transmitted based on the CRSs, since the eNB should transmit the CRSs in all RBs, unnecessary RS overhead occurs. To solve such a problem, in a 3GPP LTE-A system, a UE-specific RS (hereinafter, UE-RS) and a CSI-RS are further defined in addition to a CRS. The UE-RS is used for demodulation and the CSI-RS is used to derive CSI. The UE-RS is one type of DRS. Since the UE-RS and the CRS are used for demodulation, the UE-RS and the CRS may be regarded as demodulation RSs in terms of usage. Since the CSI-RS and the CRS are used for channel measurement or channel estimation, the CSI-RS and the CRS may be regarded as measurement RSs.

Referring to FIG. 5, UE-RSs are transmitted on antenna port(s) p=5, p=7, p=8 or p=7, 8, . . . , υ+6 for PDSCH transmission, where u is the number of layers used for the PDSCH transmission. UE-RSs are present and are a valid reference for PDSCH demodulation only if the PDSCH transmission is associated with the corresponding antenna port. UE-RSs are transmitted only on RBs to which the corresponding PDSCH is mapped. That is, the UE-RSs are configured to be transmitted only on RB(s) to which a PDSCH is mapped in a subframe in which the PDSCH is scheduled unlike CRSs configured to be transmitted in every subframe irrespective of whether the PDSCH is present. Accordingly, overhead of the RS may be lowered compared to that of the CRS.

In the 3GPP LTE-A system, the UE-RSs are defined in a PRB pair. Referring to FIG. 5, in a PRB having frequency-domain index $n_{PRB}$ assigned for PDSCH transmission with respect to p=7, p=8, or p=7, 8, . . . , υ+6, a part of UE-RS sequence r(m) is mapped to complex-valued modulation symbols $a^{(p)}_{k,l}$ in a subframe according to the following equation.

$$a_{k,l}^{(p)} = w_p(l') \cdot r(3 \cdot l' \cdot N_{RB}^{max,DL} + 3 \cdot n_{PRB} + m') \quad \text{EQUATION 1}$$

where $w_p(i)$, l', m' are given as follows.

$$w_p(i) = \begin{cases} \bar{w}_p(i) & (m' + n_{PRB}) \bmod 2 = 0 \\ \bar{w}_p(3-i) & (m' + n_{PRB}) \bmod 2 = 1 \end{cases} \quad \text{EQUATION 2}$$

$$k = 5m' + N_{sc}^{RB} n_{PRB} + k'$$

$$k' = \begin{cases} 1 & p \in \{7, 8, 11, 13\} \\ 0 & p \in \{9, 10, 12, 14\} \end{cases}$$

$$l = \begin{cases} l' \bmod 2 + 2 & \text{if in a special subframe with configuration 3, 4, 8 or 9 (see Table 2)} \\ l' \bmod 2 + 2 + 3\lfloor l'/2 \rfloor & \text{if in a special subframe with configuration 1, 2, 6, or 7 (see Table 2)} \\ l' \bmod 2 + 5 & \text{if not in a special subframe} \end{cases}$$

$$l' = \begin{cases} 0, 1, 2, 3 & \text{if } n_s \bmod 2 = 0 \text{ and in a special subframe with configuration 1, 2, 6, or 7 (see Table 2)} \\ 0, 1 & \text{if } n_s \bmod 2 = 0 \text{ and not in special subframe with configuration 1, 2, 6, or 7 (see Table 2)} \\ 2, 3 & \text{if } n_s \bmod 2 = 1 \text{ and not in special subframe with configuration 1, 2, 6, or 7 (see Table 2)} \end{cases}$$

$$m' = 0, 1, 2$$

where $n_s$ is the slot number within a radio frame and an integer among 0 to 19. The sequence $\bar{w}_p(i)$ for normal CP is given according to the following equation.

TABLE 8

| Antenna port p | $[\bar{w}_p(0)\ \bar{w}_p(1)\ \bar{w}_p(2)\ \bar{w}_p(3)]$ |
|---|---|
| 7 | [+1 +1 +1 +1] |
| 8 | [+1 −1 +1 −1] |
| 9 | [+1 +1 +1 +1] |
| 10 | [+1 −1 +1 −1] |
| 11 | [+1 +1 −1 −1] |
| 12 | [−1 −1 +1 +1] |
| 13 | [+1 −1 −1 +1] |
| 14 | [−1 +1 +1 −1] |

For antenna port p∈{7, 8, . . . , υ+6}, the UE-RS sequence r(m) is defined as follows.

$$r(m) = \frac{1}{\sqrt{2}}(1 - 2 \cdot c(2m)) + j\frac{1}{\sqrt{2}}(1 - 2 \cdot c(2m+1)), \quad \text{EQUATION 3}$$

$$m = \begin{cases} 0, 1, \ldots, 12 N_{RB}^{max,DL} - 1 & \text{normal cyclic prefix} \\ 0, 1, \ldots, 16 N_{RB}^{max,DL} - 1 & \text{extended cyclic prefix} \end{cases}$$

where c(i) is a pseudo-random sequence defined by a length-31 Gold sequence. The output sequence c(n) of length $M_{PN}$, where n=0, 1, . . . , $M_{PN}$−1, is defined by the following equation.

$$c(n) = (x_1(n+N_C) + x_2(n+N_C)) \bmod 2$$

$$x_1(n+31) = (x_1(n+3) + x_1(n)) \bmod 2$$

$$x_2(n+31) = (x_2(n+3) + x_2(n+2) + x_2(n+1) + x_2(n)) \bmod 2 \quad \text{EQUATION 4}$$

where $N_C$=1600 and the first m-sequence is initialized with $x_1(0)$=1, $x_1(n)$=0, n=1, 2, . . . , 30. The initialization of the second m-sequence is denoted by $c_{init} = \sum_{i=0}^{30} x_2(i) \cdot 2^i$ with the value depending on the application of the sequence.

In EQUATION 3, the pseudo-random sequence generator for generating c(i) is initialized with $c_{init}$ at the start of each subframe according to the following equation.

$$c_{init} = (\lfloor n_s/2 \rfloor + 1) \cdot (2 n_{ID}^{(nSCID)} + 1) \cdot 2^{16} + n_{SCID} \quad \text{EQUATION 5}$$

where the quantities $n^{(i)}_{ID}$, i=0,1, which is corresponding to $n^{(nSCID)}_{ID}$, are given by a physical layer cell identity $N^{cell}_{ID}$ if no value for a scrambling identity $n^{DMRS,i}_{ID}$ is provided by higher layers or if DCI format 1A, 2B or 2C is used for DCI format associated with the PDSCH transmission, and given by $n^{DMRS,i}_{ID}$ otherwise.

In EQUATION 5, the value of $n_{SCID}$ is zero unless specified otherwise. For a PDSCH transmission on antenna ports 7 or 8, $n_{SCID}$ is given by the DCI format 2B or 2C. DCI format 2B is a DCI format for resource assignment for a PDSCH using a maximum of two antenna ports having UE-RSs. DCI format 2C is a DCI format for resource assignment for a PDSCH using a maximum of 8 antenna ports having UE-RSs Meanwhile, if RRH technology, cross-carrier scheduling technology, etc. are introduced, the amount of PDCCH which should be transmitted by the eNB is gradually increased. However, since a size of a control region within which the PDCCH may be transmitted is the same as before, PDCCH transmission acts as a bottleneck of system throughput. Although channel quality may be improved by the introduction of the aforementioned multi-node system, application of various communication schemes, etc., the introduction of a new control channel is required to apply the legacy communication scheme and the carrier aggregation technology to a multi-node environment. Due to the need, a configuration of a new control channel in a data region (hereinafter, referred to as PDSCH region) not the legacy control region (hereinafter, referred to as PDCCH region) has been discussed. Hereinafter, the new control channel will be referred to as an enhanced PDCCH (hereinafter, referred to as EPDCCH)

Figure 6:
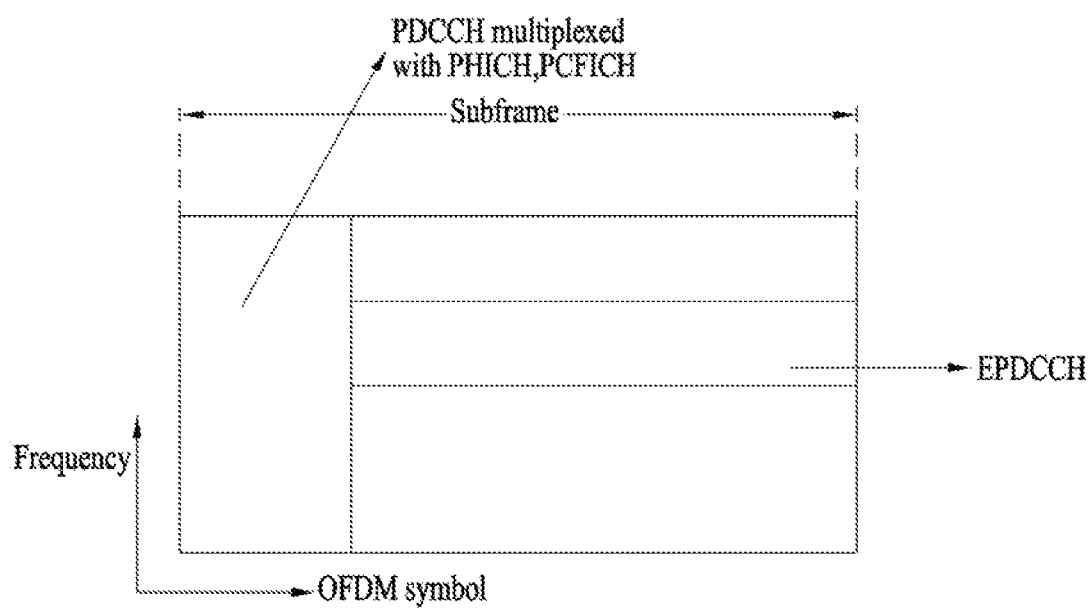
FIG. 6 is a example of a downlink control channel configured in a data region of a DL subframe.

FIG. 6 is a example of a downlink control channel configured in a data region of a DL subframe.

The EPDCCH may be configured within rear OFDM symbols starting from a configured OFDM symbol, instead of front OFDM symbols of a subframe. The EPDCCH may be configured using continuous frequency resources, or may be configured using discontinuous frequency resources for frequency diversity. By using the EPDCCH, control information per node may be transmitted to a UE, and a problem that a legacy PDCCH region may not be sufficient may be solved. For reference, the PDCCH may be transmitted through the same antenna port(s) as that(those) configured for transmission of a CRS, and a UE configured to decode the PDCCH may demodulate or decode the PDCCH by using the CRS. Unlike the PDCCH transmitted based on the CRS, the EPDCCH is transmitted based on the demodulation RS (hereinafter, DMRS). Accordingly, the UE decodes/demodulates the PDCCH based on the CRS and decodes/demodulates the EPDCCH based on the DMRS. The DMRS associated with EPDCCH is transmitted on the same antenna port $p \in \{107,108,109,110\}$ as the associated EPDCCH physical resource, is present for EPDCCH demodulation only if the EPDCCH transmission is associated with the corresponding antenna port, and is transmitted only on the PRB(s) upon which the corresponding EPDCCH is mapped. For example, the REs occupied by the UE-RS(s) of the antenna port 7 or 8 may be occupied by the DMRS(s) of the antenna port 107 or 108 on the PRB to which the EPDCCH is mapped, and the REs occupied by the UE-RS(s) of antenna port 9 or 10 may be occupied by the DMRS(s) of the antenna port 109 or 110 on the PRB to which the EPDCCH is mapped. In other words, a certain number of REs are used on each RB pair for transmission of the DMRS for demodulation of the EPDCCH regardless of the UE or cell if the type of EPDCCH and the number of layers are the same as in the case of the UE-RS for demodulation of the PDSCH.

For each serving cell, higher layer signaling can configure a UE with one or two EPDCCH-PRB-sets for EPDCCH monitoring. The PRB-pairs corresponding to an EPDCCH-PRB-set are indicated by higher layers. Each EPDCCH-PRB-set consists of set of ECCEs numbered from 0 to $N_{ECCE,p,k}-1$, where $N_{ECCE,p,k}$ is the number of ECCEs in EPDCCH-PRB-set p of subframe k. Each EPDCCH-PRB-set can be configured for either localized EPDCCH transmission or distributed EPDCCH transmission.

The UE shall monitor a set of EPDCCH candidates on one or more activated serving cells as configured by higher layer signaling for control information.

The set of EPDCCH candidates to monitor are defined in terms of EPDCCH UE-specific search spaces. For each serving cell, the subframes in which the UE monitors EPDCCH UE-specific search spaces are configured by higher layers.

An EPDCCH UE-specific search space $ES^{(L)}_k$ at aggregation level $L \in \{1,2,4,8,16,32\}$ is defined by a set of EPDCCH candidates.

For an EPDCCH-PRB-set p, the ECCEs corresponding to EPDCCH candidate m of the search space $ES^{(L)}_k$ are given by the following equation.

$$L\left\{\left(Y_{p,k} + \left\lfloor \frac{m \cdot E_{ECCE,p,k}}{L \cdot M^{(L)}_p} \right\rfloor + b \right) \mod \lfloor N_{ECCE,p,k}/L \rfloor \right\} + i \quad \text{Equation 6}$$

where $i=0, \ldots, L-1$. $b=n_{CI}$ if the UE is configured with a carrier indicator field for the serving cell on which EPDCCH is monitored, otherwise $b=0$. $n_{CI}$ is the carrier indicator field (CIF) value, which is the same as a serving cell index (ServCellIndex). $m=0, 1, \ldots, M^{(L)}_p-1$, $M^{(L)}_p$ is the number of EPDCCH candidates to monitor at aggregation level L in EPDDCH-PRB-set p. The variable $Y_{p,k}$ is defined by '$Y_{p,k}=(A_p \cdot Y_{p,k-1}) \mod D$', where $Y_{p,k-1}=n_{RNTI} \neq 0$, $A_0=39827$, $A_0=39829$, $D=65537$ and $k=\text{floor}(n_s/2)$. $n_s$ is the slot number within a radio frame.

A UE is not expected to monitor an EPDCCH candidate, if an ECCE corresponding to that EPDCCH candidate is mapped to a PRB pair that overlaps in frequency with a transmission of either PBCH or PSS/SSS in the same subframe.

An EPDCCH is transmitted using an aggregation of one or several consecutive enhanced control channel elements (ECCEs). Each ECCE consists of multiple enhanced resource element groups (EREGs). EREGs are used for defining the mapping of enhanced control channels to resource elements. There are 16 EREGs, numbered from 0 to 15, per physical resource block (PRB) pair. Number all resource elements (REs), except resource elements carrying DMRS (hereinafter, EPDCCH DMRS) for demodulation of the EPDCCH, in a physical resource-block pair cyclically from 0 to 15 in an increasing order of first frequency. Therefore, all the REs, except REs carrying the EPDCCH DMRS, in the PRB pair has any one of numbers 0 to 15. All REs with number i in that PRB pair constitutes EREG number i. As described above, it is noted that EREGs are distributed on frequency and time axes within the PRB pair and an EPDCCH transmitted using aggregation of one or more ECCEs, each of which includes a plurality of EREGs, is also distributed on frequency and time axes within the PRB pair.

The number of ECCEs used for one EPDCCH depends on the EPDCCH format as given by TABLE 9, the number of EREGs per ECCE is given by TABLE 10. TABLE 9 shows an example of supported EPDCCH formats, and TABLE 10 shows an example of the number of EREGs per ECCE, $N^{EREG}_{ECCE}$. Both localized and distributed transmission is supported.

TABLE 9

| | Number of ECCEs for one EPDCCH, $N^{EPDCCH}_{ECCE}$ | | | |
| --- | --- | --- | --- | --- |
| | Case A | | Case B | |
| EPDCCH format | Localized transmission | Distributed transmission | Localized transmission | Distributed transmission |
| 0 | 2 | 2 | 1 | 1 |
| 1 | 4 | 4 | 2 | 2 |
| 2 | 8 | 8 | 4 | 4 |
| 3 | 16 | 16 | 8 | 8 |
| 4 | — | 32 | — | 16 |

TABLE 10

| Normal cyclic prefix | | Extended cyclic prefix | |
|---|---|---|---|
| Normal subframe | Special subframe, configuration 3, 4, 8 | Special subframe, configuration 1, 2, 6, 7, 9 | Normal subframe | Special subframe, configuration 1, 2, 3, 5, 6 |
| 4 | | | 8 | |

TABLE 11

| | Normal cyclic prefix | | |
|---|---|---|---|
| n' | Normal subframes, Special subframes, configurations 3, 4, 8 | Special subframes, configurations 1, 2, 6, 7, 9 | Extended cyclic prefix Any subframe |
| 0 | 107 | 107 | 107 |
| 1 | 108 | 109 | 108 |
| 2 | 109 | — | — |
| 3 | 110 | — | — |

An EPDCCH can use either localized or distributed transmission, differing in the mapping of ECCEs to EREGs and PRB pairs. One or two sets of PRB pairs which a UE shall monitor for EPDCCH transmissions can be configured. All EPDCCH candidates in EPDCCH set $S_p$ (i.e., EPDCCH-PRB-set) use either only localized or only distributed transmission as configured by higher layers. Within EPDCCH set $S_p$ in subframe k, the ECCEs available for transmission of EPDCCHs are numbered from 0 to $N_{ECCE,p,k}-1$. ECCE number n is corresponding to the following EREG(s):

EREGs numbered (n mod $N^{ECCE}_{RB}$)+$jN^{ECCE}_{RB}$ in PRB index floor(n/$N^{ECCE}_{RB}$) for localized mapping, and EREGs numbered floor (n/$N^{Sm}_{RB}$)+$jN^{ECCE}_{RB}$ in PRB indices (n+jmax(1,$N^{Sp}_{RB}$/$N^{EREG}_{ECCE}$))mod $N^{Sp}_{RB}$ for distributed mapping, where j=0, 1, . . . ,$N^{EREG}_{ECCE}-1$, $N^{EREG}_{ECCE}$ is the number of EREGs per ECCE, and $N^{ECCE}_{RB}=16/N^{EREG}_{ECCE}$ is the number of ECCEs per RB pair. The PRB pairs constituting EPDCCH set $S_p$ are assumed to be numbered in ascending order from 0 to $N^{Sp}_{RB}-1$.

Case A in TABLE 9 applies when:

DCI formats 2, 2A, 2B, 2C or 2D is used and $N^{DL}_{RB} \geq 25$, or any DCI format when $n_{EPDCCH}<104$ and normal cyclic prefix is used in normal subframes or special subframes with configuration 3, 4, 8.

Otherwise case 2 is used. The quantity $n_{EPDCCH}$ for a particular UE is defined as the number of downlink resource elements (k,l) in a PRB pair configured for possible EPDCCH transmission of EPDCCH set $S_0$ and fulfilling all of the following criteria, they are part of any one of the 16 EREGs in the physical resource-block pair, they are assumed by the UE not to be used for CRSs or CSI-RSs, the index l in a subframe fulfils $l \geq l_{EPDCCHStart}$.

where $l_{EPDCCHStart}$ is given based on higher layer signaling 'epdcch-StartSymbol-r11', higher layer signaling 'pdsch-Start-r11', or CFI value carried by PCFICH.

The mapping to resource elements (k,l) on antenna port p meeting the criteria above is in increasing order of first the index k and then the index l, starting with the first slot and ending with the second slot in a subframe.

For localized transmission, the single antenna port p to use is given by TABLE 11 with n'=$n_{ECCE,low}$ mod $N^{ECCE}_{RB}$+$n_{RNTI}$ mod min($N^{ECCE}_{EPDCCH}$,$N^{ECCE}_{RB}$), where $n_{ECCE,low}$ is the lowest ECCE index used by this EPDCCH transmission in the EPDCCH set, $n_{RNTI}$ corresponds to the RNTI associated with the EPDCCH transmission, and $N^{ECCE}_{EPDCCH}$ is the number of ECCEs used for this EPDCCH.

For distributed transmission, each resource element in an EREG is associated with one out of two antenna ports in an alternating manner where p∈{107,109} for normal cyclic prefix and p∈{107,108} for extended cyclic prefix Recently, machine type communication (MTC) has come to the fore as a significant communication standard issue. MTC refers to exchange of information between a machine and an eNB without involving persons or with minimal human intervention. For example, MTC may be used for data communication for measurement/sensing/reporting such as meter reading, water level measurement, use of a surveillance camera, inventory reporting of a vending machine, etc. and may also be used for automatic application or firmware update processes for a plurality of UEs. In MTC, the amount of transmission data is small and UL/DL data transmission or reception (hereinafter, transmission/reception) occurs occasionally. In consideration of such properties of MTC, it would be better in terms of efficiency to reduce production cost and battery consumption of UEs for MTC (hereinafter, MTC UEs) according to data transmission rate. Since the MTC UE has low mobility, the channel environment thereof remains substantially the same. If an MTC UE is used for metering, reading of a meter, surveillance, and the like, the MTC UE is very likely to be located in a place such as a basement, a warehouse, and mountain regions which the coverage of a typical eNB does not reach. In consideration of the purposes of the MTC UE, it is better for a signal for the MTC UE to have wider coverage than the signal for the conventional UE (hereinafter, a legacy UE).

When considering the usage of the MTC UE, there is a high probability that the MTC UE requires a signal of wide coverage compared with the legacy UE. Therefore, if the eNB transmits a PDCCH, a PDSCH, etc. to the MTC UE using the same scheme as a scheme of transmitting the PDCCH, the PDSCH, etc. to the legacy UE, the MTC UE has difficulty in receiving the PDCCH, the PDSCH, etc. Therefore, the present invention proposes that the eNB apply a coverage enhancement scheme such as subframe repetition (repetition of a subframe with a signal) or subframe bundling upon transmission of a signal to the MTC UE having a coverage issue so that the MTC UE can effectively receive a signal transmitted by the eNB. For example, the PDCCH and PDSCH may be transmitted to the MTC UE having the coverage issue in a plurality of subframes (e.g. about 100 subframes).

As one method of reducing the cost of an MTC UE, the MTC UE may operate in, for example, a reduced DL and UL bandwidths of 1.4 MHz regardless of the system bandwidth when the cell operates. In this case, a sub-band (i.e., narrowband) in which the MTC UE operates may always be positioned at the center of a cell (e.g., 6 center PRBs) as shown in FIG. 6 (a), or multiple sub-bands for MTC may be provided in one subframe to multiplex MTC UEs in the subframe such that the UEs use different sub-bands or use the same sub-band which is not a sub-band consisting of the 6 center PRBs.

In this case, the MTC UE may not normally receive a legacy PDCCH transmitted through the entire system bandwidth, and therefore it may not be preferable to transmit a PDCCH for the MTC UE in an OFDM symbol region in which the legacy PDCCH is transmitted, due to an issue of multiplexing with a PDCCH transmitted for another UE. As one method to address this issue, introduction of a control channel transmitted in a sub-band in which MTC operates for the MTC UE is needed. As a DL control channel for such low-complexity MTC UE, a legacy EPDCCH may be used. Alternatively, an M-PDCCH, which is a variant of the legacy PDCCH/EPDCCH, may be introduced for the MTC UE.

A data channel (e.g., PDSCH, PUSCH) and/or control channel (e.g., M-PDCCH, PUCCH, PHICH) may be transmitted across multiple subframes to implement coverage enhancement (CE) of the UE, using a repetition technique or TTI bundling technique. On behalf of the CE, a control/data channel may be transmitted additionally using techniques such as cross-subframe channel estimation and frequency (narrowband) hopping. Herein, the cross-subframe channel estimation refers to a channel estimation technique using not only a reference signal in a subframe having a corresponding channel but also a reference signal in neighboring subframe(s).

The MTC UE may need CE up to, for example, 15 dB. However, not all MTC UEs are present in an environment which requires CE. In addition, the QoS requirements for MTC UEs are not identical. For example, devices such as a sensor and a meter have a low mobility and a small amount of data to transmit/receive and are very likely to be positioned in a shaded area. Accordingly, such devices may need high CE. On the other hand, wearable devices such as a smart watch may have mobility and are very likely to have a relatively large amount of data to transmit/receive and to be positioned in a place other than the shaded area. Accordingly, not all MTC UEs need a high level of CE, and the required capability may depend on the type of an MTC UE.

According to LTE-A Rel-13, CE may be divided into two modes. In a first mode (referred to as CE mode A), transmission may not be repeated or may be repeated only a few times. In a second mode (or CE mode B), many repetitions of transmission are allowed. A mode to enter between the two modes may be signaled to the MTC UE. Herein, parameters that a low-complexity/low-cost UE assumes for transmission/reception of a control channel/data channel may depend on the CE mode. In addition, the DCI format which the low-complexity/low-cost UE monitors may depend on the CE mode. Transmission of some physical channels may be repeated the same number of times regardless of whether the CE mode is CE mode A or CE mode B.

Embodiments of the present invention described below are applicable not only to the 3GPP LTE/LTE-A system but also to a radio access technology (RAT) system. As many communication devices increasingly require a higher communication capacity, a need for mobile broadband communication improved over the legacy RAT has been raised. Massive MTC providing various services anywhere by connecting multiple devices and objects is one of the main issues which will be considered for future communication. Additionally, design of a communication system in consideration of a service/UE sensitive to reliability and latency is under discussion. As such, introduction of future generation RAT in consideration of advanced mobile broadband communication, massive MTC and ultra-reliable and low latency communication (URLLC) is under discussion. For simplicity, this technology will be referred to as a new RAT in this specification.

In the next system of LTE-A, a method of reducing the latency of data transmission is considered. Packet data latency is one of the performance metrics that vendors, operators and also end-users (via speed test applications) regularly measure. Latency measurements are done in all phases of a radio access network system lifetime, when verifying a new software release or system component, when deploying a system and when the system is in commercial operation.

Better latency than previous generations of 3GPP RATs was one performance metric that guided the design of LTE. LTE is also now recognized by the end-users to be a system that provides faster access to internet and lower data latencies than previous generations of mobile radio technologies.

However, with respect to further improvements specifically targeting the delays in the system little has been done. Packet data latency is important not only for the perceived responsiveness of the system; it is also a parameter that indirectly influences the throughput. HTTP/TCP is the dominating application and transport layer protocol suite used on the internet today. According to HTTP Archive (http://httparchive.org/trends.php) the typical size of HTTP-based transactions over the internet are in the range from a few 10's of Kbytes up to 1 Mbyte. In this size range, the TCP slow start period is a significant part of the total transport period of the packet stream. During TCP slow start the performance is latency limited. Hence, improved latency can rather easily be shown to improve the average throughput, for this type of TCP-based data transactions. In addition, to achieve really high bit rates (in the range of Gbps), UE L2 buffers need to be dimensioned correspondingly. The longer the round trip time (RTT) is, the bigger the buffers need to be. The only way to reduce buffering requirements in the UE and eNB side is to reduce latency.

Radio resource efficiency could also be positively impacted by latency reductions. Lower packet data latency could increase the number of transmission attempts possible within a certain delay bound; hence higher block error ration (BLER) targets could be used for the data transmissions, freeing up radio resources but still keeping the same level of robustness for users in poor radio conditions. The increased number of possible transmissions within a certain delay bound, could also translate into more robust transmissions of real-time data streams (e.g. VoLTE), if keeping the same BLER target. This would improve the VoLTE voice system capacity.

There are more over a number of existing applications that would be positively impacted by reduced latency in terms of increased perceived quality of experience: examples are gaming, real-time applications like VoLTE/OTT VoIP and video telephony/conferencing.

Going into the future, there will be a number of new applications that will be more and more delay critical. Examples include remote control/driving of vehicles, augmented reality applications in e.g. smart glasses, or specific machine communications requiring low latency as well as critical communications.

In embodiments of the present invention described below, the term "assume" may mean that a subject to transmit a channel transmits the channel in accordance with the corresponding "assumption." This may also mean that a subject to receive the channel receives or decodes the channel in a form conforming to the "assumption," on the assumption that the channel has been transmitted according to the "assumption."

Figure 7:
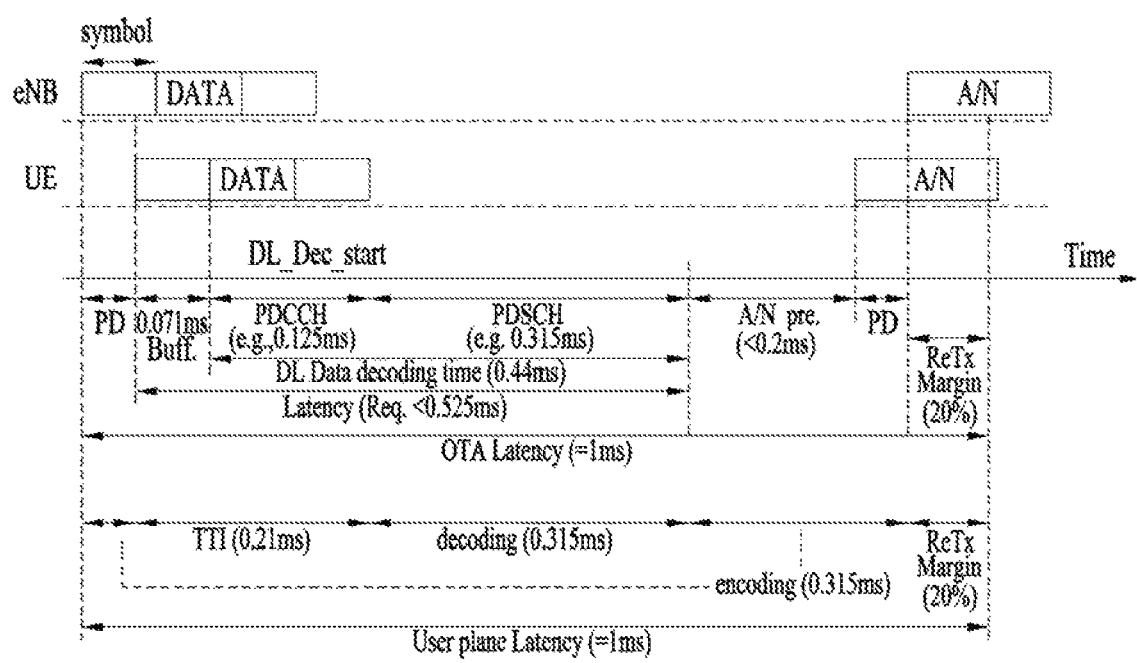
FIG. 7 illustrates the length of a transmission time interval (TTI) which is needed to implement low latency.

FIG. 7 illustrates the length of a transmission time interval (TTI) which is needed to implement low latency.

Referring to FIG. 7, a propagation delay (PD), a buffering time, a decoding time, an A/N preparation time, an uplink PD, and an OTA (over the air) delay according to a retransmission margin are produced while a signal transmitted from the eNB reaches the UE, the UE transmits an A/N for the signal, and the A/N reaches the eNB. To satisfy low latency, a shortened TTI (sTTI) shorter than or equal to 0.5 ms needs to be designed by shortening the TTI, which is the smallest unit of data transmission. For example, to shorten the OTA delay, which is a time taken from the moment the eNB starts to transmit data (PDCCH and PDSCH) until the UE completes transmission of an A/N for the data to the eNB, to a time shorter than 1 ms, the TTI is preferably set to 0.21 ms. That is, to shorten the user plane (U-plane) delay to 1 ms, the sTTI may be set in the unit of about three OFDM symbols.

While FIG. 7 illustrates that the sTTI is configured with three OFDM symbols to satisfy 1 ms as the OTA delay or U-plane delay, an sTTI shorter than 1 ms may also be configured. For example, for the normal CP, an sTTI consisting of 2 OFDM symbols, an sTTI consisting of 4 OFDM symbols and/or an sTTI consisting of 7 OFDM symbols may be configured.

In the time domain, all OFDM symbols constituting a default TTI or the OFDM symbols except the OFDM symbols occupying the PDCCH region of the TTI may be divided into two or more sTTIs on some or all frequency resources in the frequency band of the default TTI, namely the channel band or system band of the TTI.

In the following description, a default TTI or main TTI used in the system is referred to as a TTI or subframe, and the TTI having a shorter length than the default/main TTI of the system is referred to as an sTTI. For example, in a system in which a TTI of 1 ms is used as the default TTI as in the current LTE/LTE-A system, a TTI shorter than 1 ms may be referred to as the sTTI. In addition, in the following description, a physical downlink control channel/physical downlink data channel/physical uplink control channel/physical uplink data channel transmitted in units of the default/main TTI are referred to as a PDCCH/PDSCH/PUCCH/PUSCH, and a PDCCH/PDSCH/PUCCH/PUSCH transmitted within an sTTI or in units of sTTI are referred to as sPDCCH/sPDSCH/sPUCCH/sPUSCH. In the new RAT environment, the numerology may be changed, and thus a default/main TTI different from that for the current LTE/LTE-A system may be used. However, for simplicity, the default/main TTI will be referred to as a TTI, subframe, legacy TTI or legacy subframe, and a TTI shorter than 1 ms will be referred to as an sTTI, on the assumption that the time length of the default/main TTI is 1 ms. The method of transmitting/receiving a signal in a TTI and an sTTI according to embodiments described below is applicable not only to the system according to the current LTE/LTE-A numerology but also to the default/main TTI and sTTI of the system according to the numerology for the new RAT environment.

Figure 8:
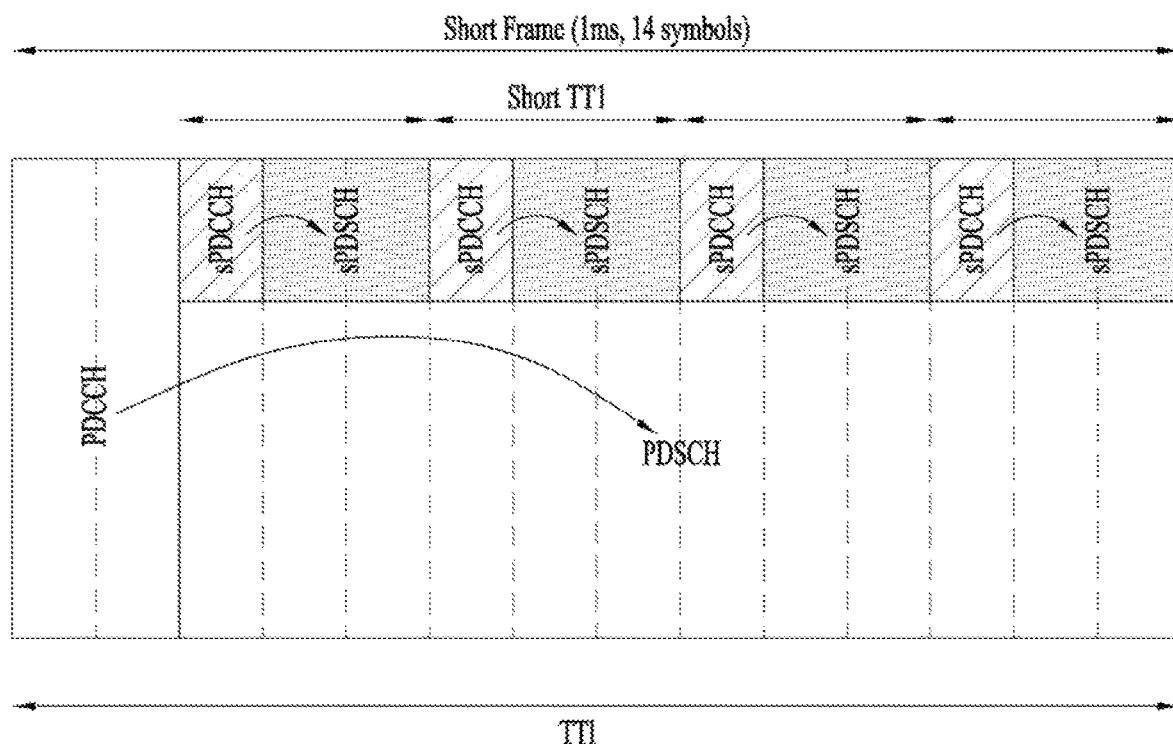
FIG. 8 illustrates an sTTI and transmission of a control channel and data channel within the sTTI.

FIG. 8 illustrates an sTTI and transmission of a control channel and data channel within the sTTI.

In the downlink environment, a PDCCH for transmission/scheduling of data within an sTTI (i.e., sPDCCH) and a PDSCH transmitted within an sTTI (i.e., sPDSCH) may be transmitted. For example, referring to FIG. 8, a plurality of the sTTIs may be configured within one subframe, using different OFDM symbols. For example, the OFDM symbols in the subframe may be divided into one or more sTTIs in the time domain. OFDM symbols constituting an sTTI may be configured, excluding the leading OFDM symbols on which the legacy control channel is transmitted. Transmission of the sPDCCH and sPDSCH may be performed in a TDM manner within the sTTI, using different OFDM symbol regions. In an sTTI, the sPDCCH and sPDSCH may be transmitted in an FDM manner, using different regions of PRB(s)/frequency resources.

The present invention is directed to a method of providing a plurality of different services in one system by applying different system parameters according to the services or UEs to satisfy the requirements for the services. In particular, for a service/UE sensitive to latency, an sTTI may be used to send data in a short time and to allow a response to the data to be sent in a short time. Thereby, the latency may be reduced as much as possible. On the other hand, for a service/UE which is less sensitive to latency, a longer TTI may be used to transmit/receive data. For a service/UE which is sensitive to power efficiency rather than to latency, data may be repeatedly transmitted at the same low power or may be transmitted in units of a longer TTI. The present invention proposes a transmission method and multiplexing method for controlling information and data signals to enable the operations described above. The proposed methods are associated with the transmission aspect of a network, the reception aspect of a UE, multiplexing of multiple TTIs in one UE, and multiplexing of multiple TTIs between multiple UEs.

In contrast with the legacy LTE/LTE-A system, in which the length of a TTI is fixed to 1 ms, and thus all UEs and eNB perform signal transmission and reception in units of 1 ms, the present invention supports a system which has multiple TTI lengths, and one UE and one eNB may transmit and receive a signal using multiple TTI lengths. In particular, the present invention proposes a method of enabling the eNB and UE to communicate with each other while supporting various TTI lengths and variability when the TTI length is variable and a method of performing multiplexing for each channel and UE. While description of the present invention below is based on the legacy LTE-/LTE-A system, it is also applicable to systems other than the LTE/LTE-A system or RAT.

Figure 9:
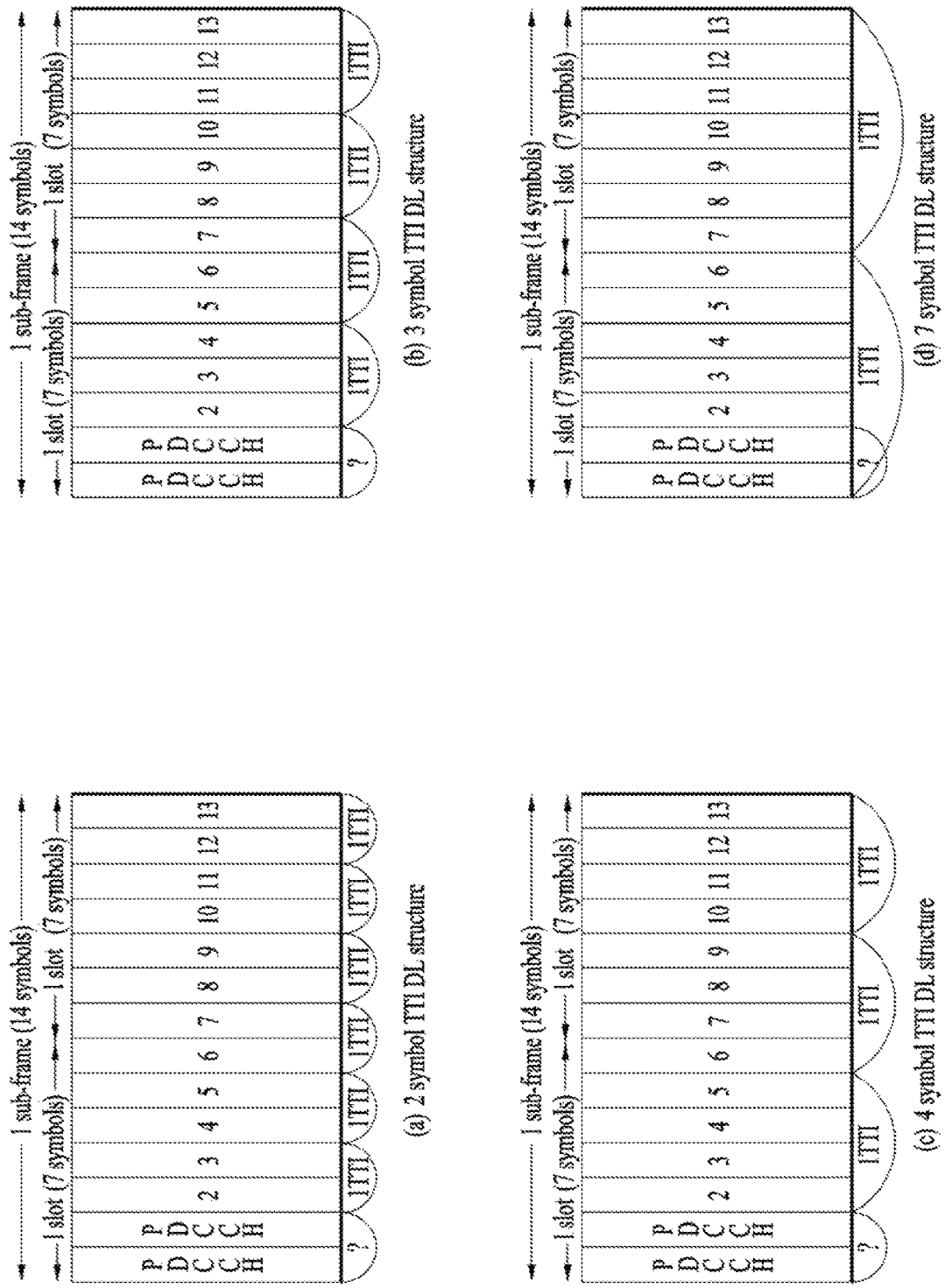
FIG. 9 illustrates an example of short TTIs configured in a legacy subframe.

FIG. 9 illustrates an example of short TTIs configured in a legacy subframe.

In legacy LTE/LTE-A, if a subframe of 1 ms has a normal CP, the subframe consists of 14 OFDM symbols. If a TTI shorter than 1 ms is configured, a plurality of TTIs may be configured within one subframe. As shown in FIG. 9, each TTI may consist of, for example, 2 symbols, 3 symbols, 4 symbols, or 7 symbols. Although not shown in FIG. 9, a TTI consisting of one symbol may also be considered. If one symbol is one TTI unit, 12 TTIs may be configured in the default TTI of 1 ms, on the assumption that the legacy PDCCH is transmittable within two OFDM symbols. Similarly, when the two leading OFDM symbols are assumed to be the legacy PDCCH region, and two symbols are taken as one TTI unit, 6 TTIs may be configured within the default TTI. If three symbols are taken as one TTI, 4 TTIs may be configured within the default TTI. If 4 symbols are taken as one TTI unit, 3 TTIs may be configured within the default TTI.

If the 7 symbols are configured as one TTI, a TTI consisting of 7 leading symbols including the legacy PDCCH region and a TTI consisting of 7 subsequent symbols may be configured. In this case, if one TTI consists of 7 symbols, a UE supporting the short TTI assumes that the two leading OFDM symbols on which the legacy PDCCH is transmitted are punctured or rate-matched and the data and/or control signals of the UE are transmitted on the five subsequent symbols in the TTI (i.e., the TTI of the first slot) positioned at the leading part of one subframe (i.e., default TTI). On the other hand, the UE may assume that the data and/or control signals can be transmitted on all 7 symbols in a TTI positioned at the rear part of the same subframe (i.e., the TTI of the second slot) without any rate-matched or punctured resource region.

Puncturing a channel on a specific resource means that the signal of the channel is mapped to the specific resource in the procedure of resource mapping of the channel, but a portion of the signal mapped to the punctured resource is excluded in transmitting the channel. In other words, the specific resource which is punctured is counted as a resource for the channel in the procedure of resource mapping of the channel, a signal mapped to the specific resource among the signals of the channel is not actually transmitted. The receiver of the channel receives, demodulates or decodes the channel, assuming that the signal mapped to the specific resource is not transmitted. On the other hand, rate-matching of a channel on a specific resource means that the channel is never mapped to the specific resource in the procedure of resource mapping of the channel, and thus the specific resource is not used for transmission of the channel. In other words, the rate-matched resource is not counted as a resource for the channel in the procedure of resource mapping of the channel. The receiver of the channel receives, demodulates, or decodes the channel, assuming that the specific rate-matched resource is not used for mapping and transmission of the channel.

Figure 10:
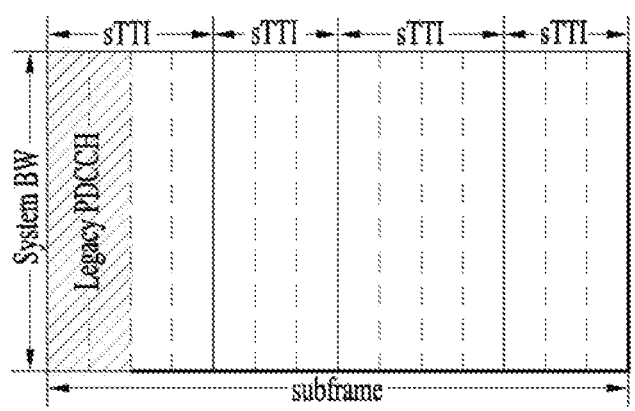
FIG. 10 illustrates another example of short TTIs configured in a legacy subframe.

FIG. 10 illustrates another example of short TTIs (sTTIs) configured in a legacy subframe While FIG. 9 illustrates that the sTTIs configured in one subframe have the same length, sTTIs having different lengths may be configured in one subframe. For example, as shown in FIG. 10, an sTTI consisting of 4 OFDM symbols and an sTTI consisting of 3 OFDM symbols may coexist within one subframe.

This embodiment of the present invention suggests a reference signal (RS) and a pattern of the RS (i.e., RS RE location) which are used to demodulate a downlink physical control channel (e.g., sPDCCH) and a data channel (e.g., sPDSCH) when the downlink physical control channel and the data channel are transmitted within a short TTI (hereinafter, sTTI).

A. RS Usage 1: Utilize Legacy CRS Only

An RS for demodulation of the sPDCCH and/or sPDSCH in an sTTI may be identical to the legacy CRS. Accordingly, the UE may use the legacy CRS to demodulate the sPDCCH and/or sPDSCH. In this case, in order to demodulate a control/data channel transmitted within a specific sTTI, a CRS transmitted in another sTTI may be used (together) to perform channel estimation. Accordingly, the achieved channel estimation performance may be higher than when only the RS transmitted in the sTTI is used to perform channel estimation. In addition, RS overhead may be minimized as the need for transmission of an RS other than the conventional CRS is eliminated.

In this case, since the legacy CRS is not transmitted in the MBSFN subframe, UE may assume that the sTTI-based the sPDCCH/sPDSCH is not transmitted in the MBSFN subframe. For example, the UE may not expect reception of an sPDCCH/sPDSCH in the MBSFN subframe. Alternatively, in order to support the sTTI in the MBSFN subframe, an RS conforming to the legacy CRS sequence and pattern may be transmitted in 1) the entire region of PRB(s) (in the corresponding channel band), 2) in a region of (fixed or higher-layer signaled) PRB(s) in which the sTTI-based operation is performed, or 3) in a region of PRB(s) in which the sPDCCH and/or sPDSCH is transmitted.

B. RS Usage 2: Additional RS Only

The RS for demodulation of the sPDCCH and/or sPDSCH in an sTTI may be a new RS rather than the legacy CRS. Since such RS is additionally transmitted along with the legacy RS, the RS for demodulation of the sPDCCH and/or sPDSCH in an sTTI will be referred to as an additional RS (A-RS) for simplicity of description of the present invention.

The A-RS may be a UE-specific RS, and the UE may use only the A-RS without the legacy CRS to demodulate the sPDCCH and/or sPDSCH in an sTTI. Accordingly, UE-specific precoding may be applied to the A-RS as in the case of the legacy DMRS so as to transmit the A-RS. Such precoding may be identical to the precoding applied to the sPDCCH and/or sPDSCH. Additionally, transmission of the A-RS may also be UE-specific. The A-RS may be transmitted at the subframe/PRB position which is UE-specifically configured or defined in a standard document. Alternatively, the A-RS may be transmitted only in the region of sTTI(s) and/or PRB(s) having the sPDCCH and/or sPDSCH.

A UE using the A-RS is not allowed to use the legacy CRS and the A-RS together to perform channel estimation for reception of the sPDCCH and/or sPDSCH. If the A-RS is transmitted only in the sTTI region in which the sPDCCH and/or sPDSCH is transmitted, the UE is not allowed to use an A-RS transmitted in another sTTI for channel estimation.

Specifically, the A-RS mentioned in this embodiment may refer to the DMRS.

C. RS Usage 3: Legacy CRS+Additional RS

Using the legacy CRS alone may not provide sufficient channel estimation performance due to shortage of the amount of RS present in an sTTI. To address this issue, an additional RS (i.e., A-RS) may be used together with the legacy CRS to demodulate the sPDCCH and/or sPDSCH in the sTTI.

Specifically, the A-RS mentioned in this disclosure may refer to the DMRS.

Cell-Specific A-RS

The A-RS used together with the legacy CRS to demodulate the sPDCCH and/or sPDSCH may be a cell-specific RS. Specifically, such A-RS may be transmitted at a subframe/PRB location which is cell-specifically configured or defined in a standard document.

In this case, in order to perform demodulation of the control/data channel transmitted in a specific sTTI, a CRS and A-RS transmitted in another sTTI may be used (together with the CRS and A-RS in the specific sTTI) for channel estimation. Accordingly, channel estimation performance may be enhanced compared to the case where only the CRS and A-RS transmitted in the sTTI are used to perform channel estimation. In addition, since the legacy CRS is also used for channel estimation, overhead of the additional RS may be reduced.

In the legacy system, the UE is not notified of a precoding matrix used for transmission of a PDSCH in transmission model 9 (hereinafter, TM9) or transmission of an EPDCCH, and thus the UE receives the PDSCH/EPDCH without knowing the precoding matrix. In order to use the CRS together with the A-RS for channel estimation, the sPDCCH/sPDSCH may not be transmitted if the precoding matrix used for transmission of the sPDCCH/sPDSCH is not announced to the UE (or the UE does not recognize the precoding matrix), in contrast with transmission of the legacy PDSCH in TM9 or transmission of the EPDCCH. Accordingly, the UE needs to be aware of the precoding matrix used for transmission of the sPDCCH/sPDSCH.

UE-Specific A-RS

The A-RS used for demodulation of the sPDCCH and/or sPDSCH along with the legacy CRS may be a UE-specific RS. Such A-RS may be transmitted at a subframe/PRB location which is UE-specifically configured or defined in a standard document. Alternatively, the A-RS may be transmitted only in an sTTI and/or PRB region in which the sPDCCH and/or sPDSCH is transmitted to the UE.

In this case, to demodulate a control/data channel transmitted within a specific sTTI, a CRS transmitted within another sTTI may be used (together with the CRS and A-RS in the specific sTTI) for channel estimation. Accordingly, channel estimation performance may be enhanced compared to the case where only the CRS and A-RS transmitted in the specific sTTI are used to perform channel estimation. In addition, since the legacy CRS is also used for channel estimation, overhead of the additional RS may be reduced.

However, in order to use the CRC along with the A-RS for channel estimation, the sPDCCH/sPDSCH may not be transmitted if a precoding matrix used for transmission of the sPDCCH/sPDSCH is not announced to the UE (or the UE does not recognize the precoding matrix), in contrast with transmission of the legacy PDSCH in TM9 or transmission of the EPDCCH. Accordingly, the UE needs to be aware of the precoding matrix used for transmission of the sPDCCH/sPDSCH.

Indication of Precoding Matrix

When the legacy CRS and the A-RS are used together for demodulation of the sPDCCH and/or sPDSCH, the precoding matrix applied to the sPDSCH may be notified to the UE using the following methods.

Option 1. Fixed Precoding (SFBC)

The sPDSCH may be transmitted invariably using the transmit diversity scheme (e.g., SFBC).

Option 2. Precoding Pattern (UE-Specific or Cell-Specific)

The sPDSCH may be transmitted using a cell-specific precoding pattern. Alternatively, if the precoding matrix is determined by UE ID, the sPDSCH may be transmitted using a UE-specific precoding pattern. In this case, the precoding matrix used for transmission of the sPDSCH may be determined by the entirety or a part of the following elements.

PRB location of sPDSCH transmission,
sTTI/subframe/SFN index of sPDSCH transmission,
Cell ID or virtual cell ID configured by eNB, and
UE ID.

Option 3. Semi-Static Configuration by RRC

The precoding matrix used for sPDSCH may be semi-statically configured for the UE through RRC.

Option 4. Dynamic Configuration by Legacy PDCCH

The precoding matrix used for the sPDSCH may be dynamically configured by the legacy PDCCH. In this case, a precoding matrix configured on the legacy PDCCH may be applied only in a subframe in which the sPDCCH is transmitted. Alternatively, the precoding matrix may be persistently applied until the precoding matrix is configured by a new legacy PDCCH next time.

Option 5. Dynamic Configuration by sPDCCH

The precoding matrix applied to the sPDSCH may be dynamically configured by DCI (carried by the PDCCH or sPDCCH) for scheduling the sPDSCH.

When the legacy CRS and the A-RS are used together for demodulation of the sPDCCH and/or sPDSCH, the precoding matrix applied to the sPDSCH may be notified to the UE using the following methods.

Option 1. Fixed Precoding (SFBC)

The sPDSCH may be transmitted invariably using the transmit diversity scheme (e.g., SFBC).

Option 2. Precoding Pattern (UE-Specific or Cell-Specific)

The sPDSCH may be transmitted using a cell-specific precoding pattern. Alternatively, if the precoding matrix is determined by UE ID, the sPDSCH may be transmitted using a UE-specific precoding pattern. In this case, the precoding matrix used for transmission of the sPDSCH may be determined by the entirety or a part of the following elements.

PRB location of sPDCCH transmission,
sTTI/subframe/SFN index of sPDCCH transmission,
Cell ID or virtual cell ID configured by eNB, and
UE ID.

Option 3. Semi-Static Configuration by RRC

The precoding matrix used for sPDSCH may be semi-statically configured for the UE through RRC.

Option 4. Dynamic Configuration by Legacy PDCCH

The precoding matrix used for the sPDSCH may be dynamically configured by the legacy PDCCH. In this case, a precoding matrix configured by the legacy PDCCH may be applied only in a subframe in which the sPDCCH is transmitted. Alternatively, the precoding matrix may be persistently applied until the precoding matrix is configured by a new legacy PDCCH next time.

The A-RS may be additionally transmitted in an OFDM symbol, in which the CRS is not transmitted, in the region of OFDM symbol(s) in which the sPDCCH/sPDSCH is transmitted. Alternatively, the A-RS may be transmitted if a CRS RE is not present in the region of OFDM symbol(s) in which the sPDCCH/sPDSCH is transmitted.

The legacy CRS is not transmitted in the MBSFN region of an MBSFN subframe. Accordingly, the A-RS is not transmitted in a subframe in which the CRS is transmitted. If sPDCCH/sPDSCH is transmitted in a subframe (e.g., MBSFN subframe) in which the CRS is not transmitted (in a region except the legacy control region), the A-RS may be transmitted. In this case, the UE may assume that the sTTI-based sPDCCH/sPDSCH is not transmitted in the MBSFN subframe. Alternatively, the UE may assume that sTTI-based transmission is supported in the MBSFN subframe, but only the A-RS is transmitted without transmission of the legacy CRS in a region (e.g., the MBSFN region of the MBSFN subframe) except the legacy control region. The A-RS may be transmitted in 1) the entire region of PRB(s), 2) a region of (fixed or higher-layer signaled) PRB(s) in which the sTTI-based operation is performed, or 3) a region of PRB(s) in which the sPDCCH and/or sPDSCH is transmitted. In this case, an RS conforming to the legacy CRS sequence and RS RE pattern and the A-RS may be transmitted together in the MBSFN subframe. Herein, the RS conforming to the legacy CRS sequence and RS RE pattern may be transmitted in 1) the entire region of PRB(s), 2) a region of (fixed or higher-layer signaled) PRB(s) in which the sTTI-based operation is performed, or 3) a region of PRB(s) in which the sPDCCH and/or sPDSCH is transmitted. In addition, the A-RS may be transmitted using 1) determined RE locations in the entire region of OFDM symbol(s), 2) determined RE locations in a region of OFDM symbol(s) in which the sPDCCH/sPDSCH is transmitted, or 3) determined RE locations in an sTTI region in which the sPDCCH/sPDSCH is transmitted, or 4) determined RE locations in a first OFDM symbol region in which the sPDCCH/sPDSCH is transmitted.

Figure 11:
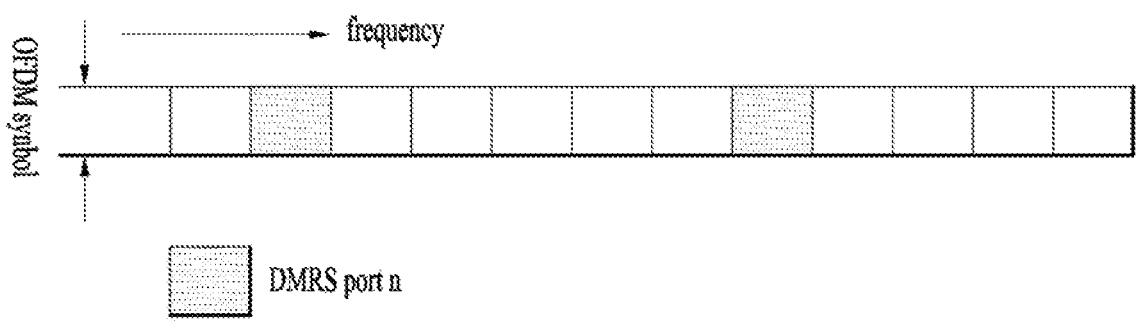
FIG. 11 illustrates a demodulation reference signal (DMRS) within one OFDM symbol.

Specifically, the pattern of the A-RS may be defined in units of an OFDM symbol within one PRB. FIG. 11 illustrates a demodulation reference signal (DMRS) within one OFDM symbol. For example, the A-RS may be transmitted/received within one PRB in a pattern shown in FIG. 11. The A-RS pattern proposed in this embodiment includes a form obtained through frequency-shift, namely v-shift of the pattern of FIG. 11. The v-shift value of the A-RS pattern may depend on the cell ID, UE ID, OFDM symbol index, sTTI index, and/or subframe index. Alternatively, the pattern of the A-RS may be identical to the CRS pattern transmitted on OFDM symbol #0. The A-RS pattern may be used within PRB and OFDM symbol regions in which the A-RS is transmitted.

Alternatively, the pattern of the A-RS may be defined within one PRB in units of a subframe. For example, the locations of REs occupied by the A-RS may have a pattern similar to that of the legacy CRS, and the A-RS may use the legacy CRS pattern, but may be transmitted only within a time/frequency region in which the A-RS is actually transmitted. In this case, transmission of the A-RS may be punctured in a time/frequency region in which the A-RS is not transmitted. Additionally, the A-RS may have the legacy CRS pattern, but may have another v-shift value. The V-shift value of the A-RS pattern may depend on the cell ID, UE ID, OFDM symbol index, sTTI index, and/or subframe index.

When the sPDCCH/sPDSCH transmitted based on the DMRS is supported, additional transmission of the DMRS in a region of OFDM symbol(s) used for CRS transmission or a region of subframe(s) having the CRS may raise an issue in terms of overhead. However, if the sPDCCH/sPDSCH is transmitted based only on the CRS, it may not be properly transmitted in a region of OFDM symbol/subframe(s) in which the CRS is not transmitted.

To address this issue, the present invention proposes that the sPDCCH/sPDSCH be transmitted based on the CRS in the case where the sPDCCH/sPDSCH is transmitted in OFDM symbol(s) with the CRS or OFDM symbols including an OFDM symbol with the CRS and that the sPDCCH/sPDSCH be transmitted based on the DMRS in the case where the sPDCCH/sPDSCH is transmitted in the OFDM symbols in which the CRS is not transmitted or transmitted using only the OFDM symbols with no CRS. In other words, if the sPDCCH/sPDSCH is received in OFDM symbol(s) having the CRS or in OFDM symbol(s) including the OFDM symbols having the CRS, the sPDCCH/sPDSCH may be received, demodulated or decoded (hereinafter, received/demodulated/decoded) based on the CRS. If the sPDCCH/sPDSCH is received in OFDM symbol(s) without the CRS or only in OFDM symbols without the CRS, the sPDCCH/sPDSCH may be received/demodulated/decoded based on the DMRS.

Alternatively, the sPDCCH/sPDSCH may be transmitted based on the CRS if it is transmitted in a subframe in which the CRS is transmitted, and may be transmitted based on the DMRS if it is transmitted in a subframe (e.g., MBSFN subframe) in which the CRS is not transmitted (in a region except the legacy control region). In the case of the MBSFN subframe, since the CRS is transmitted in the legacy control region (i.e., a non-MBSFN region), an sPDCCH transmitted through the legacy control region may be transmitted based on the CRS.

Herein, transmitting the sPDCCH/sPDSCH based on the CRS may mean that a CRS-based transmission scheme (e.g., single port transmission, SFBC (transmit diversity) transmission) is used to transmit the sPDCCH/sPDSCH and that the UE uses the CRS to perform sPDCCH/sPDSCH demodulation. Transmitting the sPDCCH/sPDSCH based on the DMRS may mean that a DMRS-based transmission scheme (e.g., single port transmission (localized transmission of EPDCCH), distributed transmission of the EPDCCH, or a transmission scheme used in TM7/8/9/10) is used to transmit the sPDCCH/sPDSCH, and the UE uses the DMRS to perform sPDCCH/sPDSCH demodulation.

In the case where a DMRS based transmission mode (e.g., TM7, TM8, TM9 or TM10) is configured, transmitting the CRS and the DMRS together may raise an issue of RS overhead. Accordingly, to prevent the overhead issue caused by simultaneous transmission of the DMRS and the CRS, the UE may operate in a CRS based TM (e.g., TM2) in a non-MBSFN subframe even though a DMRS based TM is configured for the UE. In this case, upon receiving the configuration of the DMRS based TM, the UE may assume that the sPDSCH is transmitted in the DMRS based TM in the MBSFN subframe and that the sPDSCH operates in the CRS based TM in the non-MBSFN subframe. Similarly, for the sPDCCH, if DMRS based sPDCCH transmission is configured, the sPDCCH may be transmitted based on the DMRS in the MBSFN subframe, and transmitted based on the CRS in the non-MBSFN subframe. Alternatively, only a CRS based TM may be configured/used in the non-MBSFN subframe, and only a DMRS based TM may be configured/used in the MBSFN subframe.

Specifically, operation may be performed in the DMRS based TM in the MBSFN subframe, and whether to operate in the CRS based TM or DMR based TM in the non-MBSFN subframe may be determined according to the number of antenna ports (or the number of data transmission layers) used for transmission in an sTTI or subframe. For example, the DMRS based TM may be applied if P or fewer antenna ports are used to transmit data, and the CRS based TM may be applied if more than P antenna ports are used to transmit data. In contrast, the CRS based TM may be applied if P or fewer antenna ports are used to transmit data, and the DMRS based TM may be applied if more than P antenna ports are used to transmit data.

Figure 12:
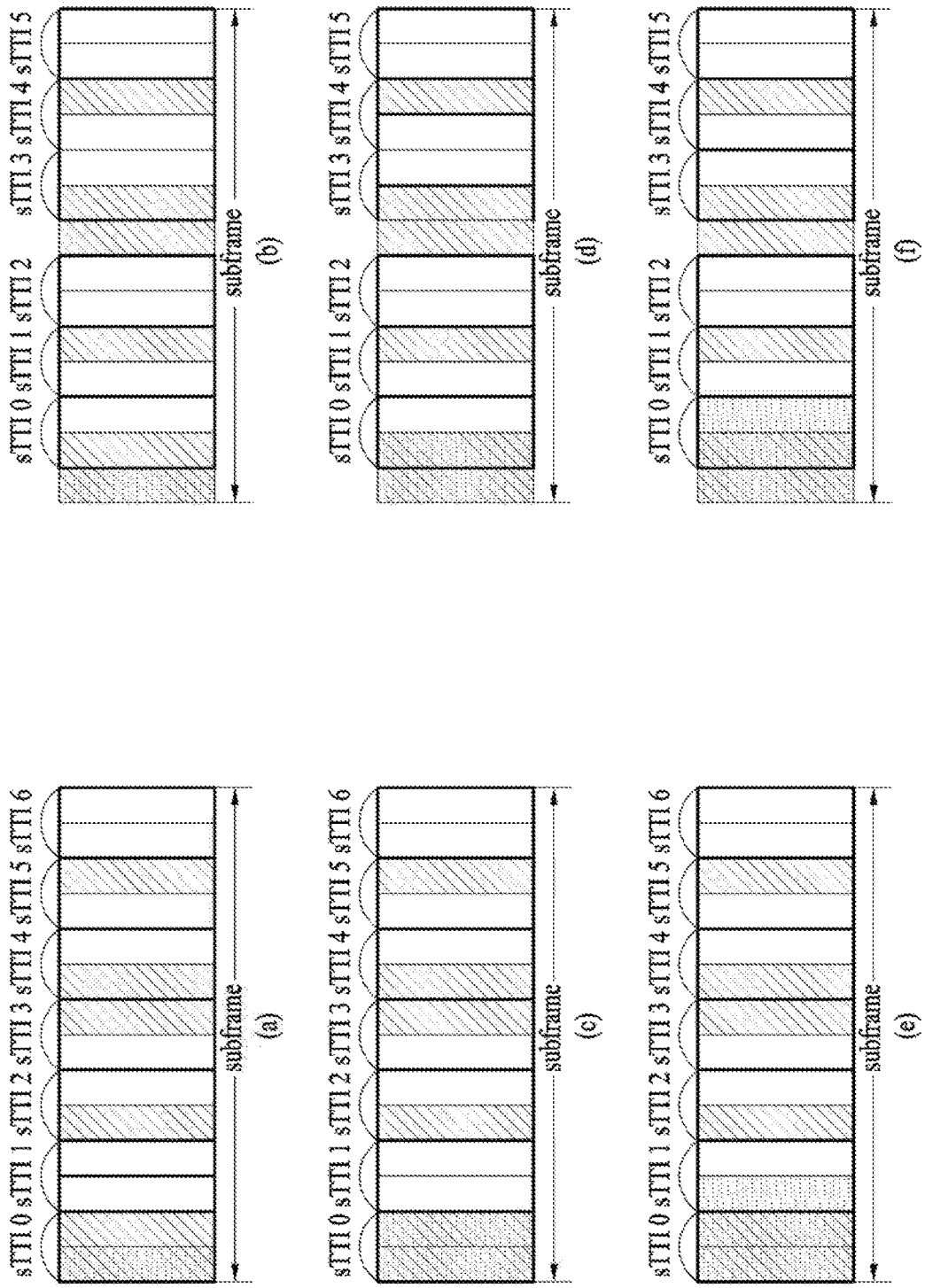
FIG. 12 illustrates examples of configuration of sTTI(s) in consideration of the legacy PDCCH region and CRS.

FIG. 12 illustrates examples of configuration of sTTI(s) in consideration of a legacy PDCCH region and CRS.

Some of the OFDM symbol(s) constituting an sTTI may be included in the legacy control region (i.e., the region of OFDM symbol(s) in which the legacy PDCCH is transmitted). Alternatively, due to the legacy control region or for other reasons, the region of available OFDM symbol(s) in an sTTI may be smaller than that in the typical sTTI as in the case of an sTTI with one OFDM symbol. For example, the number of available OFDM symbols is as small as 1 in TTI0 of the TTI(s) illustrated in FIG. 12(a), TTI1 of the TTI(s) illustrated in FIG. 12(d), or TTI1 of the TTI(s) illustrated in FIG. 12(e). Transmitting all DMRSs for the sPDSCH in an sTTI region having a small number of available OFDM symbols may result in significant overhead. Accordingly, the present invention proposes that the UE receiving configuration of a DMRS based TM for transmission of the sPDSCH assume that the sPDSCH is transmitted in the CRS based TM in an sTTI consisting of a small number of OFDM symbols. That is, if a DMRS based TM is configured to be used for transmission of the sPDSCH, fallback to a CRS based TM may be implemented in an sTTI having a small number (e.g., 1) of available OFDM symbols.

D. Detailed RS Patterns

In this section, specific RS pattern(s) for applying the aforementioned "RS usages" are discussed.

RS Pattern for 'RS Usage 2: Additional RS Only'

When an RS for demodulation of the sPDCCH and/or sPDSCH in an sTTI is not the legacy CRS but a UE-specific A-RS, RS pattern(s) depending on the TTI length may be used.

Case 1: The TTI Length Equals One OFDM Symbol

When the TTI length equals one OFDM symbol, the A-RS may be present in every sTTI because the UE needs to perform demodulation of the sPDCCH/sPDSCH using only the A-RS present in the sTTI region in which the sPDCCH/sPDSCH is transmitted.

Option 1. When Two APs are Supported and the RS RE Location Differs Between the APs When it is assumed that two antenna ports (antenna ports (APs) 7 and 8) are used for transmission of the A-RS, and A-RSs to be transmitted through AP 7 and AP 8 are transmitted through different REs, the RE location(s) of the A-RSs may be given as shown in FIG. 13. In FIG. 13, A-RS 7 denotes the A-RS transmitted through AP 7, and A-RS 8 denotes the A-RS transmitted through AP 8. The A-RS may be present at the same RE location in every sTTI, and may be positioned at a location different from the RE location of transmission of the legacy CRS. When the RE location of the CRS changes, the RE locations of the A-RSs also change. FIGS. 13(a), 13(b) and 13(c) illustrate examples of an RS pattern in which the A-RS is present at 2 REs for each AP within one PRB in every sTTI. FIGS. 13(a), 13(b) and 13(c) show RE locations of the A-RS when the value of v-shift, which determines the RE location of the legacy CRS, is 0, 1 and 2, respectively. FIGS. 13(d), 13(e) and 13(f) illustrate examples of an RS pattern in which the A-RS is present at one RE for each AP within one PRB in every sTTI. FIGS. 13(d), 13(e) and 13(f) show A-RS locations when the value of v-shift, which determines the RE location of the legacy CRS, is 0, 1 and 2, respectively.

The RS pattern(s) according to the present invention include an RS pattern with the RE locations of A-RS 7 and A-RS 8 switched for the A-RS pattern proposed above. In addition, the RS pattern(s) according to the present invention may be applied even when an AP different from AP 7 and AP 8 is used for transmission of the A-RS.

Option 2. When Two APs are Supported and the Same RS RE Location is Given for the APs Two antenna ports (AP 7 and AP 8) may be used to transmit A-RSs, and the A-RSs to be transmitted through AP 7 and AP 8 may be transmitted through the same RE location. In this case, similar to the case where the DMRS for AP 7 and the DMRS for AP 8 are transmitted in the CDM manner through the same RE location using orthogonal codes, the A-RS for AP 7 and the A-RS for AP 8 may be transmitted in the CDM manner through the same RE location using orthogonal codes.

Figure 14:
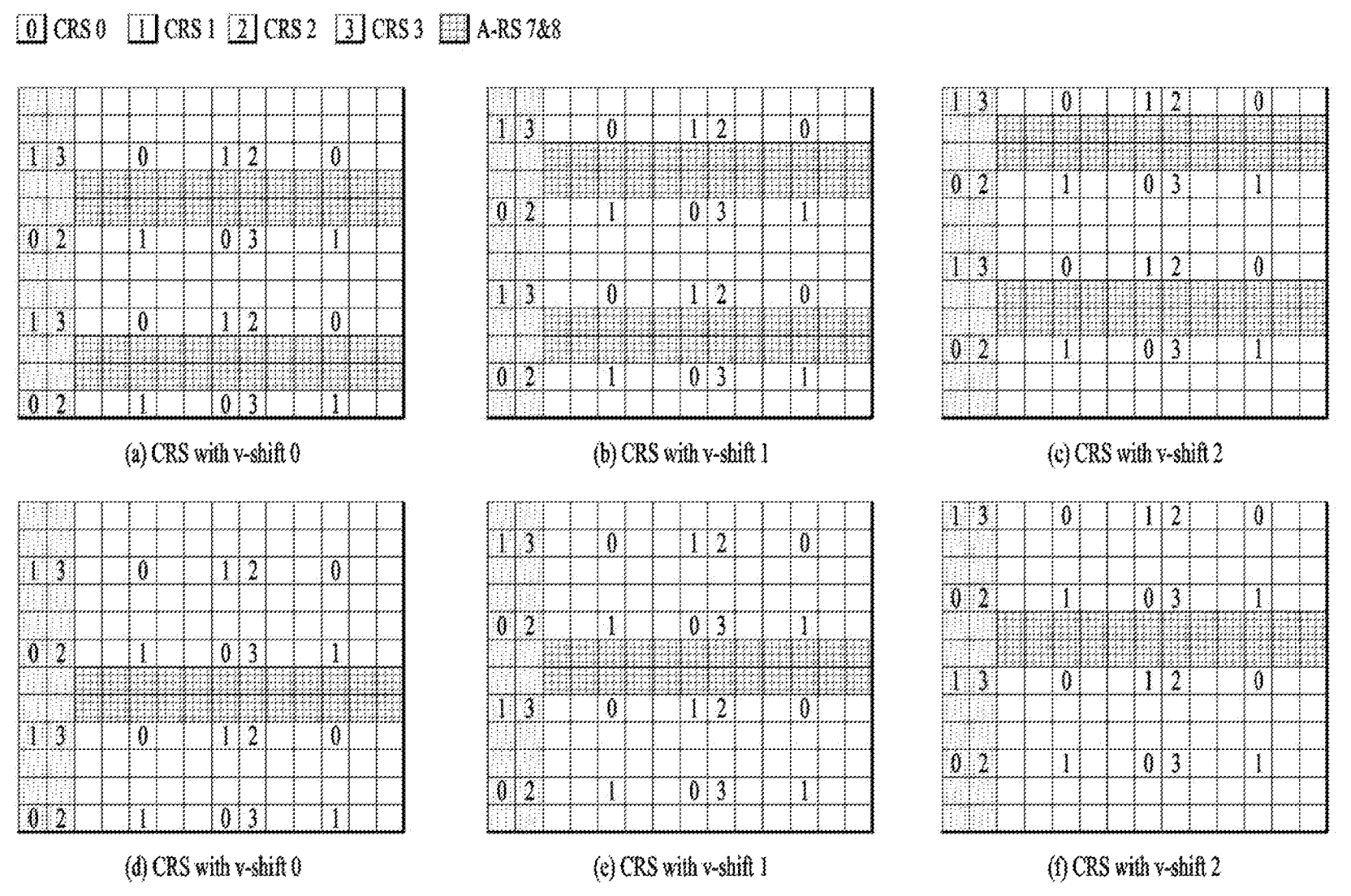

In this case, the RE location(s) of the A-RSs may be given as shown in FIG. 14. In FIG. 14, A-RS 7 denotes the A-RS transmitted through AP 7, and A-RS 8 denotes the A-RS transmitted through AP 8. The A-RS may be present at the same RE location in every sTTI, and be positioned at an RE location different from the RE location of transmission of the legacy CRS. When the RE location of the CRS changes, the RE location of the A-RS also changes. FIGS. 14(a), 14(b) and 14(c) illustrate examples of an RS pattern in which the A-RS is present at 4 REs for each AP within one PRB in every sTTI. FIGS. 14(a), 14(b) and 14(c) show RE locations of the A-RS when the value of v-shift, which determines the RE location of the legacy CRS, is 0, 1 and 2, respectively. FIGS. 14(d), 14(e) and 14(f) illustrate examples of an RS pattern in which the A-RS is present at 2 REs for each AP within one PRB in every sTTI. FIGS. 14(d), 14(e) and 14(f) show RE locations of the A-RS when the value of v-shift, which determines the RE location of the legacy CRS, is 0, 1 and 2, respectively. In this case, the A-RSs may be transmitted at two A-RS REs which are present at neighboring RE locations in the same sTTI, by applying orthogonal codes to A-RS AP 7 and A-RS AP 8. For example, A-RS 7 may be transmitted by multiplying an RS RE on subcarrier i and an RS RE on subcarrier i+1 by w0 and w1, respectively. Herein, [w0, w1]=[1, 1]. In addition, A-RS 8 may be transmitted by multiplying an RS RE on subcarrier i and an RS RE on subcarrier i+1 by w0 and w1, respectively. In this case, [w0, w1]=[1, −1].

The same principle is applicable even when an AP different from AP 7 and AP 8 is used to transmit the A-RSs.

Case 2: The TTI Length Equals 2 OFDM Symbols

When the TTI length equals 2 OFDM symbols, an A-RS may be present in every sTTI because the UE needs to perform demodulation of the sPDCCH/sPDSCH using only A-RSs present in the sTTI region in which the sPDCCH/sPDSCH is transmitted.

Figure 15:
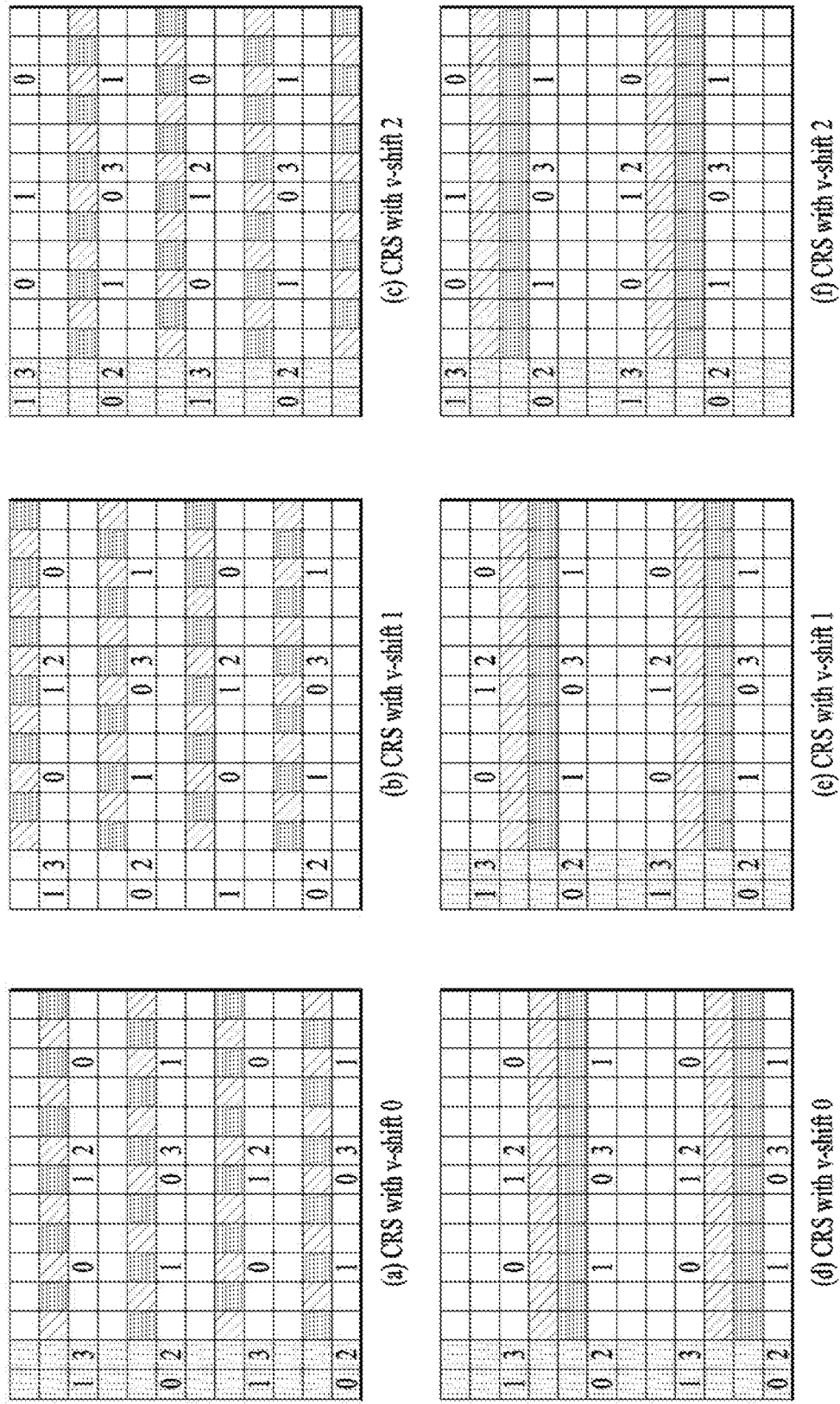

Option 1. When Two APs are Supported and the RS RE Location Differs Between the APs When it is assumed that two antenna ports (AP 7 and AP 8) are used for transmission of A-RSs, and A-RSs to be transmitted through AP 7 and AP 8 are transmitted through different REs, the RE location(s) of the A-RSs may be given as shown in FIGS. 15 to 17. In FIGS. 15 to 17, A-RS 7 denotes the A-RS transmitted through AP 7, and A-RS 8 denotes the A-RS transmitted through AP 8. The A-RSs may be present at the same RE location in every sTTI, but may not be positioned at the RE location of transmission of the legacy CRS. If the RE location of the A-RS is within an OFDM symbol on which the legacy CRS is transmitted, the RE location of the A-RS may be v-shifted or changed according to the RE location of the CRS (according to the value of v-shift). If the RE location of the A-RSs is only within an OFDM symbol in which the legacy CRS is not transmitted, the A-RS may be positioned at the same RE location irrespective of the RE location (the v-shift value) of the CRS.

FIG. 15 illustrates examples of an RS pattern in which the A-RS is present at 4 REs for each AP within one PRB in every sTTI. FIG. 16 illustrates examples of an RS pattern in which the A-RS is present at 3 REs for each AP within one PRB in every sTTI. FIG. 17 illustrates examples of an RS pattern in which the A-RS is present at 2 REs for each AP within one PRB in every sTTI.

The A-RS pattern(s) according to the present invention include an RS pattern with the RE locations of A-RS 7 and A-RS 8 switched for the A-RS pattern proposed above. In addition, the RS pattern(s) according to the present invention may be applied even when an AP different from AP 7 and AP 8 is used for transmission of an A-RS. Further, the A-RS pattern(s) according to the present invention includes an RE pattern obtained by v-shifting the A-RS pattern proposed above.

Option 2. When Two APs are Supported and the Same RS RE Location is Given for the APs In consideration of the case where two antenna ports (AP 7 and AP 8) are used for transmission of A-RSs, the A-RSs to be transmitted through AP 7 and AP 8 may be transmitted at the same RE location. In this case, similar to the case where the DMRS for AP 7 and the DMRS for AP 8 are transmitted in the CDM manner through the same RE location using orthogonal codes, the A-RS for AP 7 and the A-RS for AP 8 may be transmitted in the CDM manner through the same RE location using orthogonal codes.

In this case, the RE location(s) of the A-RSs may be given as shown in FIGS. 18 to 21. In FIGS. 18 to 21, A-RS 7 denotes an A-RS transmitted through AP 7, and A-RS 8 denotes an A-RS transmitted through AP 8. The A-RS may be present at the same RE location in every sTTI, but may not be positioned at the RE location of transmission of the legacy CRS. If the RE location of the A-RS is within an OFDM symbol in which the legacy CRS is transmitted, the RE location of the A-RS may be v-shifted or changed according to the RE location of the CRS, namely, the value of v-shift. If the RE location of the A-RS is only within an OFDM symbol in which the legacy CRS is not transmitted, the A-RS may be positioned at the same RE location irrespective of the RE location of the CRS or the v-shift value.

Figure 18:
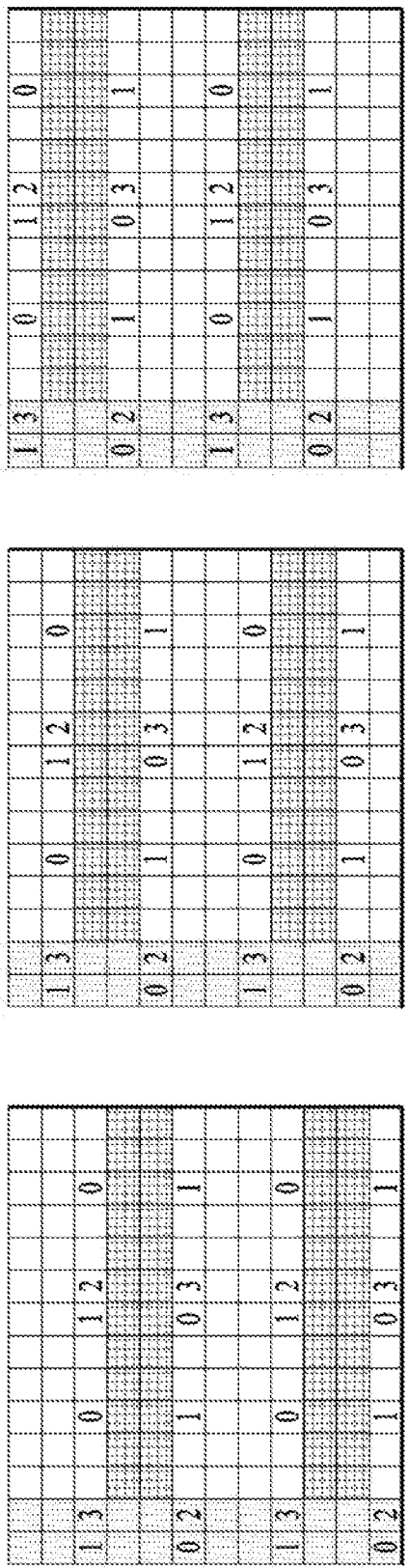
Figure 21:
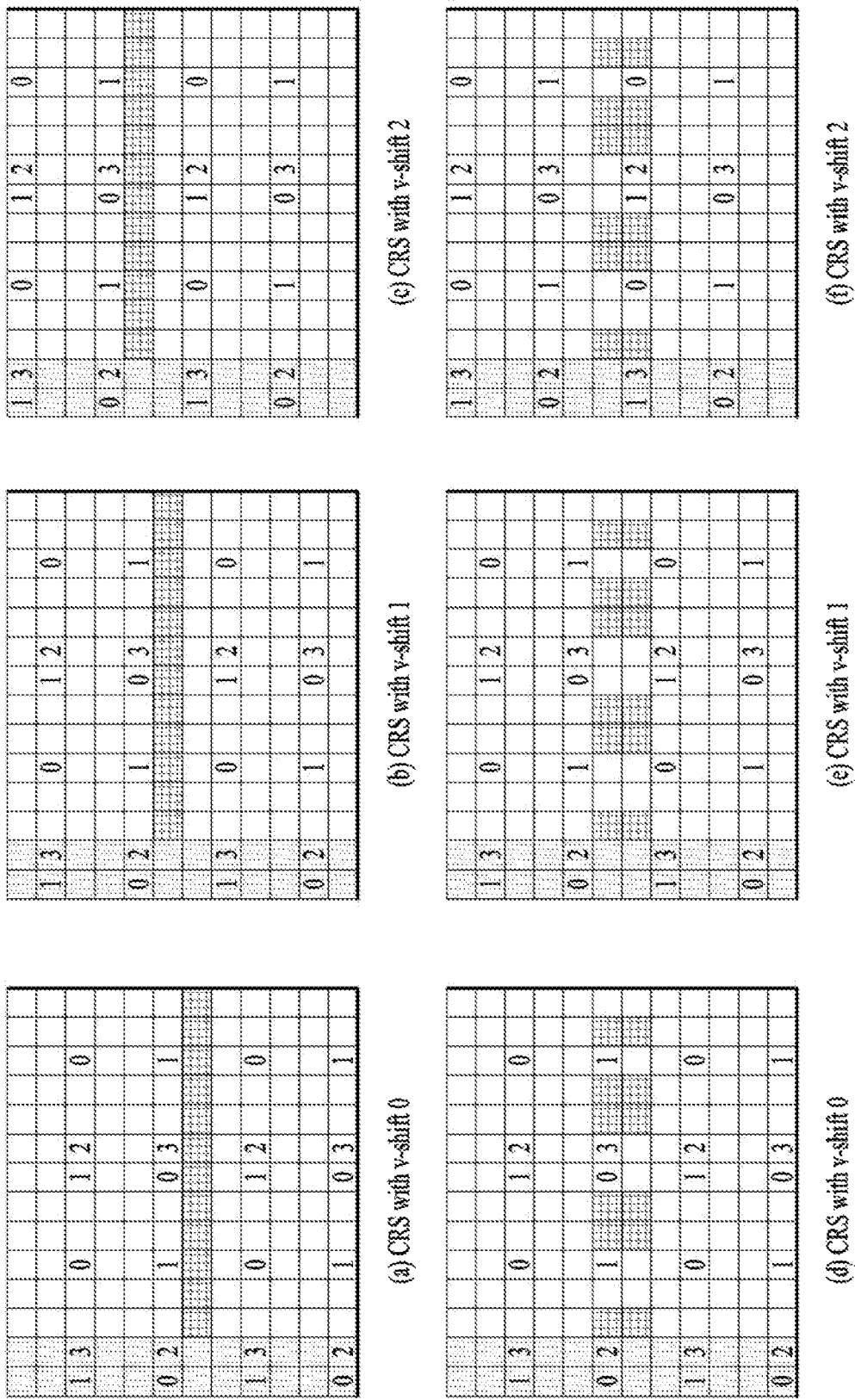

FIG. 18 illustrates examples of an RS pattern in which the A-RS is present at 8 REs for each AP within one PRB in every sTTI. FIG. 19 illustrates examples of an RS pattern in which the A-RS is present at 6 REs for each AP within one PRB in every sTTI. FIG. 20 illustrates examples of an RS pattern in which the A-RS is present at 4 REs for each AP within one PRB in every sTTI. FIG. 21 illustrates examples of an RS pattern in which the A-RS is present at 2 REs for each AP within one PRB in every sTTI. In the same sTTI, the A-RS may be transmitted at two A-RS REs present at neighboring RE locations (e.g., "the same subcarrier and neighboring OFDM symbols" or "neighboring subcarriers and the same OFDM symbol") by applying orthogonal codes to A-RS AP 7 and A-RS AP 8. For example, when the RS is positioned at two neighboring REs, namely, RE i and RE i+1, A-RS 7 may be transmitted by multiplying the RS transmitted at RE i and RE i+1 by w0 and w1. In this case, [w0, w1]=[1, 1]. A-RS 8 may be transmitted by multiplying the RS transmitted at RE i and RE i+1 by w0 and w1, respectively. In this case, [w0, w1]=[1, −1].

The A-RS pattern(s) according to the present invention are applicable even when an AP different from AP 7 and AP 8 is used to transmit an A-RS.

Option 3. When 4 APs are Supported 4 antenna ports (AP 7, AP 8, AP 9, and AP 10) may be used to transmit the A-RS. As in the case of the legacy DMRS, the A-RS for AP 7 and the A-RS for AP 8 may be transmitted at the same RE location, and the A-RS for AP 9 and the A-RS for AP 10 may be transmitted at the same RE location. In this case, similar to the conventional case where the DMRS for AP 7 and the DMRS for AP 8 are transmitted in the CDM manner through the same RE location using orthogonal codes, and the DMRS for AP 9 and the DMRS for AP 10 are transmitted in the CDM manner through the same RE location using orthogonal codes, the A-RS for AP 7 and the A-RS for AP 8 may be transmitted in the CDM manner through the same RE location using orthogonal codes, and the A-RS for AP 9 and the A-RS for AP 10 may be transmitted in the CDM manner through the same RE location using orthogonal codes.

In this case, the RE location(s) of the A-RSs may be given as shown in FIG. 22. In FIG. 22, A-RS 7, A-RS 8, A-RS 9, and A-RS 10 denote the A-RSs transmitted through AP 7, AP 8, AP 9, and AP 10, respectively. The A-RSs may be present at the same RE location in every sTTI, but may not be positioned at the RE location of transmission of the legacy CRS. The RE location of the A-RSs may be v-shifted or changed according to the RE location of the CRS (or according to the value of v-shift).

FIGS. 22(a), 22(b) and 22(c) illustrate examples of an RS pattern in which the A-RS is present at 4 REs for each AP within one PRB in every sTTI. FIGS. 22(d), 22(e) and 22(f) illustrate examples of an RS pattern in which the A-RS is present at 2 REs for each AP within one PRB in every sTTI. FIGS. 22(a), 22(b) and 22(c) show A-RS locations when the value of v-shift, which determines the RE location of the legacy CRS, is 0, 1 and 2, respectively. FIG. 22(d), FIG. 22(e) and FIG. 22(f) show A-RS locations when the value of v-shift, which determines the RE location of the legacy CRS, is 0, 1 and 2, respectively. The A-RS pattern(s) according to the present invention may be applied even when an AP different from AP 7, AP 8, AP 9 and AP 10 is used for transmission of the A-RSs. Further, the A-RS pattern(s) according to the present invention includes RE pattern(s) obtained by v-shifting the A-RS pattern proposed above.

Case 3: The TTI Length Equals 3 OFDM Symbols

When the TTI length equals 3 OFDM symbols, the A-RS may be present in every sTTI because the UE needs to perform demodulation of the sPDCCH/sPDSCH using only A-RSs present in the sTTI region in which the sPDCCH/sPDSCH is transmitted.

When the TTI length equals 3 OFDM symbols, the RS pattern proposed for the case where the TTI length equals 2 OFDM symbols may be employed. In this case, the RS, which is configured to be transmitted through 2 OFDM symbols in a two-OFDM symbol sTTI in the previous case, may be transmitted through 2 OFDM symbols in a three-OFDM symbol sTTI. For example, the OFDM symbols having the A-RS may be the first and second OFDM symbols in the sTTI. Similarly, the RS, which is configured to be transmitted through one OFDM symbol in a two-OFDM symbol sTTI, may be transmitted through one OFDM symbol in a three-OFDM symbol sTTI. For example, an OFDM symbol having the A-RS may be the first OFDM symbol in the sTTI.

4 antenna ports (AP 7, AP 8, AP 9, and AP 10) may be used to transmit the A-RS. As in the case of the legacy DMRS, the A-RS for AP 7 and the A-RS for AP 8 may be transmitted at the same RE location, and the A-RS for AP 9 and the A-RS for AP 10 may be transmitted at the same RE location. In this case, similar to the conventional case where the DMRS for AP 7 and the DMRS for AP 8 are transmitted in the CDM manner through the same RE location using orthogonal codes, and the DMRS for AP 9 and the DMRS for AP 10 are transmitted in the CDM manner through the same RE location using orthogonal codes, the A-RS for AP 7 and the A-RS for AP 8 may be transmitted in the CDM manner through the same RE location using orthogonal codes, and the A-RS for AP 9 and the A-RS for AP 10 may be transmitted in the CDM manner through the same RE location using orthogonal codes.

Figure 25:
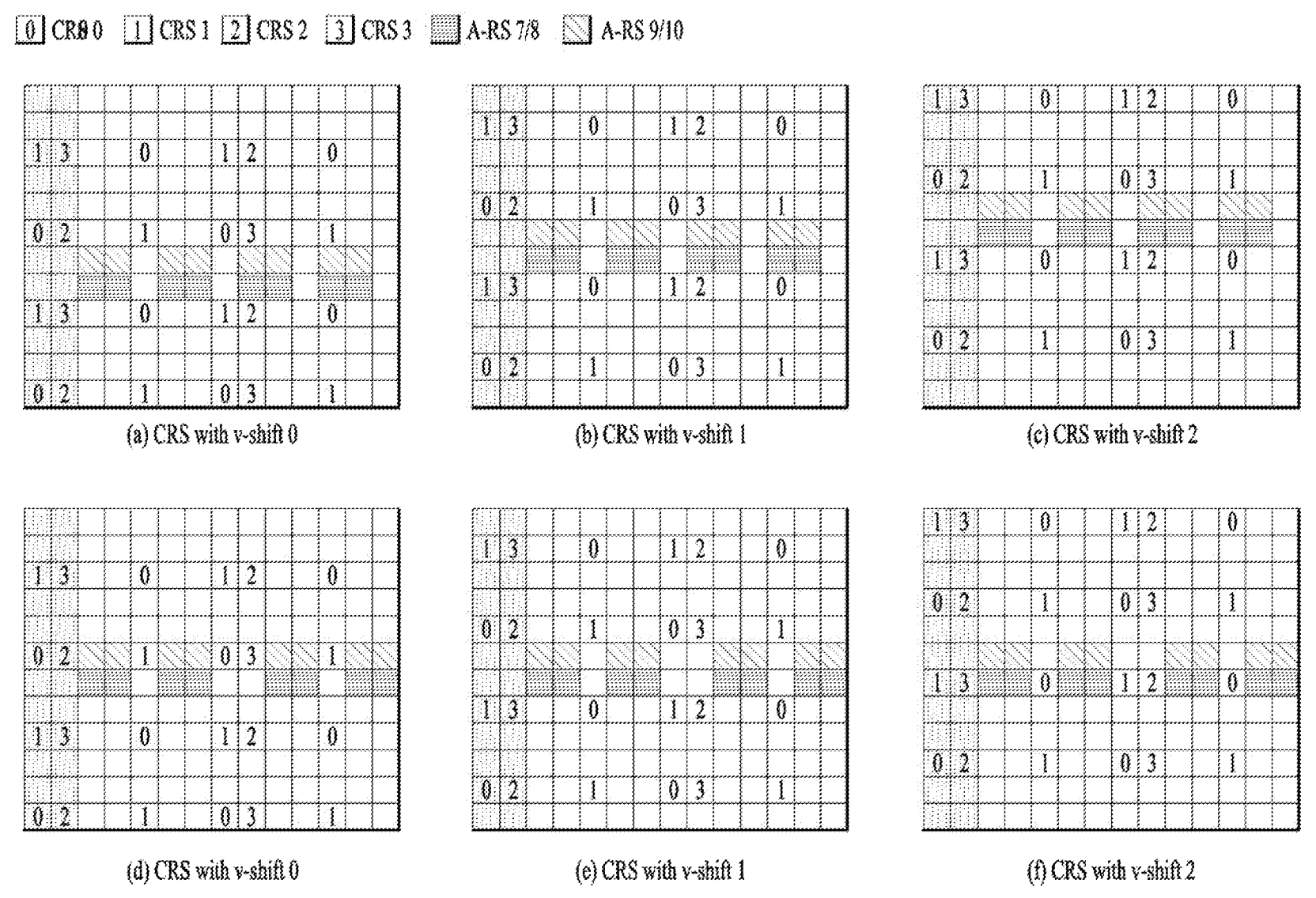

In this case, the RE location(s) of the A-RSs may be given as shown in FIGS. 23, 24 and 25. In FIGS. 23, 24 and 25, A-RS 7, A-RS 8, A-RS 9, and A-RS 10 denote the A-RSs transmitted through AP 7, AP 8, AP 9, and AP 10, respectively. The A-RSs may be present at the same RE location in every sTTI, but may not be positioned at the RE location of transmission of the legacy CRS. The RE location of the A-RSs may be v-shifted or changed according to the RE location of the CRS (or according to the value of v-shift). Specifically, in order to position the A-RS on an OFDM symbol in which the legacy CRS is not transmitted, the A-RS may be transmitted through the first and second OFDM symbols in each of the first sTTI (OFDM symbols #2-#4) and the second sTTI (OFDM symbols #5-#7) within a subframe, and be transmitted through the second and third OFDM symbols in each of the third sTTI (OFDM symbols #8-#10) and fourth sTTI (OFDM symbols #11-#13) within the same subframe.

FIG. 23 illustrates examples of an RS pattern in which the A-RS is present at 6 REs for each AP within one PRB in every sTTI. FIG. 24 illustrates examples of an RS pattern in which the A-RS is present at 4 REs for each AP within one PRB in every sTTI. FIG. 25 illustrates examples of an RS pattern in which the A-RS is present at 2 REs for each AP within one PRB in every sTTI. The A-RS pattern(s) according to the present invention may be applied even when an AP different from AP 7, AP 8, AP 9 and AP 10 is used for transmission of the A-RSs. Further, the A-RS pattern(s) according to the present invention include RE pattern(s) obtained by v-shifting the A-RS pattern proposed above.

Case 4: The TTI Length Equals 4 OFDM Symbols

When the TTI length equals 4 OFDM symbols, an A-RS may be present in every sTTI because the UE needs to perform demodulation of the sPDCCH/sPDSCH using only A-RSs present in the sTTI region in which the sPDCCH/sPDSCH is transmitted.

When the TTI length equals 4 OFDM symbols, the RS pattern proposed for the case where the TTI length equals 2 OFDM symbols may be employed. In this case, the RS, which is configured to be transmitted through 2 OFDM symbols in a two-OFDM symbol sTTI in the previous case, may be transmitted through 2 OFDM symbols in a four-OFDM symbol sTTI. For example, the OFDM symbols having the A-RS may be the first and second OFDM symbols in the sTTI. Similarly, the RS, which is configured to be transmitted through one OFDM symbol in a two-OFDM symbol sTTI, may be transmitted through one OFDM symbol in a four-OFDM symbol sTTI. For example, an OFDM symbol having the A-RS may be the first OFDM symbol in the sTTI.

For example, when the RS pattern proposed for the case where the TTI length equals 2 OFDM symbols as shown in FIGS. 15(d), 15(e) and 15(f) is applied to the first and second OFDM symbols in the four-OFDM symbol sTTI, an RS pattern shown in FIG. 26 may be applied.

RS Pattern for 'RS Usage 3: Legacy CRS+Additional RS'

When a cell-specific or UE-specific A-RS and the legacy CRS are used together as RSs for demodulation of the sPDCCH and/or sPDSCH in an sTTI, RS pattern(s) depending on the TTI length may be used.

When a cell-specific or UE-specific A-RS and the legacy CRS are used together as RSs for demodulation of the sPDCCH and/or sPDSCH in an sTTI, the RS pattern(s) proposed in the subsection "RS pattern for 'RS usage 3: Legacy CRS+additional RS" may be used as RS pattern(s) of the A-RS.

Additionally, the following RS pattern may be used for transmission of the A-RS. In this embodiment, to reduce the RS overhead and/or to make sTTIs have similar RS overhead (considering the legacy CRS and A-RS), presence/absence of the A-RS and/or the number of REs may be configured differently for each sTTI. If the legacy CRS and the A-RS are used together for channel estimation, the UE may perform channel estimation using the legacy CRS or A-RS transmitted in a neighboring sTTI, even if the number of the A-RSs transmitted is small or no A-RS is transmitted in one sTTI.

If two antenna ports are used for transmission of the A-RSs, AP 0 and AP 1 through which the A-RSs are transmitted may be identical to AP 7 and AP 8. Alternatively, AP x and AP y through which the A-RSs are transmitted may have a quasi co-located (QCL) relationship with AP 0 and AP 1.

Case 1: The TTI Length Equals One OFDM Symbol

When the TTI length equals one OFDM symbol, the following RS pattern(s) may be used to transmit A-RSs.

Figure 28:
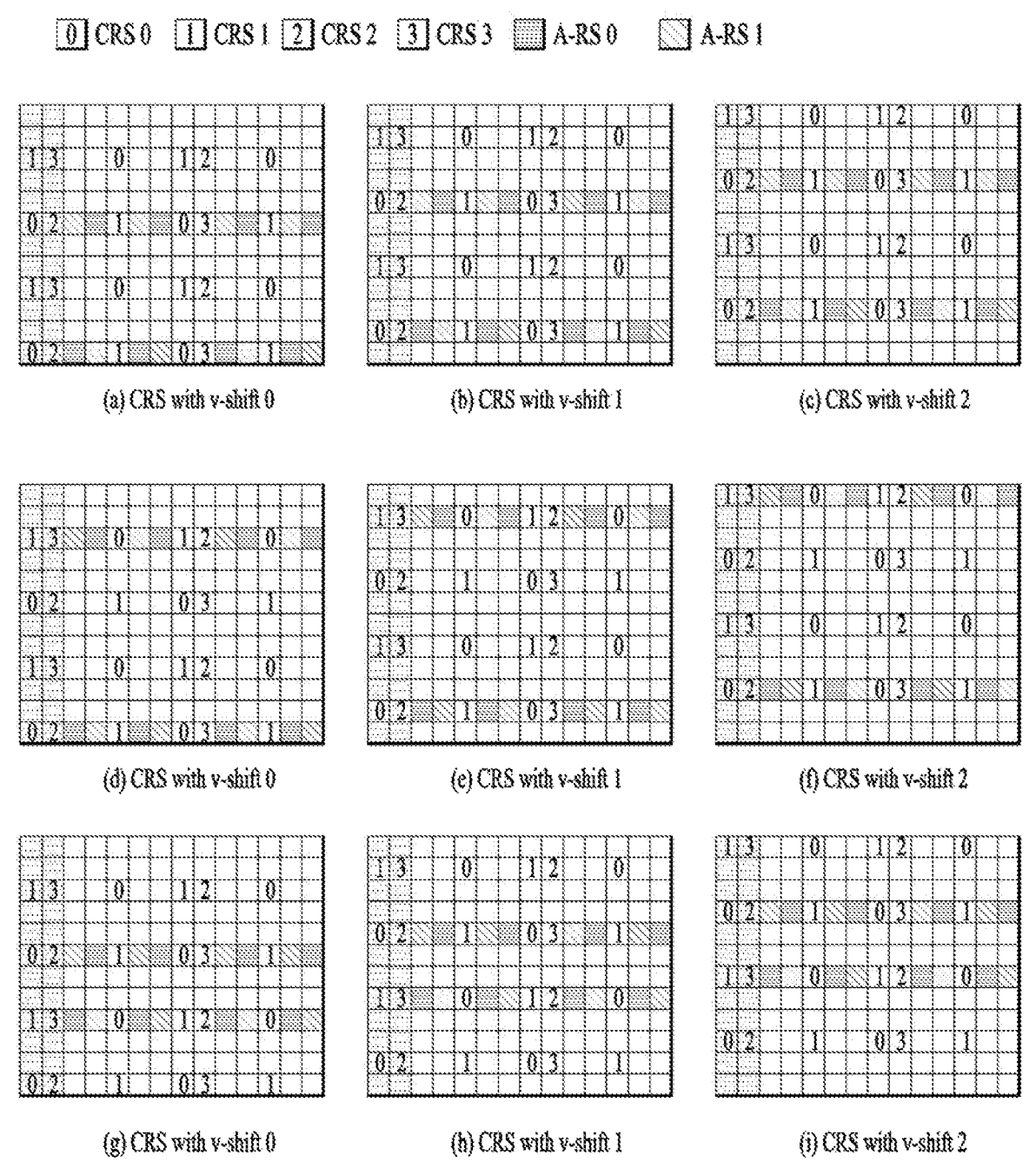

In FIGS. 27, 28 and 29, A-RS 0 denotes the A-RS transmitted through AP 0, and A-RS 1 denotes the A-RS transmitted through AP 1.

As shown in FIG. 27, at least 2 RS REs per antenna port may be present in each sTTI, including the A-RS and the legacy CRS. In this case, the A-RS may not be transmitted on OFDM symbols #0, #1, #4, #7, #8 and #11 since the legacy CRS is transmitted at 2 REs per OFDM symbol for each antenna port. On OFDM symbol #8 (and/or OFDM symbol #1), however, the legacy CRS for AP 2 and the legacy CRS for AP 3 are transmitted, and thus A-RSs using AP 0 and AP 1 are not transmitted.

Option 1. To allow 2 RS REs to be used per antenna port in each sTTI, RE locations where the legacy CRS is not transmitted may be used to transmit each of the A-RSs for AP 0 and AP 1 at 2 REs.

Option 2. To maintain the same RS overhead in each sTTI, the A-RS may not be transmitted on corresponding OFDM symbols.

Additionally, if the number of antenna ports through which the CRS is transmitted is 2, the RE location for the legacy CRS is used to transmit each of the A-RSs for AP 0 and AP 1 at 2 REs on OFDM symbol #8 (and/or OFDM symbol #1). If the number of antenna ports through which the CRS is transmitted is 4, the A-RS may not be transmitted on OFDM symbol #8 (and/or OFDM symbol #1).

At least one RS RE per antenna port may be present in each sTTI, including the A-RS and the legacy CRS. For example, the A-RS patterns of FIG. 28 may be used. In this case, the A-RS may not be transmitted on OFDM symbols #0, #1, #4, #7, #8 and #11 since the legacy CRS is transmitted at 2 REs per OFDM symbol for each antenna port. On OFDM symbol #8 (and/or OFDM symbol #1), however, the legacy CRS for AP 2 and the legacy CRS for AP 3 are transmitted, and thus none of the A-RSs using AP 0 and AP 1 are transmitted. On such OFDM symbol, the following A-RS may be transmitted.

Option 1. To allow one RS RE to be transmitted per antenna port in each sTTI, RE locations where the legacy CRS is not transmitted may be used to transmit each of the A-RSs for AP 0 and AP 1 corresponding to one RE.

Option 2. To maintain as equal RS overhead as possible in each sTTI, the A-RS may not be transmitted on corresponding OFDM symbols.

Additionally, if the number of antenna ports through which the CRS is transmitted is 2, the RE location for transmission of the legacy CRS is used to transmit each of the A-RSs for AP 0 and AP 1 at 2 REs on OFDM symbol #8 (and/or OFDM symbol #1). If the number of antenna ports through which the CRS is transmitted is 4, the A-RS may not be transmitted on OFDM symbol #8 (and/or OFDM symbol #1).

At least 2 RS REs per antenna port may be present in neighboring sTTIs, including the A-RS and the legacy CRS. For example, the RS pattern of FIG. 29 may be used. The A-RSs may be positioned, such that two or more RS REs are not transmitted per AP in one sTTI, while at least 2 RS REs are present per antenna port in two neighboring sTTI.

The A-RS pattern(s) according to the present invention include an RS pattern with the RE locations of A-RS 0 and A-RS 1 switched for the A-RS pattern proposed above. In addition, the A-RS pattern(s) according to the present invention may be applied even when an AP different from AP 0 and AP 1 is used for transmission of the A-RSs.

Case 2: The TTI Length Equals 2 OFDM Symbols

When the TTI length equals 2 OFDM symbols, the following RS pattern(s) may be used to transmit A-RSs.

In FIG. 30, A-RS 0 denotes the A-RS transmitted through AP 0, and A-RS 1 denotes the A-RS transmitted through AP 1. FIGS. 30(a), 30(b) and 30(c) show RE locations of the A-RS when the value of v-shift, which determines the RE location of the legacy CRS, is 0, 1 and 2, respectively. FIGS. 30(d), 30(d) and 30(e) show RE locations of the A-RS when the value of v-shift, which determines the RE location of the legacy CRS, is 0, 1 and 2, respectively.

At least 4 RS REs per antenna port may be present in each sTTI, including the A-RS and the legacy CRS. For example, the RS pattern(s) of FIGS. 30(a), 30(b) and 30(c) may be used. In this case, the A-RS may be transmitted at two REs per antenna port in the second, third, fourth and fifth sTTIs in the region of sTTIs except the two OFDM symbols forming the legacy PDCCH region because the legacy CRS is transmitted on 4 REs per sTTI. In the fourth sTTI, only the legacy CRSs for AP 2 and AP 3 are transmitted, and thus the A-RS may be transmitted in the sTTI having only CRSs for some of the 4 APs in the following manner.

Option 1. To allow 4 RS REs to be used per antenna port in each sTTI, RE locations where the legacy CRS is not transmitted may be used to transmit each of the A-RSs for AP 0 and AP 1 at 4 REs.

Option 2. To maintain the same RS overhead in each sTTI, an A-RS may be transmitted at 2 REs per AP in the corresponding sTTI.

Additionally, if the number of antenna ports through which the CRS is transmitted is 2, each of the A-RSs for AP 0 and AP 1 may also be transmitted on 4 REs in the fourth sTTI region. If the number of antenna ports through which the CRS is transmitted is 4, an A-RS may be transmitted at 2 REs per AP.

At least 2 RS REs per antenna port may be present in each sTTI, including the A-RS and the legacy CRS. For example, the RS pattern(s) of FIGS. 30(d), 30(e) and 30(f) may be used. In this case, the A-RS may not be transmitted in the second, third, fourth and fifth sTTIs in the region of sTTIs except the two OFDM symbols over which the legacy PDCCH region spans because the legacy CRS is transmitted at 2 REs per sTTI in the second, third, fourth and fifth sTTIs. In the fourth sTTI region, only the legacy CRSs for AP 2 and AP 3 are transmitted, and thus the A-RS may be transmitted in the sTTI having only CRSs for some of the APs in the following manner.

Option 1. To allow 2 RS REs to be used per antenna port in each sTTI, RE locations where the legacy CRS is not transmitted may be used to transmit each of the A-RSs for AP 0 and AP 1 at 2 REs.

Option 2. To maintain the same RS overhead in each sTTI, an A-RS may not be transmitted in a corresponding sTTI.

Additionally, if the number of antenna ports through which the CRS is transmitted is 2, each of the A-RSs for AP 0 and AP 1 may also be transmitted at 2 REs in the fourth sTTI region. If the number of antenna ports through which the CRS is transmitted is 4, the A-RS may not be transmitted in a corresponding sTTI.

The A-RS pattern(s) according to the present invention include an RS pattern with the RE locations of A-RS 0 and A-RS 1 switched for the A-RS pattern proposed above. In addition, the A-RS pattern(s) according to the present invention may be applied even when an AP different from AP 0 and AP 1 is used for transmission of the A-RSs.

Case 3: The TTI Length Equals 3 OFDM Symbols

When the TTI length equals 3 OFDM symbols, the following RS pattern(s) may be used to transmit A-RSs.

FIGS. 31(a), 31(b) and 31(c) show RE locations of the A-RS when the value of v-shift, which determines the RE location of the legacy CRS, is 0, 1 and 2, respectively. In FIG. 31, A-RS 0 denotes the A-RS transmitted through AP 0, and A-RS 1 denotes the A-RS transmitted through AP 1.

At least 4 RS REs per antenna port may be present in each sTTI, including the A-RS and the legacy CRS. For example, the RS pattern(s) of FIG. 31 may be used. Since the legacy CRS is transmitted at 4 REs per sTTI, the A-RS may be transmitted at 2 REs per antenna port in each sTTI. In the third TTI region, however, only the legacy CRSs for AP 2 and AP 3 are transmitted, and thus the A-RSs may be transmitted in the following manner.

Option 1. To allow 4 RS REs to be used per antenna port in each sTTI, RE locations where the legacy CRS is not transmitted may be used to transmit each of the A-RSs for AP 0 and AP 1 at 4 REs.

Option 2. To maintain the same RS overhead in each sTTI, an A-RS may be transmitted at 2 REs per AP in a corresponding sTTI.

Additionally, if the number of antenna ports through which the CRS is transmitted is 2, each of the A-RSs for AP 0 and AP 1 may also be transmitted at 4 REs in the third sTTI region. If the number of antenna ports through which the CRS is transmitted is 4, an A-RS may be transmitted at 2 REs per AP.

The A-RS pattern(s) according to the present invention include an RS pattern with the RE locations of A-RS 0 and A-RS 1 switched for the A-RS pattern proposed above. In addition, the A-RS pattern(s) according to the present invention may be applied even when an AP different from AP 0 and AP 1 is used for transmission of the A-RSs.

Case 4: The TTI Length Equals 4 OFDM Symbols

When the TTI length equals 4 OFDM symbols, the following RS pattern(s) may be used to transmit A-RSs.

FIGS. 32(a), 32(b) and 32(c) show RE locations of the A-RS when the value of v-shift, which determines the RE location of the legacy CRS, is 0, 1 and 2, respectively. In FIG. 32, A-RS 0 denotes the A-RS transmitted through AP 0, and A-RS 1 denotes the A-RS transmitted through AP 1.

At least 4 RS REs per antenna port may be present in each sTTI, including the A-RS and the legacy CRS. For example, the RS pattern(s) of FIG. 32 may be used. The A-RS may be transmitted at 2 REs per antenna port in the first and third sTTI regions since the legacy CRSs for AP 0 and AP 1 are transmitted at 4 REs per AP. In the second sTTI region, however, the legacy CRSs for AP 0, AP 1, AP 2 and AP 3 are transmitted on 2REs per AP, and thus the A-RSs may be transmitted in the following manner.

Option 1. To allow 4 RS REs to be used per antenna port in each sTTI, RE locations where the legacy CRS is not transmitted may be used to transmit each of the A-RSs for AP 0 and AP 1 at 2 REs.

Option 2. To maintain the same RS overhead in each sTTI, the A-RS may not be transmitted in a corresponding sTTI.

Additionally, if the number of antenna ports through which the CRS is transmitted is 2, each of the A-RSs for AP 0 and AP 1 may also be transmitted at 2 REs in the second sTTI region. If the number of antenna ports through which the CRS is transmitted is 4, the A-RS may not be transmitted in the corresponding sTTI.

The A-RS pattern(s) according to the present invention include an RS pattern with the RE locations of A-RS 0 and A-RS 1 switched for the A-RS pattern proposed above. In addition, the A-RS pattern(s) according to the present invention may be applied even when an AP different from AP 0 and AP 1 is used for transmission of the A-RSs.

The A-RS pattern(s) described above may be used only on the second OFDM symbol or the last the OFDM symbol in each sTTI. In other words, only RS RE location(s) present on the second or last OFDM symbol in each sTTI may be valid among the RS RE locations of the A-RS pattern(s). For example, in the case of sTTIs each consisting of 2 symbols, the a-RS may be present only within the second OFDM symbol in each sTTI, and the A-RS pattern within the second OFDM symbol may be identical to the positions of the RS RE location (S) present on the second OFDM symbol in each sTTI among the RS RE location(s) according to one of the A-RS patterns is described above. For example, the A-RS patterns of FIGS. 22(a), 22(b) and 22(c) may be applied such that the A-RS is present only on the second OFDM symbol in each sTTI as illustrated in FIGS. 33(a), 33(b) and 33(c).

The present invention is also applicable in cases where a subframe has different sTTI configurations, for example, in the case where 14 OFDM symbols are divided into a 3-OFDM symbol sTTI, a 2-OFDM symbol sTTI, a 2-OFDM symbol sTTI, a 3-OFDM symbol sTTI, a 2-OFDM symbol sTTI, and a 2-OFDM symbol sTTI, or in the case where 14 OFDM symbols are divided into a 3-OFDM symbol sTTI, a 2-OFDM symbol sTTI, a 2-OFDM symbol sTTI, a 2-OFDM symbol sTTI, a 2-OFDM symbol sTTI, and a 3-OFDM symbol sTTI.

E. A-RS Transmission within a Bundled PRBs

Figure 34:
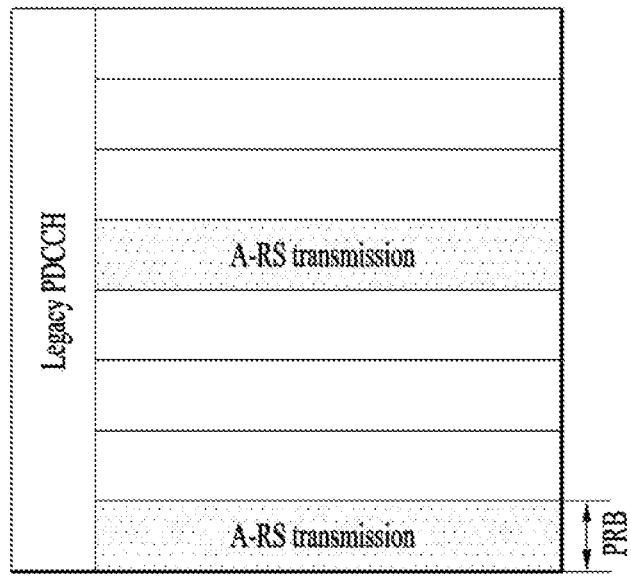

In order to reduce RS overhead according to transmission in an sTTI, the A-RS of the present invention may be present only on some PRBs. Specifically, the A-RS may be transmitted on one or Q (Q<P) PRB(s) per P PRBs in an sTTI. For example, referring to FIG. 34, the A-RS may be transmitted through one PRB per 4 PRBs in an sTTI. Herein, the value of P and/or the value of Q may be fixed or defined in a standard document, and be signaled by the eNB through SIB or RRC.

In this case, the a-RS pattern in the region of PRB(s) in which the a-RS is transmitted may be one of the RS patterns described above.

F. sPDCCH DMRS

The DMRS for the sPDCCH (hereinafter, sPDCCH DMRS) may be positioned within an OFDM symbol on which the sPDCCH is transmitted. If the location of the OFDM symbol on which the sPDCCH is transmitted is the first OFDM symbol in each sTTI, the sPDCCH DMRS may be transmitted as shown in FIG. 35(a), 35(b) or 35(c), for example. As shown in FIG. 35(a), 35(b) or 35(c), the sPDCCH DMRS may be transmitted within one OFDM symbol on which the sPDCCH is transmitted. In addition, the DMRSs for different antenna ports may be transmitted at 2 REs contiguous in the frequency domain in a CDM manner.

If the locations of the OFDM symbols on which the sPDCCH is transmitted is the first two OFDM symbols in each sTTI, the sPDCCH DMRS may be transmitted as shown in FIG. 35(a), 35(b), 35(c), 35(d), 35(e), 35(f) or 35(g), for example. As shown in FIG. 35(a), 35(b) or 35(c), the sPDCCH DMRS may be transmitted only within the first OFDM symbol on which the sPDCCH is transmitted. In addition, the DMRSs for different antenna ports may be transmitted at 2 contiguous REs in a CDM manner. Alternatively, as shown in FIG. 35(d), 35(e), 35(f) or 35(g), the DMRS may be transmitted through two OFDM symbols on which the sPDCCH is transmitted. In addition, the DMRSs for different antenna ports may be transmitted at 2 REs contiguous in the time domain in a CDM manner.

Figure 35:
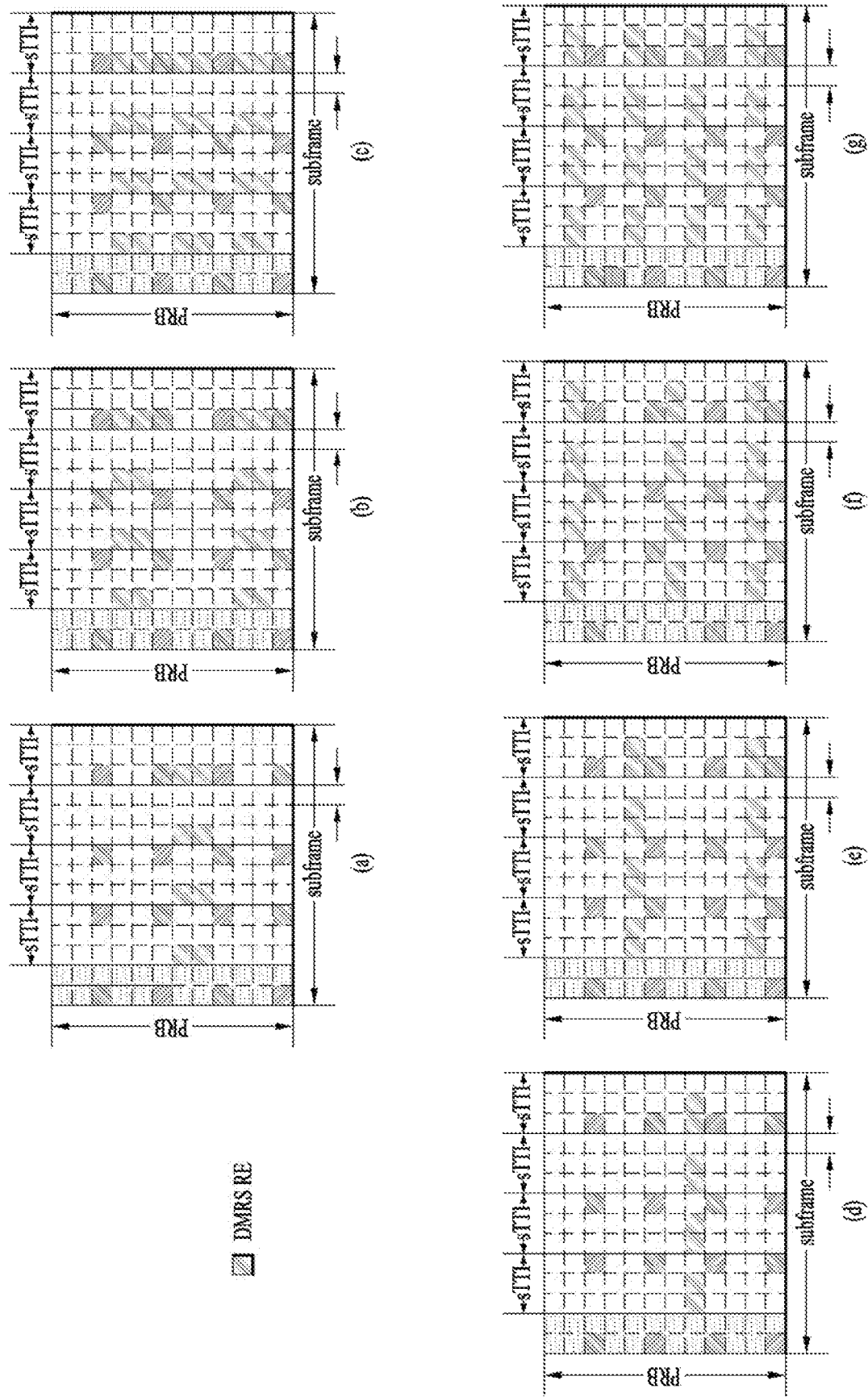

FIG. 35 illustrates an sPDCCH DMRS in an sTTI whose length equals 3 OFDM symbols. The present invention is also applicable to an sTTI consisting of a different number of OFDM symbols and/or an sTTI at another location.

The DMRS patterns according to an embodiment of the present invention include DMRS pattern(s) obtained by v-shifting the DMRS pattern(s) described above. Specifically, the DMRS pattern may be v-shifted according to the value of v-shift of the CRS (or according to cell ID or cell ID mod 3).

In FIG. 11, an example of DMRS pattern with single antenna port is shown where sPDCCH OFDM region consists of single OFDM symbol. In this example, there are two DMRS REs per PRB with 6 REs interval along a frequency axis. If multiple sPDCCHs are not multiplexed within a PRB, DMRS transmission only for single antenna port is enough and it can minimize DMRS overhead.

On the other hand, if multiplexing of multiple sPDCCHs within a PRB is allowed or sPDCCH is transmitted using two antenna ports (such as distributed ePDCCH transmission), DMRS pattern with two antenna ports needs to be designed. DMRS pattern examples for two antenna ports are shown in FIG. 36. As shown in FIG. 36(a), DMRS REs for two antenna ports can be multiplexed by frequency division multiplexing (FDM). Or, DMRS of two antenna ports can be multiplexed within two adjacent DMRS REs by code division multiplexing (CDM) as shown in FIG. 36(b) to maximize the number of DMRS REs for each antenna port.

Figure 37:
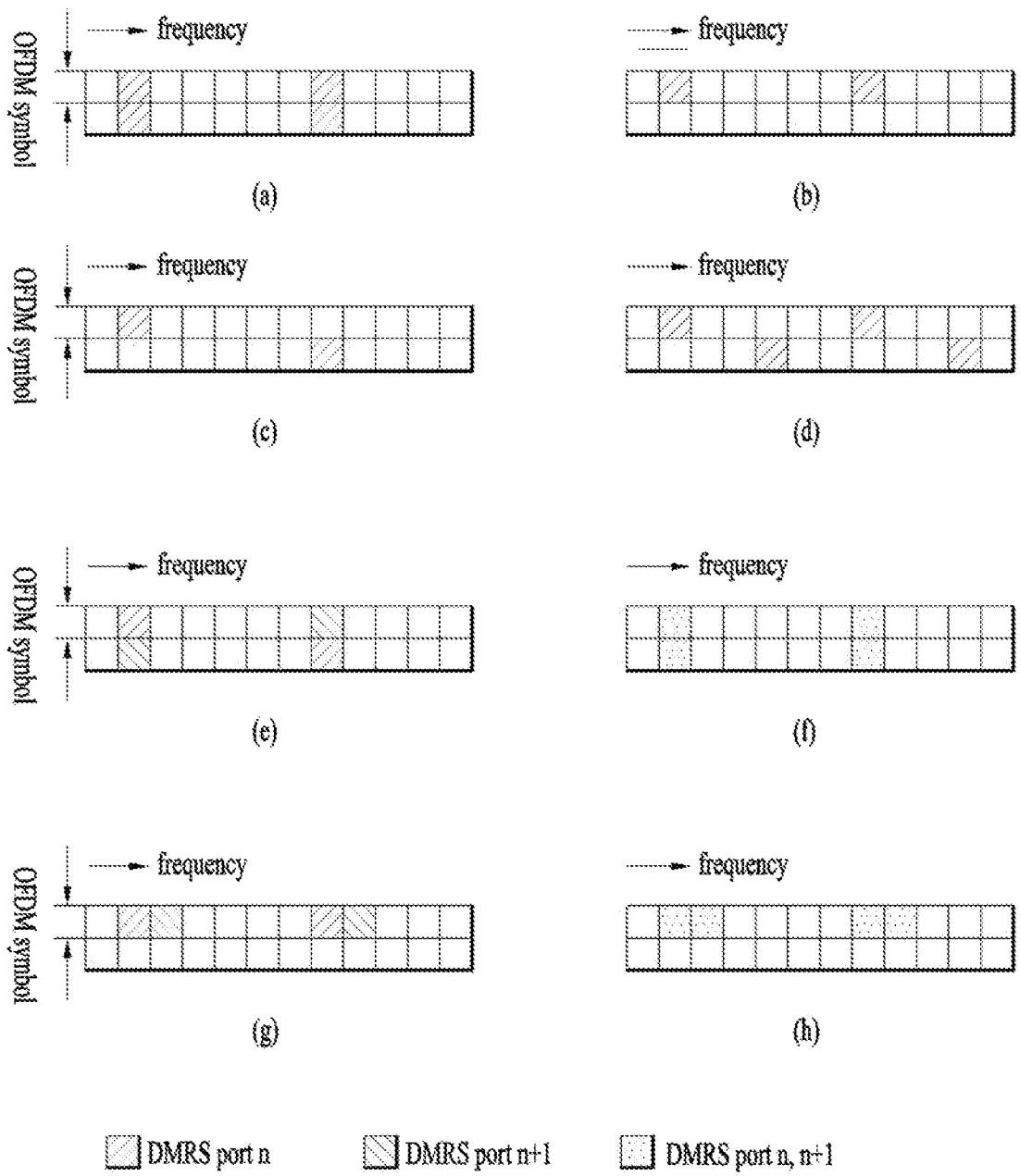

When sPDCCH region consists of two OFDM symbols, DMRS also can be allocated in both OFDM symbols. For example, DMRS pattern for single sPDCCH OFDM symbol can be copied in the second OFDM symbol, or optimized DMRS patterns can be designed separately for two sPDCCH OFDM symbols. On the other hand, even if the number of sPDCCH OFDM symbols is two, DMRS can be allocated in the first OFDM symbol only. It can help to reduce channel estimation latency. When an sPDCCH OFDM symbol consists of 2 OFDM symbols, for example, DMRS pattern(s) shown in FIG. 37 may be used.

FIGS. 37(a), 37(b), 37(c) and 37(d) illustrate exemplary cases where one DMRS antenna port is provided. Referring to FIG. 37(a), a DMRS pattern used on a single sPDCCH OFDM symbol may repeatedly appear on the first sPDCCH OFDM symbol and the second sPDCCH OFDM symbol. Alternatively, as shown in FIG. 37(c) or 37(d), a DMRS pattern separate from the DMRS pattern used on the single sPDCCH OFDM symbol may be defined in case that the sPDCCH is transmitted over 2 OFDM symbols. Alternatively, as shown in FIG. 37(b), even if the number of sPDCCH OFDM symbols is 2, the DMRS may be present only on the first OFDM symbol. Alternatively, the DMRS pattern used on the single sPDCCH OFDM symbol may appear only on an OFDM symbol on which the sPDCCH is transmitted within a PRB. For example, if the sPDCCH is transmitted only on the second OFDM symbol, the DMRS pattern of FIG. 11 may be present only on the second OFDM symbol. If the sPDCCH is transmitted over 2 OFDM symbols, the DMRS pattern of FIG. 11 may be present on both OFDM symbols as shown in FIG. 37(a).

If 2 DMRS antenna ports are provided, a DMRS pattern used on a single sPDCCH OFDM symbol may repeatedly appear on the first sPDCCH OFDM symbol and the second sPDCCH OFDM symbol. Alternatively, as shown in FIG. 37(e) or 37(f), a DMRS pattern separate from the DMRS pattern used on the single sPDCCH OFDM symbol may be defined. Alternatively, as shown in FIG. 37(g) or 37(h), even if the number of sPDCCH OFDM symbols is 2, the DMRS may be present only on the first OFDM symbol. Alternatively, the DMRS pattern used on the single sPDCCH OFDM symbol may appear only on an OFDM symbol on which the sPDCCH is transmitted within a PRB. For example, if the sPDCCH is transmitted only on the second OFDM symbol, the DMRS pattern of FIG. 36 may be present only on the second OFDM symbol. If the sPDCCH is transmitted over 2 OFDM symbols, the DMRS pattern of FIG. 36 may be present on both OFDM symbols.

The DMRS patterns according to an embodiment of the present invention include DMRS pattern(s) obtained by v-shifting the DMRS pattern(s) described above. Specifically, the DMRS pattern may be v-shifted according to the value of v-shift of the CRS (or according to cell ID or cell ID mod 3).

G. DMRS Sharing Between sPDCCH and sPDSCH

Figure 38:
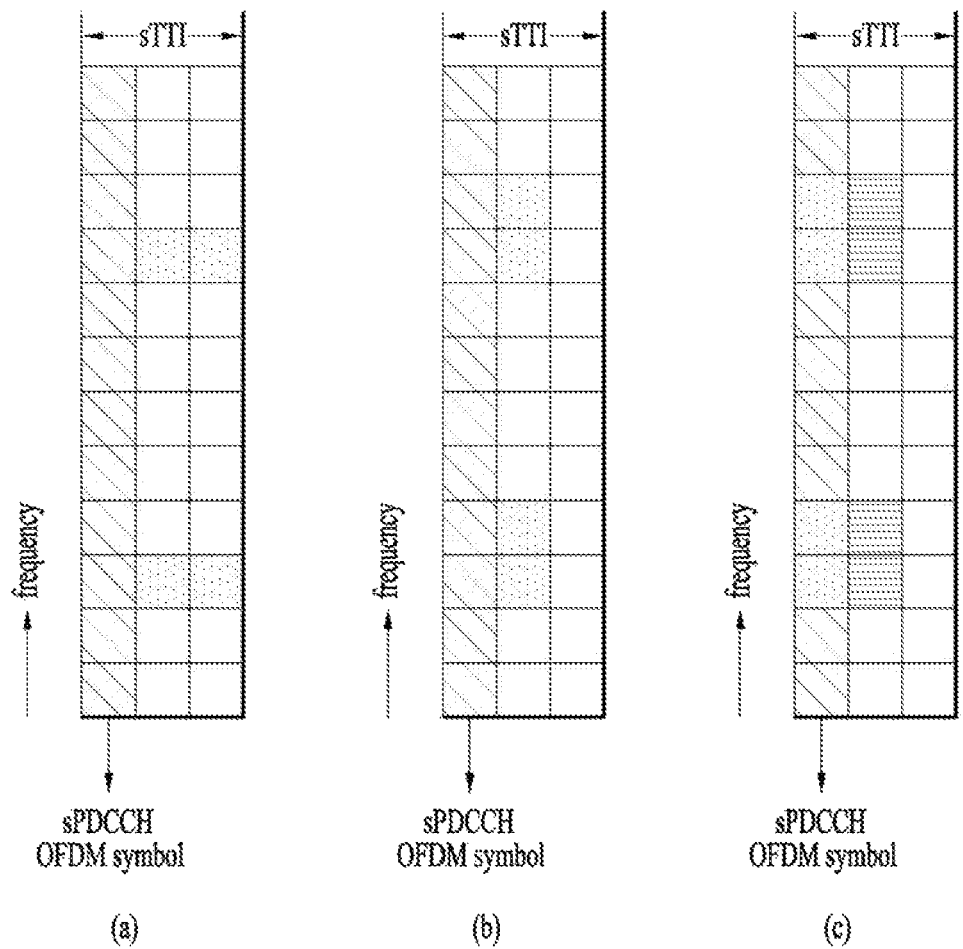

If time division multiplexing (TDM) between sPDCCH and sPDSCH is considered, for example, if placing sPDCCH in the first one or two OFDM symbols of each sTTI is considered, DMRS for sPDSCH can be allocated within OFDM symbols only for sPDSCH transmission. In other word, sPDSCH DMRS cannot be allocated in OFDM symbol(s) which sPDCCH can be transmitted in. For example, DMRS can be located in the first two OFDM symbols after sPDCCH OFDM symbol region as illustrated in FIG. 38(a). Or, as shown in FIG. 38(b), DMRS REs can be located in the first OFDM symbol right after sPDCCH OFDM symbol region to make channel estimation latency reduced as much as possible. To reduce DMRS overhead, code division multiplexing (CDM) of DMRSs for multiple antenna ports can be adopted.

Making DMRS shared between sPDSCH and sPDCCH also can be considered to reduce DMRS overhead. The RS for receiving the sPDCCH and the sPDSCH is preferably located in the front part of the sTTI or in the OFDM symbol (s) region in which the sPDCCH is transmitted in order to reduce the latency for channel estimation and the reception latency of the sPDCCH located in the front of the sTTI. In order for the DMRS to be shared between the sPDCCH and the sPDSCH, the RS for receiving the sPDCCH and receiving the sPDSCH is located on the first OFDM symbol of the OFDM symbol region constituting the sTTI. Or, to share DMRS among sPDCCH and sPDSCH, DMRS antenna port(s) used for both sPDCCH and sPDSCH is allocated within sPDCCH OFDM symbol(s). For example, let's assume that antenna ports n and n+l are used for sPDCCH and antenna ports n, n+1, n+2, and n+3 are used for sPDSCH. Then, as illustrated in FIG. 38(c), DMRS for antenna ports n and n+1 which are shared by sPDCCH and sPDSCH can be located in OFDM symbol(s) with sPDCCH (hereinafter, sPDCCH OFDM symbol(s)), and DMRS for antenna ports only for sPDSCH can be located after the sPDCCH OFDM symbol(s). DMRS sharing can reduce DMRS overhead, but many issues should be studied further such as DMRS OFDM symbol location, antenna port(s) allocation, impacts on sPDCCH/sPDSCH performance, etc.

Figure 39:
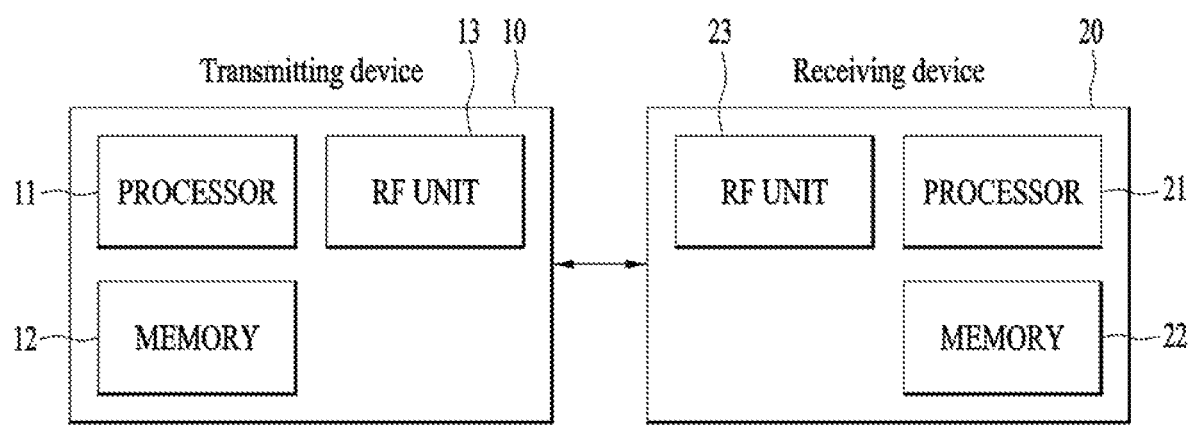
FIG. 39 is a block diagram illustrating elements of a transmitting device 10 and a receiving device 20 for implementing the present invention.

FIG. 39 is a block diagram illustrating elements of a transmitting device 10 and a receiving device 20 for implementing the present invention.

The transmitting device 10 and the receiving device 20 respectively include Radio Frequency (RF) units 13 and 23 capable of transmitting and receiving radio signals carrying information, data, signals, and/or messages, memories 12 and 22 for storing information related to communication in a wireless communication system, and processors 11 and 21 operationally connected to elements such as the RF units 13 and 23 and the memories 12 and 22 to control the elements and configured to control the memories 12 and 22 and/or the RF units 13 and 23 so that a corresponding device may perform at least one of the above-described embodiments of the present invention.

The memories 12 and 22 may store programs for processing and controlling the processors 11 and 21 and may temporarily store input/output information. The memories 12 and 22 may be used as buffers.

The processors 11 and 21 generally control the overall operation of various modules in the transmitting device and the receiving device. Especially, the processors 11 and 21 may perform various control functions to implement the present invention. The processors 11 and 21 may be referred to as controllers, microcontrollers, microprocessors, or microcomputers. The processors H and 21 may be implemented by hardware, firmware, software, or a combination thereof. In a hardware configuration, application specific integrated circuits (ASICs), digital signal processors (DSPs), digital signal processing devices (DSPDs), programmable logic devices (PLDs), or field programmable gate arrays (FPGAs) may be included in the processors 11 and 21. Meanwhile, if the present invention is implemented using firmware or software, the firmware or software may be configured to include modules, procedures, functions, etc. performing the functions or operations of the present invention. Firmware or software configured to perform the present invention may be included in the processors 11 and 21 or stored in the memories 12 and 22 so as to be driven by the processors 11 and 21.

The processor 11 of the transmitting device 10 performs predetermined coding and modulation for a signal and/or data scheduled to be transmitted to the outside by the processor 11 or a scheduler connected with the processor 11, and then transfers the coded and modulated data to the RF unit 13. For example, the processor 11 converts a data stream to be transmitted into K layers through demultiplexing, channel coding, scrambling, and modulation. The coded data stream is also referred to as a codeword and is equivalent to a transport block which is a data block provided by a MAC layer. One transport block (TB) is coded into one codeword and each codeword is transmitted to the receiving device in the form of one or more layers. For frequency up-conversion, the RF unit 13 may include an oscillator. The RF unit 13 may include $N_t$ (where $N_t$ is a positive integer) transmit antennas.

A signal processing process of the receiving device 20 is the reverse of the signal processing process of the transmitting device 10. Under control of the processor 21, the RF unit 23 of the receiving device 20 receives radio signals transmitted by the transmitting device 10. The RF unit 23 may include $N_r$ (where $N_r$ is a positive integer) receive antennas and frequency down-converts each signal received through receive antennas into a baseband signal. The processor 21 decodes and demodulates the radio signals received through the receive antennas and restores data that the transmitting device 10 intended to transmit.

The RF units 13 and 23 include one or more antennas. An antenna performs a function for transmitting signals processed by the RF units 13 and 23 to the exterior or receiving radio signals from the exterior to transfer the radio signals to the RF units 13 and 23. The antenna may also be called an antenna port. Each antenna may correspond to one physical antenna or may be configured by a combination of more than one physical antenna element. The signal transmitted from each antenna cannot be further deconstructed by the receiving device 20. An RS transmitted through a corresponding antenna defines an antenna from the view point of the receiving device 20 and enables the receiving device 20 to derive channel estimation for the antenna, irrespective of whether the channel represents a single radio channel from one physical antenna or a composite channel from a plurality of physical antenna elements including the antenna. That is, an antenna is defined such that a channel carrying a symbol of the antenna can be obtained from a channel carrying another symbol of the same antenna. An RF unit supporting a MIMO function of transmitting and receiving data using a plurality of antennas may be connected to two or more antennas.

In the embodiments of the present invention, a UE operates as the transmitting device 10 in UL and as the receiving device 20 in DL. In the embodiments of the present invention, an eNB operates as the receiving device 20 in UL and as the transmitting device 10 in DL. Hereinafter, a processor, an RF unit, and a memory included in the UE will be referred to as a UE processor, a UE RF unit, and a UE memory, respectively, and a processor, an RF unit, and a memory included in the eNB will be referred to as an eNB processor, an eNB RF unit, and an eNB memory, respectively.

The eNB processor may configure sTTIs in the entire channel band or on some frequency resources. The eNB processor may configure one or more sTTIs in a default TTI. The eNB processor may control the eNB RF to transmit information indicating the frequency resources having configured sTTIs and/or information indicating time resources having configured sTTIs.

The eNB processor may control the eNB RF unit to transmit an sPDCCH and/or sPDSCH (hereinafter, sPDCCH/sPDSCH) within an sTTI according to one of the suggestions of the present invention disclosed above. The eNB processor may control the eNB RF unit to transmit an RS for demodulation of the sPDCCH/sPDSCH (hereinafter, DMRS) in the sTTI. The eNB processor may control the eNB RF unit to transmit, within an OFDM symbol having the sPDCCH, DMRS(s) for antenna port(s) used for transmission of both the sPDCCH and the sPDSCH. The eNB processor may control the eNB RF unit to transmit, within the remaining OFDM symbol(s) without the sPDCCH, DMRS(s) for antenna port(s) used only for transmission of the sPDSCH.

The eNB processor may apply a DMRS based TM to the sPDCCH/sPDSCH if the sTTI has only OFDM symbols without the CRS. The eNB processor may apply a CRS based TM to an sTTI including OFDM symbols with the CRS. The eNB processor may control the eNB RF unit to transmit an sPDCCH/sPDSCH along with the CRS but without the DMRS within the sTTI having the CRS. When the processor transmits a control/data channel to a UE assigned configuration of a DMRS-based TM, it may control the eNB RF unit to transmit the control/data channel based on the DMRS within a TTI/sTTI without the CRS and to transmit the control/data channel based on the CRS rather than on the DMRS within a TTI/sTTI with the CRS. Alternatively, the eNB processor may configure a TM for the TTI/sTTI without the CRS and a TM for the TTI/sTTI with the CRS separately. The eNB processor may configure one of the DMRS based TMs as the TM for the TTI/sTTI without the CRS and one of the CRS based TMs as the TM for the TTI/sTTI with the CRS. The eNB processor may control the eNB RF unit to transmit information about the TM for the TTI/sTTI without the CRS and information about the TM for the TTI/sTTI with the CRS to the UE.

The UE processor may control the UE RF to receive frequency resource information indicating the frequency resources having configured sTTIs and/or time resource information indicating time resources having configured sTTIs. The UE processor may configure sTTIs in the entire channel band or on some frequency resources, based on the frequency resource information. The UE processor may configure one or more sTTIs in a default TTI based on the time resource information.

The UE processor may control the UE RF unit to receive an sPDCCH and/or sPDSCH (hereinafter, sPDCCH/sPDSCH) within an sTTI according to one of the suggestions of the present invention disclosed above. The UE processor may control the UE RF unit to receive an RS for demodulation of the sPDCCH/sPDSCH (hereinafter, DMRS) in the sTTI. The UE processor may control the UE RF unit to receive, within an OFDM symbol having the sPDCCH, DMRS(s) for antenna port(s) used for transmission of both the sPDCCH and the sPDSCH. The UE processor may control the UE RF unit to receive, within the remaining OFDM symbol(s) without the sPDCCH, DMRS(s) for antenna port(s) used only for transmission of the sPDSCH.

If the sTTI has only OFDM symbols without the CRS, the UE processor may assume that the sPDCCH/sPDSCH is transmitted within the sTTI based on the DMRS. Thereby, if the sTTI has only OFDM symbols without the CRS, the UE processor may demodulate or decode the received sPDCCH/sPDSCH within the sTTI, based on the DMRS. In an sTTI having OFDM symbols with the CRS, the UE processor may assume that the sPDCCH/sPDSCH is transmitted based on the CRS. The UE processor may not expect reception of a DMRS in an sTTI with the CRS, and may demodulate or decode an sPDCCH/sPDSCH received in the sTTI with the CRS, based on the CRS. If the value is set in a DMRS based TM, the UE processor may demodulate or decode the control/data channel based on the DMRS within a TTI/sTTI without the CRS, and may demodulate or decode the control/data channel based on the CRS rather than on the DMRS within a TTI/sTTI with the CRS. Alternatively, the UE processor may control the UE RFE unit to receive transmission mode information having a TM for the TTI/sTTI without the CRS and a TM for the TTI/sTTI with the CRS which are configured separately. The UE processor may receive/demodulate/decode the sPDCCH/sPDSCH according to a DMRS based TM configured for the UE among the DMRS based TMs in the TTI/sTTI without the CRS, and may receive/demodulate/decode the sPDCCH/sPDSCH according to a CRS based TM configured for the UE in the TTI/sTTI with the CRS.

As described above, the detailed description of the preferred embodiments of the present invention has been given to enable those skilled in the art to implement and practice the invention. Although the invention has been described with reference to exemplary embodiments, those skilled in the art will appreciate that various modifications and variations can be made in the present invention without departing from the spirit or scope of the invention described in the appended claims. Accordingly, the invention should not be limited to the specific embodiments described herein, but should be accorded the broadest scope consistent with the principles and novel features disclosed herein.

What is claimed is:

1. A method of receiving a downlink channel by a user equipment, the method comprising:
   receiving first transmission mode (TM) configuration information; and
   receiving a first physical downlink channel based on the first TM configuration information,
   wherein the first physical downlink channel has a short transmission interval (TTI) duration equal to or short than a duration of a slot in a time domain,
   wherein the first TM configuration information includes information regarding a first TM for the short TTI duration and information regarding a second TM for the short TTI duration,
   wherein the first physical downlink channel is received based on the first TM when the first physical downlink channel is received in a multimedia broadcast multicast service (MBSFN) subframe, and
   wherein the first physical downlink channel is received based on the second TM when the first physical downlink channel is received in a non-MBSFN subframe.

2. The method according to claim 1,
   wherein the first TM is one among a plurality of TMs which use a demodulation reference signal (DMRS), and
   wherein the second TM is one among a plurality of TMs which use the DMRS or cell-specific reference signal (CRS).

3. The method according to claim 1, further comprising:
   receiving a second physical downlink channel based on second TM configuration information,
   wherein the second physical downlink channel has a non-short TTI duration longer than the duration of the slot in the time domain,
   wherein the second TM configuration information includes information regarding one TM for the non-short TTI duration,
   wherein the second physical downlink channel is received based on the one TM irrespective of whether the second physical downlink channel is received in the MBSFN subframe or in the non-MB SFN subframe.

4. The method according to claim 1,
   wherein the duration of the slot is 0.5 ms in the time domain.

5. A user equipment for receiving a downlink channel, comprising:
   a transceiver; and
   a processor configured to control the transceiver, the processor configured to:
   control the transceiver to receive first transmission mode (TM) configuration information; and
   control the transceiver to receive a first physical downlink channel based on the first TM configuration information,
   wherein the first physical downlink channel has a short transmission interval (TTI) duration equal to or short than a duration of a slot in a time domain,
   wherein the first TM configuration information includes information regarding a first TM for the short TTI duration and information regarding the second TM for the short TTI duration,
   wherein the first physical downlink channel is received based on the first TM when the first physical downlink channel is received in a multimedia broadcast multicast service (MBSFN) subframe, and
   wherein the first physical downlink channel is received based on the second TM when the first physical downlink channel is received in a non-MBSFN subframe.

6. The user equipment according to claim 5,
   wherein the first TM is one among a plurality of TMs which use a demodulation reference signal (DMRS), and
   wherein the second TM is one among a plurality of TMs which use the DMRS or cell-specific reference signal (CRS).

7. The user equipment according to claim 5,
   wherein the processor is configured to control the transceiver to receive a second physical downlink channel based on second TM configuration information,
   wherein the second physical downlink channel has a non-short TTI duration longer than the duration of the slot in the time domain,
   wherein the second TM configuration information includes information regarding one TM for the non-short TTI duration,
   wherein the second physical downlink channel is received based on the one TM irrespective of whether the second physical downlink channel is received in the MBSFN subframe or in the non-MB SFN subframe.

8. The user equipment according to claim 5,
   wherein the duration of the slot is 0.5 ms in the time domain.

9. An apparatus, comprising:
   a processor; and
   a memory that is operably connectable to the processor and that has stored thereon instructions which, when executed, cause the processor to perform operations comprising:
   controlling a transceiver to receive first transmission mode (TM) configuration information; and
   controlling the transceiver to receive a first physical downlink channel based on the first TM configuration information,
   wherein the first physical downlink channel has a short transmission interval (TTI) duration equal to or short than a duration of a slot in a time domain,
   wherein the first TM configuration information includes information regarding a first TM for the short TTI duration and information regarding the second TM for the short TTI duration,
   wherein the first physical downlink channel is received based on the first TM when the first physical downlink channel is received in a multimedia broadcast multicast service (MBSFN) subframe, and
   wherein the first physical downlink channel is received based on the second TM when the first physical downlink channel is received in a non-MBSFN subframe.

10. The apparatus according to claim 9,
    wherein the first TM is one among a plurality of TMs which use a demodulation reference signal (DMRS), and
    wherein the second TM is one among a plurality of TMs which use the DMRS or cell-specific reference signal (CRS).

11. The apparatus according to claim 9,
    wherein the operations further comprises:
    controlling the transceiver to receive a second physical downlink channel based on second TM configuration information, wherein the second physical downlink channel has a non-short TTI duration longer than the duration of the slot in the time domain, wherein the second TM configuration information includes information regarding one TM for the non-short TTI duration, wherein the second physical downlink channel is received based on the one TM irrespective of whether the second physical downlink channel is received in the MBSFN subframe or in the non-MB SFN subframe.

12. The apparatus according to claim 9, wherein the duration of the slot is 0.5 ms in the time domain.

13. A method of transmitting a downlink channel to a user equipment by a base station, the method comprising:

transmitting first transmission mode (TM) configuration information;

transmitting a first physical downlink channel based on the first TM configuration information, wherein the first physical downlink channel has a short transmission interval (TTI) duration equal to or short than a duration of a slot in a time domain, wherein the first TM configuration information includes information regarding a first TM for the short TTI duration and information regarding the second TM for the short TTI duration, wherein the first physical downlink channel is transmitted based on the first TM when the first physical downlink channel is transmitted in a multimedia broadcast multicast service (MBSFN) subframe, and wherein the first physical downlink channel is transmitted based on the second TM when the first physical downlink channel is transmitted in a non-MBSFN subframe.

14. The method according to claim 13, wherein the first TM is one among a plurality of TMs which use a demodulation reference signal (DMRS), and wherein the second TM is one among a plurality of TMs which use the DMRS or cell-specific reference signal (CRS).

15. The method according to claim 13, further comprising:

transmitting a second physical downlink channel based on second TM configuration information, wherein the second physical downlink channel has a non-short TTI duration longer than the duration of the slot in the time domain, wherein the second TM configuration information includes information regarding one TM for the non-short TTI duration, wherein the second physical downlink channel is transmitted based on the one TM irrespective of whether the second physical downlink channel is transmitted in the MBSFN subframe or in the non-MB SFN subframe.

16. The method according to claim 13, wherein the duration of the slot is 0.5 ms in the time domain.

* * * * *